United States Patent
Chen et al.

(10) Patent No.: US 10,663,696 B2
(45) Date of Patent: May 26, 2020

(54) IMAGING OPTICAL LENS SYSTEM, IMAGE CAPTURING UNIT AND ELECTRONIC DEVICE

(71) Applicant: LARGAN PRECISION CO., LTD., Taichung (TW)

(72) Inventors: Kuan-Ming Chen, Taichung (TW); Yu-Tai Tseng, Taichung (TW); Hsin-Hsuan Huang, Taichung (TW); Shu-Yun Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 16/245,115

(22) Filed: Jan. 10, 2019

(65) Prior Publication Data

US 2019/0146190 A1    May 16, 2019

Related U.S. Application Data

(60) Continuation of application No. 15/920,254, filed on Mar. 13, 2018, now Pat. No. 10,215,965, which is a (Continued)

(30) Foreign Application Priority Data

Apr. 22, 2016    (TW) .............................. 105112655 A

(51) Int. Cl.
G02B 9/62    (2006.01)
G02B 13/18    (2006.01)
(Continued)

(52) U.S. Cl.
CPC ........... *G02B 13/0045* (2013.01); *G02B 9/62* (2013.01); *G02B 13/04* (2013.01); *G02B 13/06* (2013.01); *G02B 27/0025* (2013.01)

(58) Field of Classification Search
CPC ....... G02B 13/0045; G02B 9/62; G02B 13/04
(Continued)

(56) References Cited

U.S. PATENT DOCUMENTS

2015/0346461 A1    12/2015    Chen et al.
2016/0033745 A1    2/2016    Chen et al.
(Continued)

FOREIGN PATENT DOCUMENTS

CN    104238074 A    12/2014
CN    105204143 A    12/2015
(Continued)

*Primary Examiner* — William Choi
(74) *Attorney, Agent, or Firm* — Maschoff Brennan

(57) ABSTRACT

An imaging optical lens system includes, in order from an object side to an image side, a first lens element, a second lens element, a third lens element, a fourth lens element, a fifth lens element and a sixth lens element. The first lens element has negative refractive power. The second lens element has an object-side surface being concave in a paraxial region thereof and an image-side surface being convex in a paraxial region thereof. The third lens element has positive refractive power. The fourth lens element has positive refractive power. The fifth lens element has negative refractive power. The sixth lens element has positive refractive power. The imaging optical lens system has a total of six lens elements.

28 Claims, 30 Drawing Sheets

Related U.S. Application Data division of application No. 15/208,546, filed on Jul. 12, 2016, now Pat. No. 9,952,410.

(51) Int. Cl.
| | |
|---|---|
| *G02B 13/00* | (2006.01) |
| *G02B 13/06* | (2006.01) |
| *G02B 13/04* | (2006.01) |
| *G02B 27/00* | (2006.01) |

(58) Field of Classification Search
USPC .......................... 359/713, 752, 756, 761, 762
See application file for complete search history.

(56) References Cited

U.S. PATENT DOCUMENTS

| | | |
|---|---|---|
| 2016/0033746 A1 | 2/2016 | Chen et al. |
| 2016/0223796 A1 | 8/2016 | Lee et al. |
| 2016/0223797 A1 | 8/2016 | Zhao |
| 2016/0252709 A1* | 9/2016 | Lin .................... G02B 13/0045 |
| | | 348/335 |
| 2017/0102523 A1 | 4/2017 | Chen et al. |
| 2017/0276909 A1 | 8/2017 | Jung et al. |

FOREIGN PATENT DOCUMENTS

| | | | |
|---|---|---|---|
| CN | 105204144 A | 12/2015 | |
| CN | 205003346 U | 1/2016 | |
| JP | 1997090220 A | 4/1997 | |

\* cited by examiner

IMAGING OPTICAL LENS SYSTEM, IMAGE CAPTURING UNIT AND ELECTRONIC DEVICE

RELATED APPLICATIONS

This application is a continuation patent application of U.S. application Ser. No. 15/920,254, filed on Mar. 13, 2018, which is a divisional patent application of U.S. application Ser. No. 15/208,546, filed on Jul. 12, 2016, which claims priority to Taiwan Application 105112655, filed on Apr. 22, 2016, which is incorporated by reference herein in its entirety.

BACKGROUND

Technical Field

The present disclosure relates to an imaging optical lens system, an image capturing unit and an electronic device, more particularly to an imaging optical lens system and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

The wide-angle optical systems have been extensively applied to different kinds of electronic devices, such as smartphones, wearable devices, tablet personal computers, dashboard cameras, security surveillance cameras, drones and so on. However, the conventional wide-angle optical system is unable to satisfy the requirements of high image quality and a compact size simultaneously, and as a result being unsuitable for the use in miniaturized electronic devices. Thus, there is a need to develop an optical system featuring wide field of view and a compact size while forming high quality images.

SUMMARY

According to one aspect of the present disclosure, an imaging optical lens system includes, in order from an object side to an image side, a first lens element, a second lens element, a third lens element, a fourth lens element, a fifth lens element and a sixth lens element. The first lens element has negative refractive power. The second lens element has an object-side surface being concave in a paraxial region thereof and an image-side surface being convex in a paraxial region thereof. The third lens element has positive refractive power. The fourth lens element has positive refractive power. The fifth lens element has negative refractive power. The sixth lens element has positive refractive power. The imaging optical lens system has a total of six lens elements. When a focal length of the imaging optical lens system is f, a focal length of the second lens element is f2, a focal length of the third lens element is f3, a central thickness of the second lens element is CT2, a central thickness of the third lens element is CT3, an axial distance between the first lens element and the second lens element is T12, the following conditions are satisfied:

$-1.0 < f3/f2 < 1.50;$ $1.20 < CT2/CT3 < 7.50;$ and $0 < f/T12 < 1.35.$

According to another aspect of the present disclosure, an imaging optical lens system includes, in order from an object side to an image side, a first lens element, a second lens element, a third lens element, a fourth lens element, a fifth lens element and a sixth lens element. The first lens element has negative refractive power. The second lens element has an object-side surface being concave in a paraxial region thereof and an image-side surface being convex in a paraxial region thereof. The third lens element has positive refractive power. The fourth lens element has positive refractive power. The fifth lens element has negative refractive power. The sixth lens element has positive refractive power. The imaging optical lens system has a total of six lens elements. When a focal length of the imaging optical lens system is f, a focal length of the second lens element is f2, a focal length of the third lens element is f3, a central thickness of the second lens element is CT2, a central thickness of the third lens element is CT3, a central thickness of the fifth lens element is CT5, a central thickness of the sixth lens element is CT6, a curvature radius of an object-side surface of the fifth lens element is R9, a curvature radius of an image-side surface of the fifth lens element is R10, an axial distance between the first lens element and the second lens element is T12, the following conditions are satisfied:

$-1.0 < f3/f2 < 1.0;$ $0.80 < CT2/CT3 < 7.50;$ $0 < f/T12 < 1.50;$ $0.20 < CT6/CT5 < 7.0;$ and $-8.0 < (R9+R10)/(R9-R10) < 0.$ According to still another aspect of the present disclosure, an image capturing unit includes the aforementioned imaging optical lens system and an image sensor, wherein the image sensor is disposed on an image surface of the imaging optical lens system.

According to yet still another aspect of the present disclosure, an electronic device includes the aforementioned image capturing unit.

According to yet still another aspect of the present disclosure, an imaging optical lens system includes, in order from an object side to an image side, a first lens element, a second lens element, a third lens element, a fourth lens element, a fifth lens element and a sixth lens element. The first lens element has negative refractive power. The second lens element has an object-side surface being concave in a paraxial region thereof and an image-side surface being convex in a paraxial region thereof. The third lens element has positive refractive power. The fourth lens element with positive refractive power has an object-side surface being concave in a paraxial region thereof and an image-side surface being convex in a paraxial region thereof. The fifth lens element has negative refractive power. The sixth lens element has positive refractive power. The imaging optical lens system has a total of six lens elements, and the imaging optical lens system further comprises an aperture stop disposed between the second lens element and an image surface. When an axial distance between the aperture stop and the image surface is SL, an axial distance between an object-side surface of the first lens element and the image surface is TL, the following condition is satisfied:

0.20<SL/TL<0.70.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
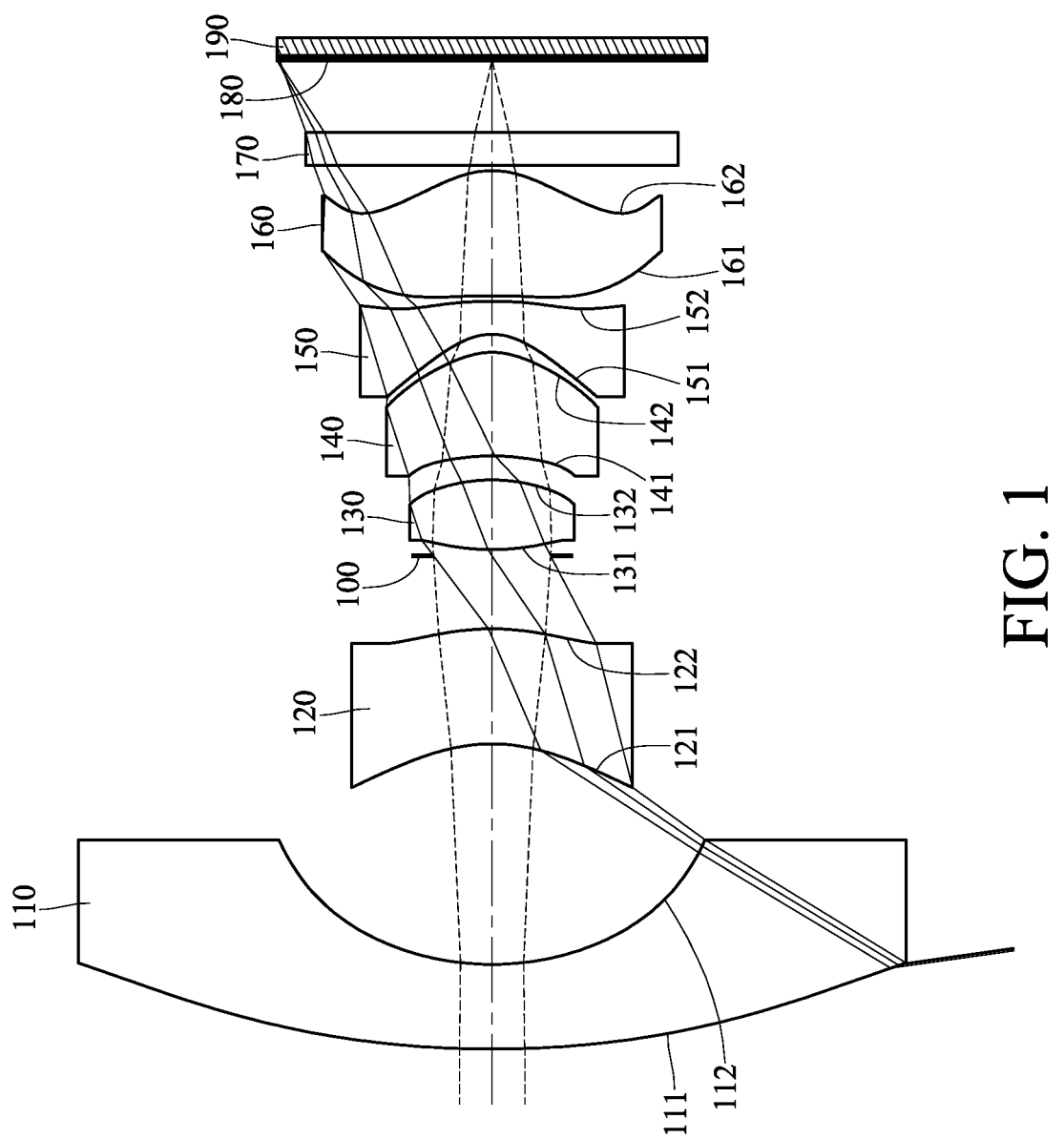
FIG. 1 is a schematic view of an image capturing unit according to the 1st embodiment of the present disclosure.

An imaging optical lens system includes, in order from an object side to an image side, a first lens element, a second lens element, a third lens element, a fourth lens element, a fifth lens element and a sixth lens element. The imaging optical lens system has a total of six lens elements.

There can be an air gap in a paraxial region between every two lens elements of the imaging optical lens system that are adjacent to each other; that is, each of the first through the sixth lens elements can be a single and non-cemented lens element. Due to the manufacturing process of the cemented lenses is more complex than the non-cemented lenses, particularly when an image-side surface of one lens element and an object-side surface of the following lens element need to have accurate curvature to ensure their highly cemented characteristic. However, during the cementing process, those two lens elements might not be highly cemented due to displacement and it is thereby not favorable for the image quality. Therefore, there can be an air gap in a paraxial region between every two lens elements of the imaging optical lens system that are adjacent to each other in the present disclosure for solving the problem generated by the cemented lens elements.

The first lens element has negative refractive power. Therefore, it is favorable for providing the imaging optical lens system with a retrofocus configuration for the light at large field of view to transmit into the imaging optical lens system.

The second lens element has an object-side surface being concave in a paraxial region thereof and an image-side surface being convex in a paraxial region thereof. Therefore, it is favorable for correcting aberrations generated by the first lens element with a large field of view and providing sufficient brightness at the peripheral region of the image.

The third lens element with positive refractive power can have an object-side surface being convex in a paraxial region thereof. Therefore, it is favorable for balancing the arrangement of the curvatures on the surfaces of the lens elements so as to improve the image quality.

The fourth lens element with positive refractive power can have an object-side surface being concave in a paraxial region thereof and an image-side surface being convex in a paraxial region thereof. Therefore, it is favorable for the third lens element and the fourth lens element to provide sufficient light convergence capability so as to reduce a total track length of the imaging optical lens system.

The fifth lens element has negative refractive power. Therefore, it is favorable for balancing the refractive power among the third lens element, the fourth lens element and the fifth lens element as well as correcting chromatic aberrations.

The sixth lens element has positive refractive power. Therefore, it is favorable for providing sufficient light convergence capability on the image side of the imaging optical lens system so as to enlarge the field of view. Furthermore, the sixth lens element can have an object-side surface being concave in a paraxial region thereof and an image side surface being convex in a paraxial region thereof so that it is favorable for correcting astigmatism while improving the image quality and keeping the imaging optical lens system compact. Moreover, the image side surface of the sixth lens element can have at least one concave shape in an off-axis region thereof so that it is favorable for reducing a back focal length of the imaging optical lens system, thereby correcting the Petzval sum.

When a focal length of the second lens element is f2, a focal length of the third lens element is f3, the following condition is satisfied: $-1.0<f3/f2<1.50$. Therefore, it is favorable for properly arranging the refractive power distribution among the second lens element and the third lens element so as to correct aberrations generated by the first lens element so while providing sufficient field for capturing image. Preferably, the following condition can also be satisfied: $-1.0<f3/f2<1.0$. More preferably, the following condition can also be satisfied: $-0.50<f3/f2<0.60$.

When a central thickness of the second lens element is CT2, a central thickness of the third lens element is CT3, the following condition is satisfied: $0.80<CT2/CT3<7.50$. Therefore, it is favorable for properly arranging the central thicknesses of the second lens element and the third lens element so as to reduce the sensitivity of the imaging optical lens system. Preferably, the following condition can also be satisfied: $1.20<CT2/CT3<7.50$.

When a focal length of the imaging optical lens system is f, an axial distance between the first lens element and the second lens element is T12, the following condition is satisfied: $0<f/T12<1.50$. Therefore, it is favorable for obtaining a lens configuration with large field of view and short focal length so as to correct axial chromatic aberration. Furthermore, it is favorable for arranging sufficient axial distance between the first lens element and the second lens element so as to obtain an easier assembling process. Preferably, the following condition can also be satisfied: $0<f/T12<1.35$. More preferably, the following condition can also be satisfied: $0<f/T12<0.80$.

When a central thickness of the fifth lens element is CT5, a central thickness of the sixth lens element is CT6, the following condition is satisfied: $0.20<CT6/CT5<7.0$. Therefore, it is favorable for properly arranging the central thicknesses of the fifth lens element and the sixth lens element so as to prevent the imbalance of the arrangement of the lens elements in the imaging optical lens system, thereby improving the image quality. Preferably, the following condition can also be satisfied: $0.20<CT6/CT5<6.50$.

When a curvature radius of an object-side surface of the fifth lens element is R9, a curvature radius of an image-side surface of the fifth lens element is R10, the following condition is satisfied: $-8.0<(R9+R10)/(R9-R10)<0$. Therefore, it is favorable for properly arranging the shape of the fifth lens element so as to reducing the total track length of the imaging optical lens system while providing sufficient negative refractive power for correcting chromatic aberrations. Preferably, the following condition can also be satisfied: $-2.3<(R9+R10)/(R9-R10)<0$.

According to the present disclosure, the imaging optical lens system can include an aperture stop disposed between the second lens element and an image surface. When an axial distance between the aperture stop and the image surface is SL, an axial distance between an object-side surface of the first lens element and the image surface is TL, the following condition is satisfied: $0.20<SL/TL<0.70$. Therefore, it is favorable for arranging the position of the aperture stop for the light at large field of view to transmit into the imaging optical lens system so as to improve the wide angle performance.

When an axial distance between the fourth lens element and the fifth lens element is T45, an axial distance between the fifth lens element and the sixth lens element is T56, the following condition can be satisfied: $0<T56/T45<5.5$. Therefore, it is favorable for arranging proper distances among the lens elements closer to the image side of the imaging optical lens system so as to easily assemble the lens elements, thereby increasing the manufacturing yield rate.

Figure 27:
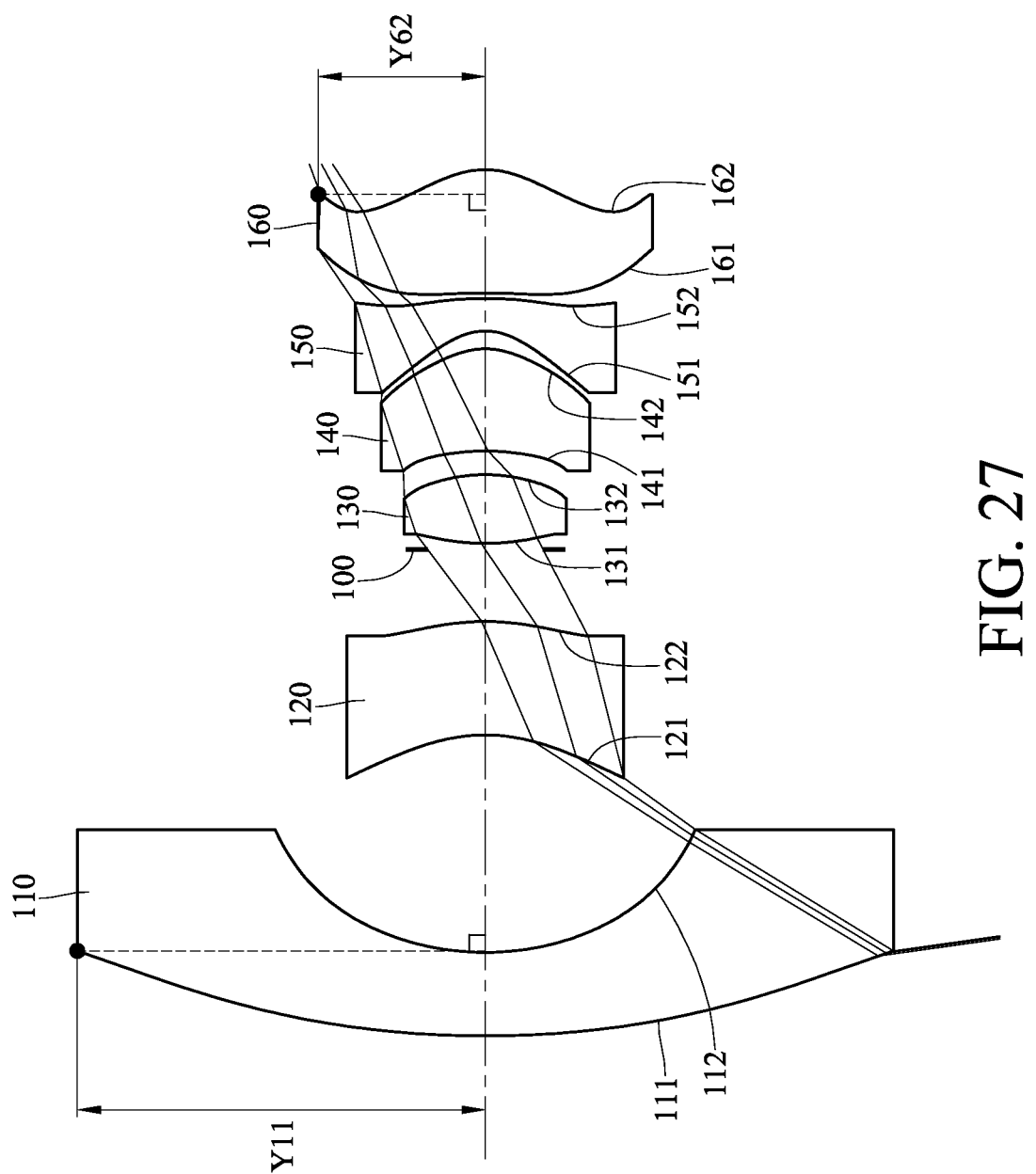
FIG. 27 is a schematic view of Y11 and Y62 according to the 1st embodiment.

When a maximum effective radius of the object-side surface of the first lens element is Y11, a maximum effective radius of the image-side surface of the sixth lens element is Y62, the following condition can be satisfied: $|Y62/Y11|<1.5$. Therefore, it is favorable for improve the retro-focus performance for the light at larger field of view to transmit into the imaging optical lens system. Preferably, the following condition can also be satisfied: $|Y62/Y11|<0.55$. As shown in FIG. 27 being a schematic view of Y11 and Y62 according to the 1st embodiment.

When half of a maximal field of view of the imaging optical lens system is HFOV, the following condition can be satisfied: $|1/\tan(HFOV)|<0.50$. Therefore, it is favorable for enlarging the field of view so that the imaging optical lens system becomes applicable to more applications.

When the central thickness of the second lens element is CT2, a curvature radius of the object-side surface of the second lens element is R3, a curvature radius of the image-side surface of the second lens element is R4, the following condition can be satisfied: $-2.5<(CT2/R3)+(CT2/R4)<-0.75$. Therefore, it is favorable for properly arranging the central thickness of the second lens element and the curvature on the surfaces thereof so as to increase the manufacturing yield rate and correct aberrations.

When a curvature radius of the object-side surface of the sixth lens element is R11, a curvature radius of the image-side surface of the sixth lens element is R12, the following condition can be satisfied: $0<(R11+R12)/(R11-R12)<5.5$. Therefore, it is favorable for arranging the shape of the sixth lens element so as to further enlarge the field of view and reduce the total track length.

According to the present disclosure, the lens elements of the imaging optical lens system can be made of glass or plastic material. When the lens elements are made of glass material, the refractive power distribution of the imaging optical lens system may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the imaging optical lens system can also be reduced.

According to the present disclosure, each of an object-side surface and an image-side surface has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the imaging optical lens system on the corresponding image sensor can be flat or curved, particularly a concave curved surface facing towards the object side of the imaging optical lens system.

According to the present disclosure, the imaging optical lens system can include at least one stop, such as an aperture stop, a glare stop or a field stop. Said glare stop or said field stop is allocated for eliminating the stray light and thereby improving the image quality thereof.

According to the present disclosure, an aperture stop can be adapted for a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the present disclosure, an image capturing unit includes the aforementioned imaging optical lens system and an image sensor, wherein the image sensor is disposed on the image side and can be located on or near an image surface of the aforementioned imaging optical lens system. In some embodiments, the image capturing unit can further include a barrel member, a holding member or a combination thereof.

Figure 28:
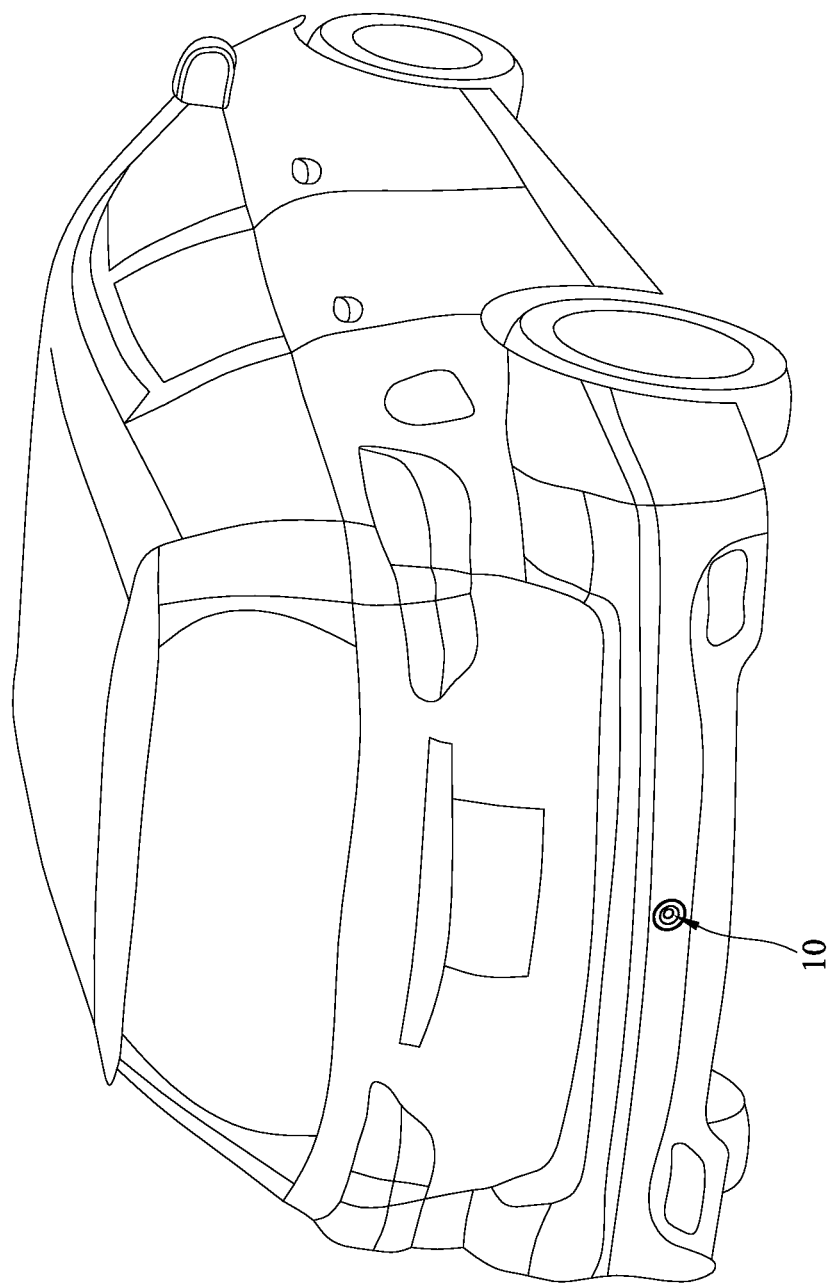
FIG. 28 shows an electronic device according to one embodiment.
Figure 29:
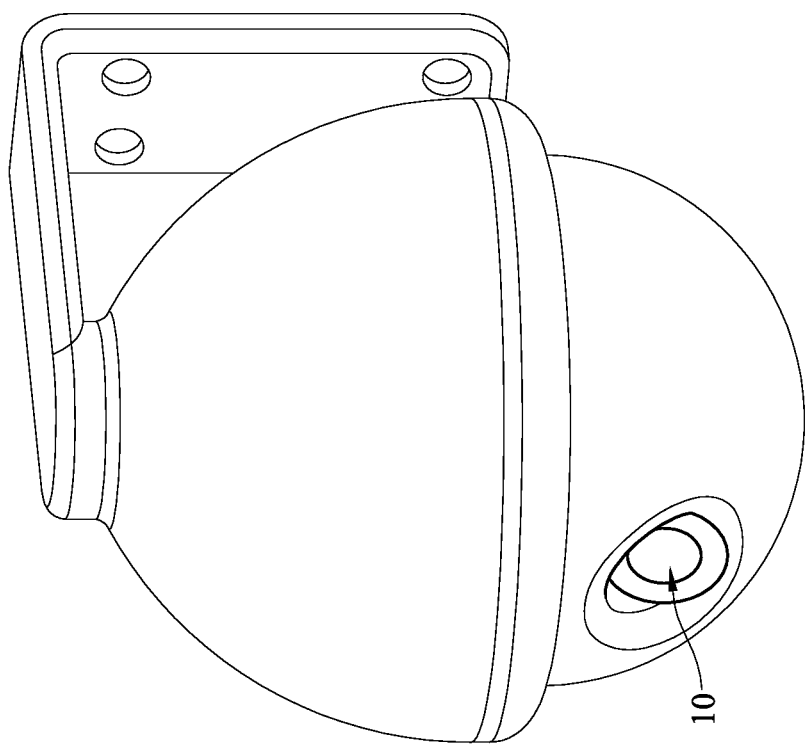
FIG. 29 shows an electronic device according to another embodiment.
Figure 30:
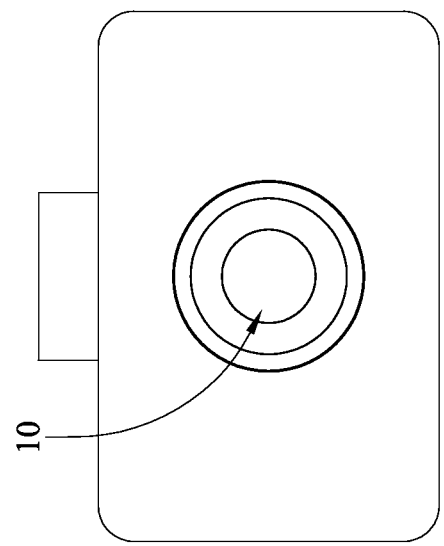
FIG. 30 shows an electronic device according to still another embodiment.

In FIG. 28, FIG. 29 and FIG. 30, an image capturing unit 10 may be installed in, but not limited to, an electronic device, including a vehicle backup camera (FIG. 28), a network surveillance device (FIG. 29) or a dashboard camera (FIG. 30). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the imaging optical lens system can be optionally applied to optical systems with a movable focus. Furthermore, the imaging optical lens system is featured with good capability in aberration corrections and high image quality, and can be applied to 3D (three-dimensional) image capturing applications, in products such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
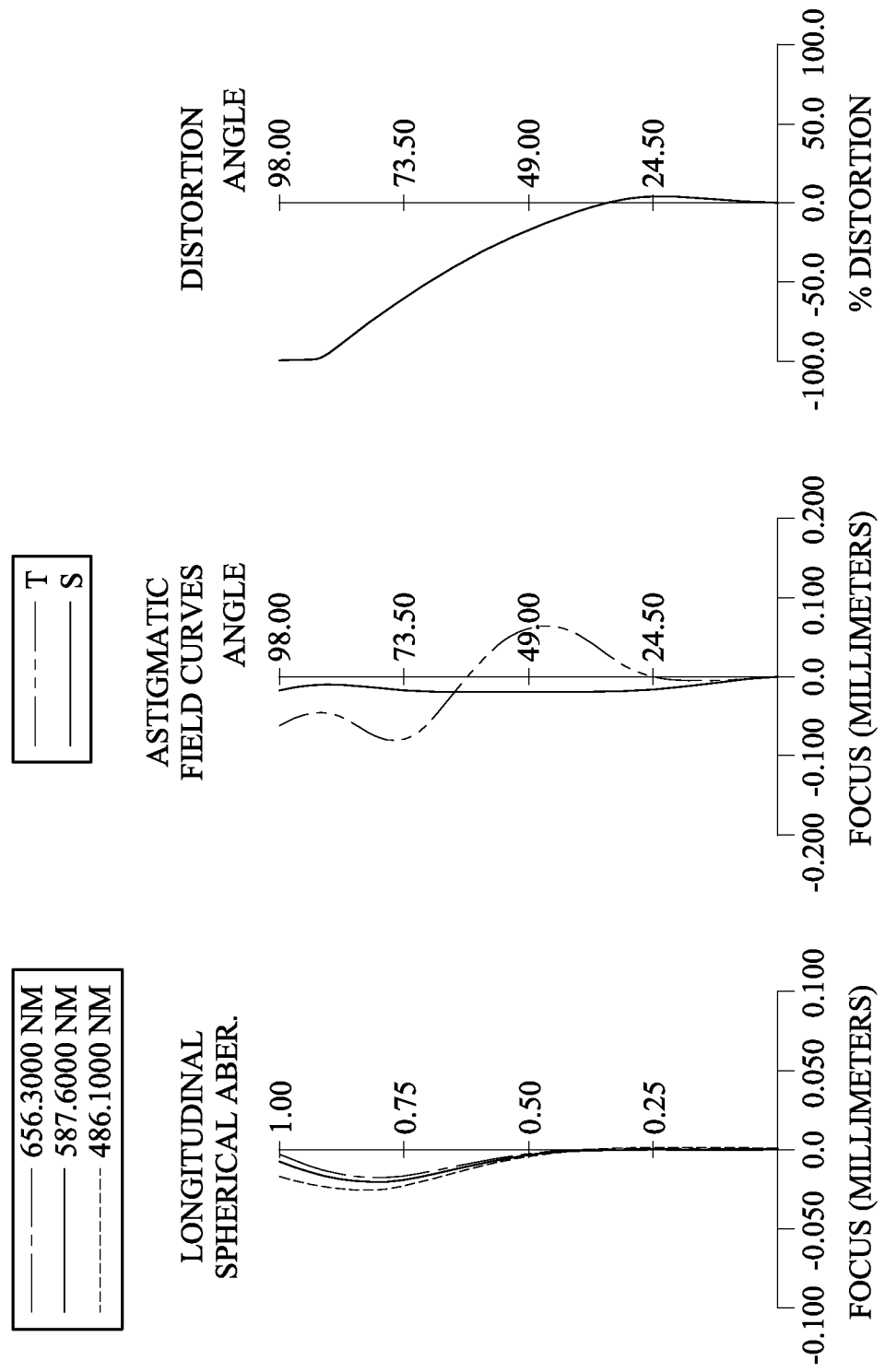
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging optical lens system (its reference numeral is omitted) of the present disclosure and an image sensor 190. The imaging optical lens system includes, in order from an object side to an image side, a first lens element 110, a second lens element 120, an aperture stop 100, a third lens element 130, a fourth lens element 140, a fifth lens element 150, a sixth lens element 160, an IR-cut filter 170 and an image surface 180, wherein the imaging optical lens system has a total of six lens elements (110-160).

The first lens element 110 with negative refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with positive refractive power has an object-side surface 161 being concave in a paraxial region thereof and an image-side surface 162 being convex in a paraxial region thereof. The sixth lens element 160 is made of plastic material and has the object-side surface 161 and the image-side surface 162 being both aspheric. The image-side surface 162 of the sixth lens element 160 has at least one concave shape in an off-axis region thereof.

The IR-cut filter 170 is made of glass material and located between the sixth lens element 160 and the image surface 180, and will not affect the focal length of the imaging optical lens system. The image sensor 190 is disposed on or near the image surface 180 of the imaging optical lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the imaging optical lens system of the image capturing unit according to the 1st embodiment, when a focal length of the imaging optical lens system is f, an f-number of the imaging optical lens system is Fno, and half of a maximal field of view of the imaging optical lens system is HFOV, these parameters have the following values: f=1.30 millimeters (mm); Fno=2.20; and HFOV=98.0 degrees (deg.).

When half of the maximal field of view of the imaging optical lens system is HFOV, the following condition is satisfied: |1/tan(HFOV)|=0.14.

When an axial distance between the fourth lens element 140 and the fifth lens element 150 is T45, an axial distance between the fifth lens element 150 and the sixth lens element 160 is T56, the following condition is satisfied: T56/T45=0.30.

When a central thickness of the second lens element 120 is CT2, a central thickness of the third lens element 130 is CT3, the following condition is satisfied: CT2/CT3=1.66.

When a central thickness of the fifth lens element 150 is CT5, a central thickness of the sixth lens element 160 is CT6, the following condition is satisfied: CT6/CT5=3.80.

When the central thickness of the second lens element 120 is CT2, a curvature radius of the object-side surface 121 of the second lens element 120 is R3, a curvature radius of the image-side surface 122 of the second lens element 120 is R4, the following condition is satisfied: (CT2/R3)+(CT2/R4)=−1.14.

When a curvature radius of the object-side surface 151 of the fifth lens element 150 is R9, a curvature radius of the image-side surface 152 of the fifth lens element 150 is R10, the following condition is satisfied: (R9+R10)/(R9−R10)=−1.29.

When a curvature radius of the object-side surface 161 of the sixth lens element 160 is R11, a curvature radius of the image-side surface 162 of the sixth lens element 160 is R12, the following condition is satisfied: (R11+R12)/(R11−R12)=1.32.

When the focal length of the imaging optical lens system is f, an axial distance between the first lens element 110 and the second lens element 120 is T12, the following condition is satisfied: f/T12=0.65.

When a focal length of the second lens element 120 is f2, a focal length of the third lens element 130 is f3, the following condition is satisfied: f3/f2=−0.06.

When an axial distance between the aperture stop 100 and the image surface 180 is SL, an axial distance between the object-side surface 111 of the first lens element 110 and the image surface 180 is TL, the following condition is satisfied: SL/TL=0.50.

When a maximum effective radius of the object-side surface 111 of the first lens element 110 is Y11, a maximum effective radius of the image-side surface 162 of the sixth lens element 160 is Y62, the following condition is satisfied: |Y62/Y11|=0.40.

The detailed optical data of the 1st embodiment are shown in Table 1 and the aspheric surface data are shown in Table 2 below.

TABLE 1

1st Embodiment f = 1.30 mm, Fno = 2.20, HFOV = 98.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 9.372 | (ASP) | 0.771 | Plastic | 1.535 | 55.8 | −6.75 |
| 2 | | 2.532 | (ASP) | 2.006 | | | | |
| 3 | Lens 2 | −1.599 | (ASP) | 1.048 | Plastic | 1.544 | 56.0 | −30.4 |
| 4 | | −2.178 | (ASP) | 0.665 | | | | |
| 5 | Ape. Stop | Plano | | 0.057 | | | | |
| 6 | Lens 3 | 2.346 | (ASP) | 0.633 | Plastic | 1.535 | 55.8 | 1.77 |
| 7 | | −1.438 | (ASP) | 0.219 | | | | |
| 8 | Lens 4 | −1.978 | (ASP) | 0.942 | Plastic | 1.535 | 55.8 | 1.52 |
| 9 | | −0.672 | (ASP) | 0.165 | | | | |
| 10 | Lens 5 | −0.520 | (ASP) | 0.300 | Plastic | 1.639 | 23.5 | −0.96 |
| 11 | | −4.119 | (ASP) | 0.050 | | | | |
| 12 | Lens 6 | −5.692 | (ASP) | 1.139 | Plastic | 1.544 | 56.0 | 1.56 |
| 13 | | −0.791 | (ASP) | 0.050 | | | | |
| 14 | IR-cut filter | Plano | | 0.300 | Glass | 1.517 | 64.2 | — |
| 15 | | Plano | | 0.650 | | | | |
| 16 | Image | Plano | | — | | | | |

Note:

Reference wavelength is 587.6 nm (d-line).

TABLE 2

Aspheric Coefficients

| Surface # | 1 | 2 | 3 | 4 | 6 | 7 |
|---|---|---|---|---|---|---|
| k = | −1.1333E+00 | 4.5695E−01 | −8.9258E−01 | −1.6234E+00 | −1.9949E+01 | −4.4921E+00 |
| A4 = | 1.0707E−03 | −5.3021E−03 | 4.6020E−02 | 8.6146E−02 | 2.5133E−01 | 6.2420E−02 |
| A6 = | −6.3694E−05 | 2.6378E−03 | 3.8413E−03 | −2.9275E−02 | −5.6453E−01 | −6.7775E−01 |
| A8 = | — | — | −2.7740E−03 | 4.2555E−02 | 1.7357E+00 | 1.6569E+00 |
| A10 = | — | — | 1.2395E−04 | −1.9429E−02 | −4.8970E+00 | −3.5854E+00 |
| A12 = | — | — | — | — | 4.2472E+00 | 2.3244E+00 |

| Surface # | 8 | 9 | 10 | 11 | 12 | 13 |
|---|---|---|---|---|---|---|
| k = | −5.7012E+00 | −1.6815E+00 | −1.1763E+00 | 3.4876E+00 | 4.1727E+00 | −1.8571E+00 |
| A4 = | 1.6563E−01 | 4.1948E−01 | 4.8429E−01 | −2.1619E−01 | 1.5376E−01 | 1.4973E−01 |
| A6 = | −5.7413E−01 | −4.6713E−01 | −4.2238E−01 | 6.4159E−01 | 2.6768E−02 | 9.7320E−02 |
| A8 = | −4.2888E−02 | −5.6339E−01 | 2.8142E−01 | −4.8961E−01 | −4.7176E−02 | −2.3960E−01 |
| A10 = | −2.6358E−02 | 1.2353E+00 | −1.1807E−01 | 1.4476E−01 | 1.3688E−02 | 1.8413E−01 |
| A12 = | — | −6.0106E−01 | — | −1.1450E−02 | 1.3112E−03 | −5.6926E−02 |
| A14 = | — | — | — | — | −8.2218E−04 | 5.9674E−03 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A14 represent the aspheric coefficients ranging from the 4th order to the 14th order. The tables presented below for each embodiment are the corresponding schematic parameter and aberration curves, and the definitions of the terms in the tables are the same as Table 1 and Table 2 of the 1st embodiment. Therefore, an explanation in this regard will not be provided again.

2nd Embodiment

Figure 3:
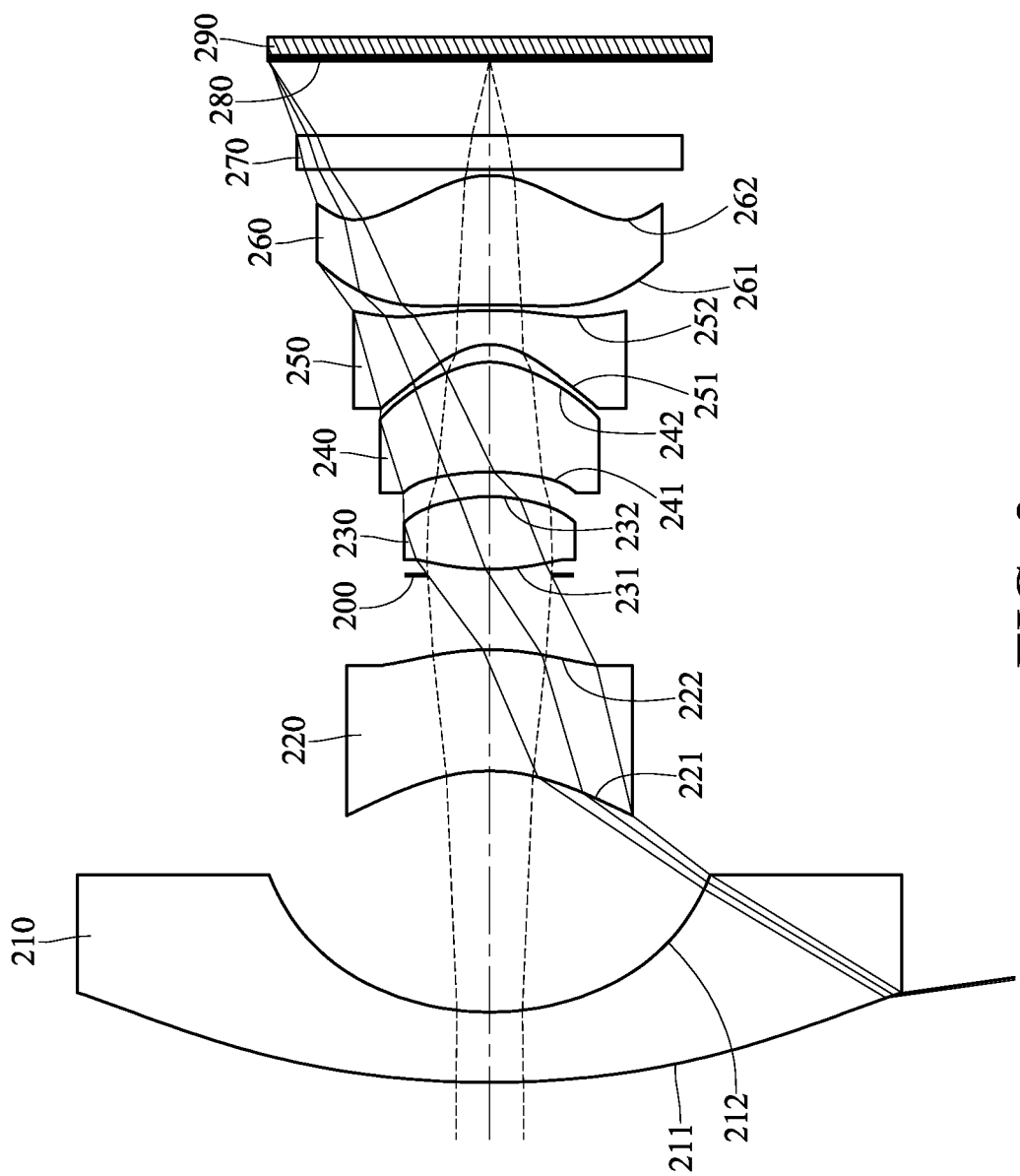
FIG. 3 is a schematic view of an image capturing unit according to the 2nd embodiment of the present disclosure.
Figure 4:
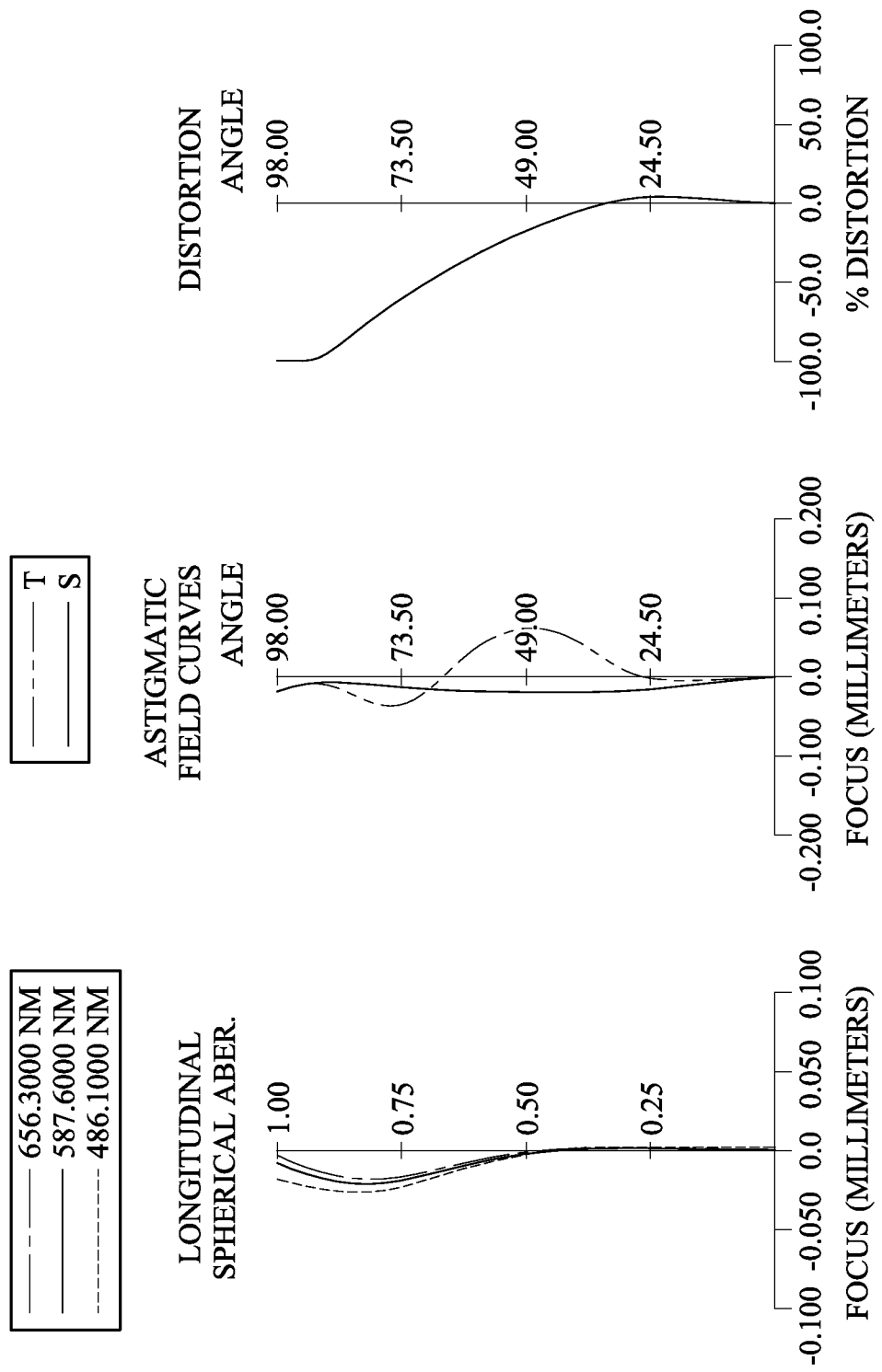
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging optical lens system (its reference numeral is omitted) of the present disclosure and an image sensor 290. The imaging optical lens system includes, in order from an object side to an image side, a first lens element 210, a second lens element 220, an aperture stop 200, a third lens element 230, a fourth lens element 240, a fifth lens element 250, a sixth lens element 260, an IR-cut filter 270 and an image surface 280, wherein the imaging optical lens system has a total of six lens elements (210-260).

The first lens element 210 with negative refractive power has an object-side surface being 211 convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with positive refractive power has an object-side surface 261 being concave in a paraxial region thereof and an image-side surface 262 being convex in a paraxial region thereof. The sixth lens element 260 is made of plastic material and has the object-side surface 261 and the image-side surface 262 being both aspheric. The image-side surface 262 of the sixth lens element 260 has at least one concave shape in an off-axis region thereof.

The IR-cut filter 270 is made of glass material and located between the sixth lens element 260 and the image surface 280, and will not affect the focal length of the imaging optical lens system. The image sensor 290 is disposed on or near the image surface 280 of the imaging optical lens system.

The detailed optical data of the 2nd embodiment are shown in Table 3 and the aspheric surface data are shown in Table 4 below.

TABLE 3

2nd Embodiment
f = 1.30 mm, Fno = 2.20, HFOV = 98.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 8.616 (ASP) | 0.619 | Plastic | 1.535 | 55.8 | −6.65 |
| 2 | | 2.456 (ASP) | 2.125 | | | | |
| 3 | Lens 2 | −1.596 (ASP) | 1.069 | Plastic | 1.544 | 56.0 | −31.92 |
| 4 | | −2.173 (ASP) | 0.655 | | | | |
| 5 | Ape. Stop | Plano | 0.054 | | | | |
| 6 | Lens 3 | 2.350 (ASP) | 0.639 | Plastic | 1.535 | 55.8 | 1.77 |
| 7 | | −1.432 (ASP) | 0.218 | | | | |
| 8 | Lens 4 | −2.050 (ASP) | 0.967 | Plastic | 1.535 | 55.8 | 1.53 |
| 9 | | −0.680 (ASP) | 0.156 | | | | |
| 10 | Lens 5 | −0.528 (ASP) | 0.300 | Plastic | 1.639 | 23.5 | −0.95 |
| 11 | | −4.884 (ASP) | 0.050 | | | | |
| 12 | Lens 6 | −5.850 (ASP) | 1.139 | Plastic | 1.544 | 56.0 | 1.59 |
| 13 | | −0.803 (ASP) | 0.052 | | | | |
| 14 | IR-cut filter | Plano | 0.300 | Glass | 1.517 | 64.2 | — |
| 15 | | Plano | 0.656 | | | | |
| 16 | Image | Plano | — | | | | |

Note:
Reference wavelength is 587.6 nm (d-line).

TABLE 4

Aspheric Coefficients

| Surface # | 1 | 2 | 3 | 4 | 6 | 7 |
|---|---|---|---|---|---|---|
| k = | −4.8872E−01 | 4.1572E−01 | −8.6027E−01 | −1.5523E+00 | −1.9960E+01 | −4.4924E+00 |
| A4 = | 1.2584E−03 | −5.8749E−03 | 4.4495E−02 | 8.3941E−02 | 2.5185E−01 | 6.6536E−02 |
| A6 = | −9.1576E−05 | 2.7724E−03 | 4.6145E−03 | −2.5457E−02 | −5.4369E−01 | −6.8321E−01 |
| A8 = | — | — | −2.4046E−03 | 4.0628E−02 | 1.5069E+00 | 1.4822E+00 |
| A10 = | — | — | −1.1564E−04 | −2.0448E−02 | −4.0096E+00 | −2.9408E+00 |
| A12 = | — | — | — | — | 3.1105E+00 | 1.7176E+00 |

| Surface # | 8 | 9 | 10 | 11 | 12 | 13 |
|---|---|---|---|---|---|---|
| k = | −5.7045E+00 | −1.6796E+00 | −1.1768E+00 | 4.3340E+00 | 6.0663E+00 | −1.8537E+00 |
| A4 = | 1.7037E−01 | 4.3304E−01 | 4.8987E−01 | −2.2273E−01 | 1.4113E−01 | 1.5232E−01 |
| A6 = | −5.9222E−01 | −5.6695E−01 | −4.5409E−01 | 6.7460E−01 | 6.3765E−02 | 8.3775E−02 |
| A8 = | −3.9692E−02 | −3.1208E−01 | 3.3865E−01 | −5.4249E−01 | −8.9602E−02 | −2.2716E−01 |
| A10 = | 1.7446E−03 | 9.6137E−01 | −1.4937E−01 | 1.7902E−01 | 3.7543E−02 | 1.7964E−01 |
| A12 = | — | −4.9276E−01 | — | −1.9459E−02 | −5.3096E−03 | −5.6933E−02 |
| A14 = | — | — | — | — | −1.1216E−04 | 6.1534E−03 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.30 | (CT2/R3) + (CT2/R4) | −1.16 |
| Fno | 2.20 | (R9 + R10)/(R9 − R10) | −1.24 |
| HFOV [deg.] | 98.0 | (R11 + R12)/(R11 − R12) | 1.32 |
| |1/tan(HFOV)| | 0.14 | f/T12 | 0.61 |
| T56/T45 | 0.32 | f3/f2 | −0.06 |
| CT2/CT3 | 1.67 | SL/TL | 0.50 |
| CT6/CT5 | 3.80 | |Y62/Y11| | 0.42 |

3rd Embodiment

Figure 5:
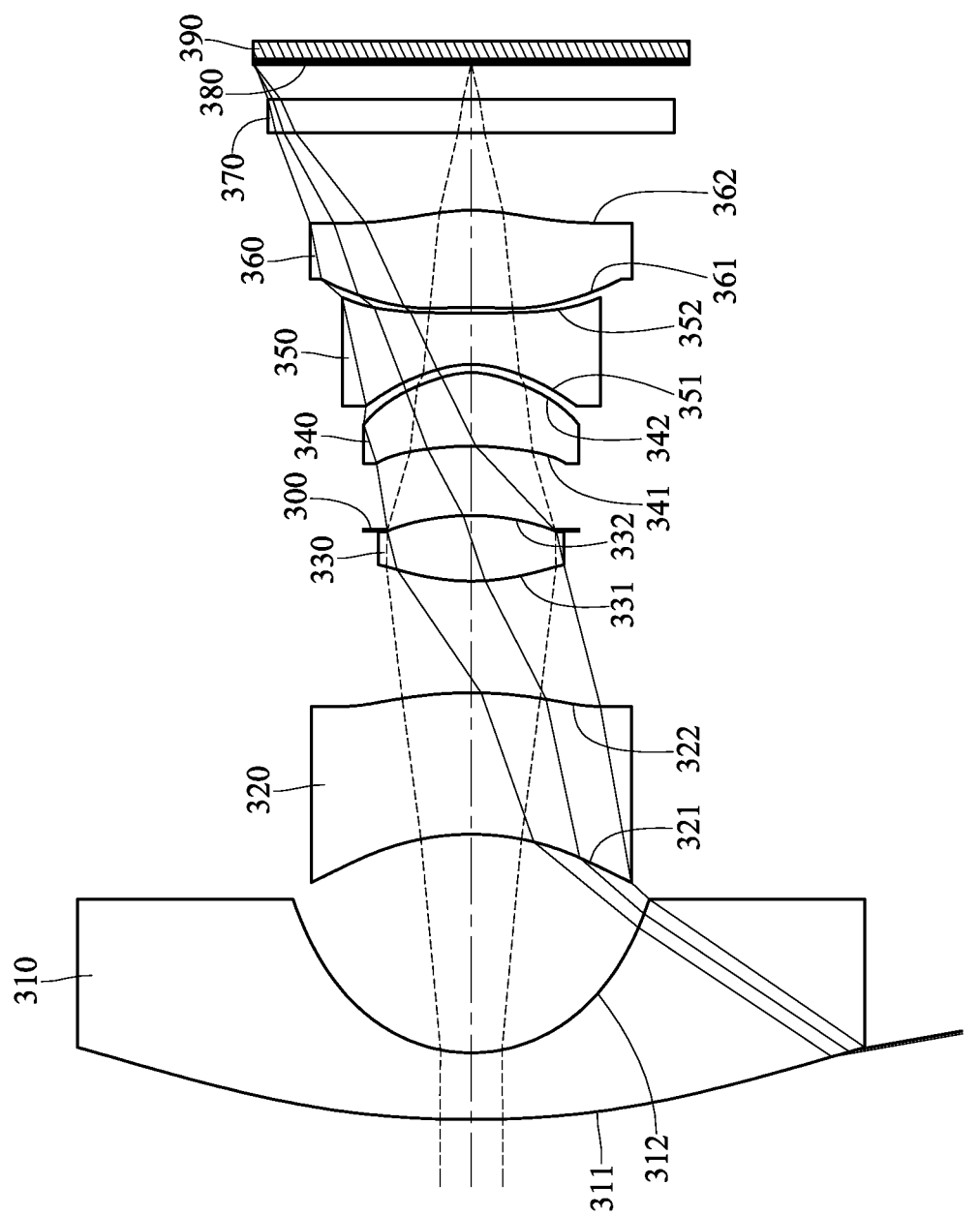
FIG. 5 is a schematic view of an image capturing unit according to the 3rd embodiment of the present disclosure.
Figure 6:
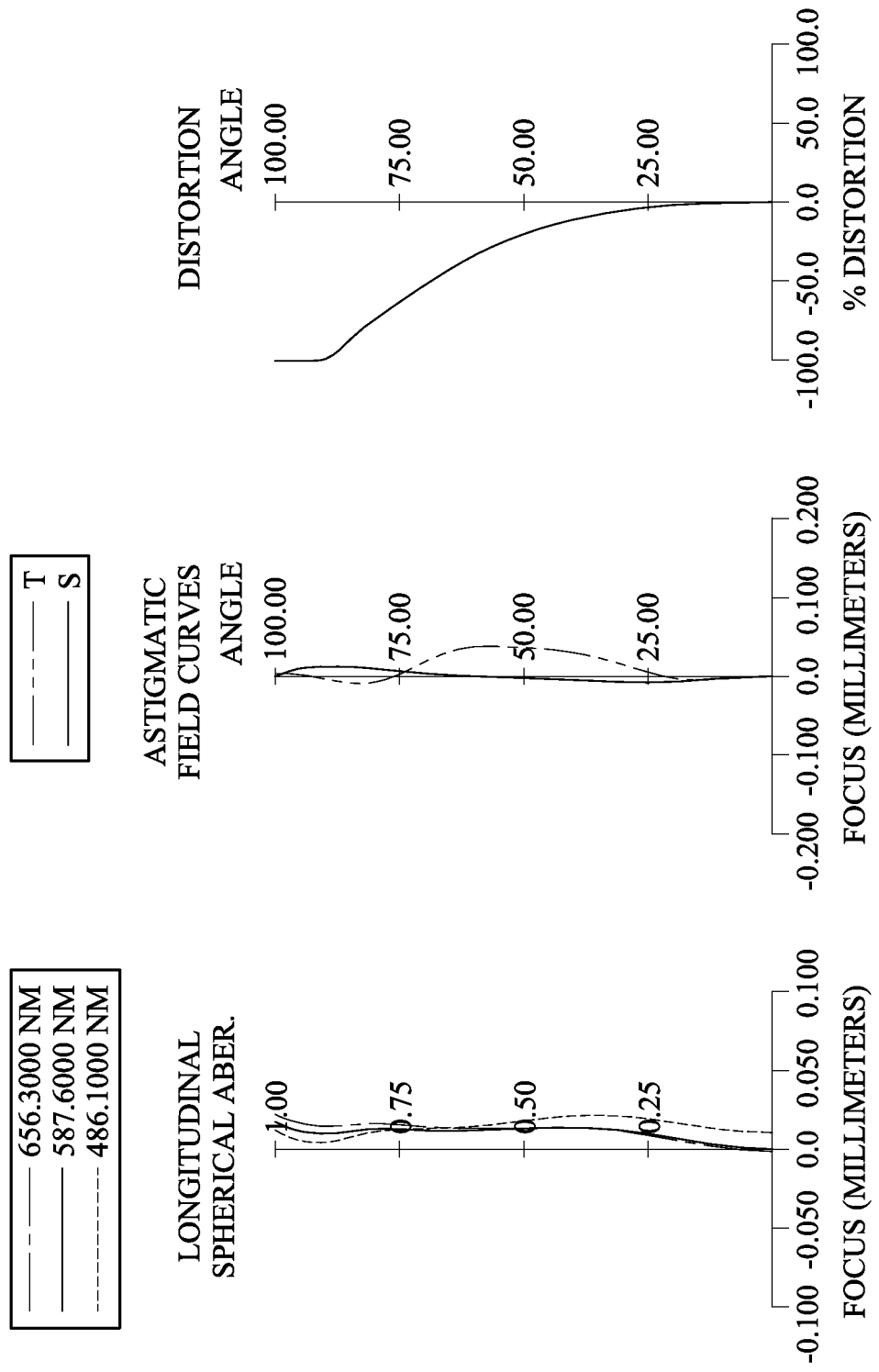
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging optical lens system (its reference numeral is omitted) of the present disclosure and an image sensor 390. The imaging optical lens system includes, in order from an object side to an image side, a first lens element 310, a second lens element 320, a third lens element 330, an aperture stop 300, a fourth lens element 340, a fifth lens element 350, a sixth lens element 360, an IR-cut filter 370 and an image surface 380, wherein the imaging optical lens system has a total of six lens elements (310-360).

The first lens element 310 with negative refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with positive refractive power has an object-side surface 361 being concave in a paraxial region thereof and an image-side surface 362 being convex in a paraxial region thereof. The sixth lens element 360 is made of plastic material and has the object-side surface 361 and the image-side surface 362 being both aspheric. The image-side surface 362 of the sixth lens element 360 has at least one concave shape in an off-axis region thereof.

The IR-cut filter 370 is made of glass material and located between the sixth lens element 360 and the image surface 380, and will not affect the focal length of the imaging optical lens system. The image sensor 390 is disposed on or near the image surface 380 of the imaging optical lens system.

The detailed optical data of the 3rd embodiment are shown in Table 5 and the aspheric surface data are shown in Table 6 below.

TABLE 5

3rd Embodiment
f = 1.25 mm, Fno = 2.20, HFOV = 100.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 9.505 (ASP) | 0.600 | Plastic | 1.544 | 55.9 | −3.16 |
| 2 | | 1.422 (ASP) | 1.966 | | | | |
| 3 | Lens 2 | −2.330 (ASP) | 1.272 | Plastic | 1.639 | 23.3 | −15.29 |
| 4 | | −3.710 (ASP) | 1.005 | | | | |
| 5 | Lens 3 | 2.027 (ASP) | 0.590 | Plastic | 1.544 | 55.9 | 2.00 |
| 6 | | −2.111 (ASP) | −0.135 | | | | |
| 7 | Ape. Stop | Plano | 0.758 | | | | |
| 8 | Lens 4 | −2.811 (ASP) | 0.662 | Plastic | 1.544 | 55.9 | 1.63 |
| 9 | | −0.730 (ASP) | 0.074 | | | | |
| 10 | Lens 5 | −0.911 (ASP) | 0.465 | Plastic | 1.660 | 20.4 | −1.41 |
| 11 | | −47.461 (ASP) | 0.050 | | | | |
| 12 | Lens 6 | −3.131 (ASP) | 0.870 | Plastic | 1.544 | 55.9 | 6.19 |
| 13 | | −1.781 (ASP) | 0.700 | | | | |
| 14 | IR-cut filter | Plano | 0.300 | Glass | 1.517 | 64.2 | — |
| 15 | | Plano | 0.310 | | | | |
| 16 | Image | Plano | — | | | | |

Note:
Reference wavelength is 587.6 nm (d-line).

TABLE 6

Aspheric Coefficients

| Surface # | 1 | 2 | 3 | 4 | 5 | 6 |
|---|---|---|---|---|---|---|
| k = | −2.4560E−01 | −3.5482E−01 | −2.8311E−01 | 4.8135E−01 | −8.4992E+00 | −1.4113E+01 |
| A4 = | 3.0401E−03 | 4.2970E−03 | −6.6808E−04 | 1.5692E−02 | 7.9332E−02 | −1.5916E−01 |
| A6 = | −6.1081E−04 | 6.7695E−03 | −1.6167E−02 | −1.5204E−02 | −9.4550E−03 | 1.6068E−01 |
| A8 = | 4.2464E−05 | −1.5479E−04 | 2.2608E−02 | 4.5301E−02 | −2.7974E−01 | −1.9548E−01 |
| A10 = | −1.1308E−06 | −1.2787E−04 | −7.7159E−03 | −2.9029E−02 | 5.0778E−01 | 1.0185E−01 |
| A12 = | — | — | 8.9159E−04 | 9.2632E−03 | −3.8331E−01 | −6.5929E−02 |

| Surface # | 8 | 9 | 10 | 11 | 12 | 13 |
|---|---|---|---|---|---|---|
| k = | −2.8692E+01 | −1.9163E+00 | −1.0327E+00 | −3.3112E+01 | −9.0000E+01 | −1.0047E+01 |
| A4 = | −8.2777E−02 | 7.6689E−01 | 5.9848E−01 | 1.3780E−01 | 5.1984E−01 | 1.1660E−01 |
| A6 = | 2.7059E−01 | −1.7877E+00 | −1.3240E+00 | −1.0156E−01 | −6.8918E−01 | −2.3969E−02 |
| A8 = | −1.0401E+00 | 1.6574E+00 | 1.5062E+00 | 6.2101E−02 | 5.6608E−01 | −3.4978E−02 |
| A10 = | 1.3013E+00 | −6.8816E−01 | −7.7505E−01 | −1.3960E−04 | −2.9033E−01 | 3.1574E−02 |
| A12 = | −6.8491E−01 | 5.3425E−02 | 1.2058E−01 | −8.8703E−03 | 8.5420E−02 | −1.2138E−02 |
| A14 = | — | — | — | — | −1.0882E−02 | 1.9390E−03 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.25 | (CT2/R3) + (CT2/R4) | −0.89 |
| Fno | 2.20 | (R9 + R10)/(R9 − R10) | −1.04 |
| HFOV [deg.] | 100.0 | (R11 + R12)/(R11 − R12) | 3.64 |
| \|1/tan(HFOV)\| | 0.18 | f/T12 | 0.63 |
| T56/T45 | 0.68 | f3/f2 | −0.13 |
| CT2/CT3 | 2.16 | SL/TL | 0.44 |
| CT6/CT5 | 1.87 | \|Y62/Y11\| | 0.41 |

4th Embodiment

Figure 7:
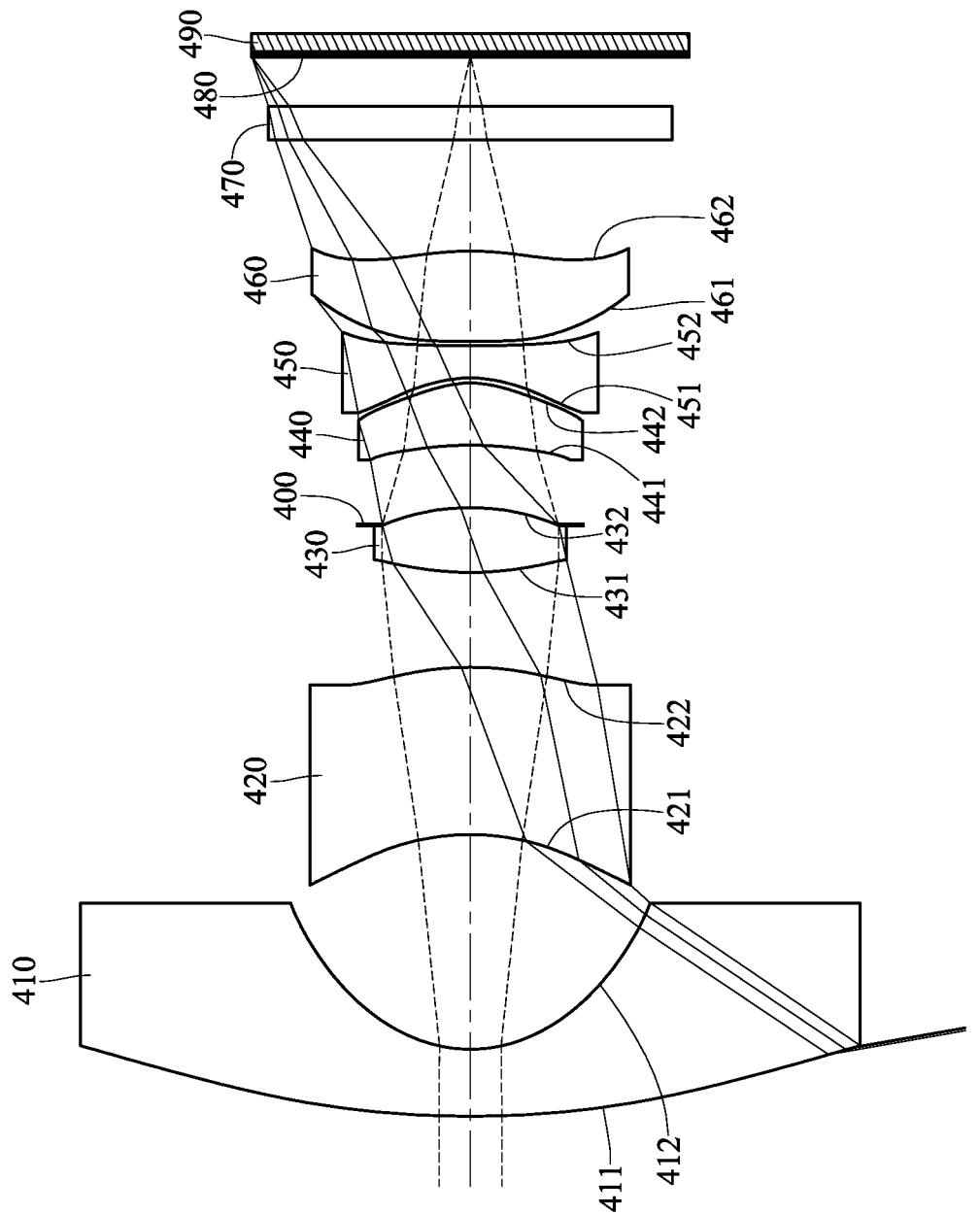
FIG. 7 is a schematic view of an image capturing unit according to the 4th embodiment of the present disclosure.
Figure 8:
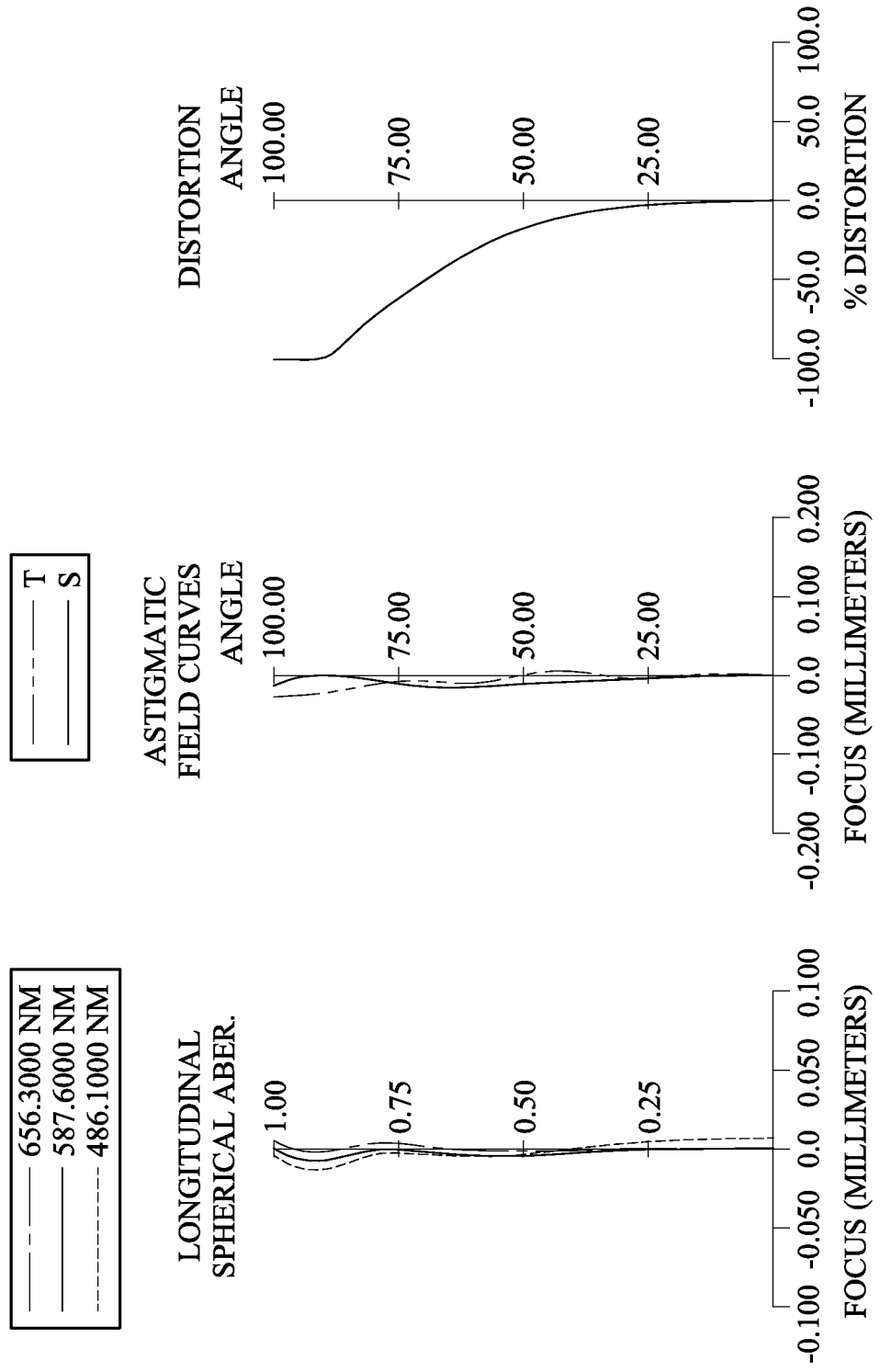
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging optical lens system (its reference numeral is omitted) of the present disclosure and an image sensor 490. The imaging optical lens system includes, in order from an object side to an image side, a first lens element 410, a second lens element 420, a third lens element 430, an aperture stop 400, a fourth lens element 440, a fifth lens element 450, a sixth lens element 460, a IR-cut filter 470 and an image surface 480, wherein the imaging optical lens system has a total of six lens elements (410-460).

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being concave in a paraxial region thereof. The fifth lens element 450 is made of plastic material and has the object-side surface 451 and the image-side surface 452 being both aspheric.

The sixth lens element 460 with positive refractive power has an object-side surface 461 being concave in a paraxial region thereof and an image-side surface 462 being convex in a paraxial region thereof. The sixth lens element 460 is made of plastic material and has the object-side surface 461 and the image-side surface 462 being both aspheric. The image-side surface 462 of the sixth lens element 460 has at least one concave shape in an off-axis region thereof.

The IR-cut filter 470 is made of glass material and located between the sixth lens element 460 and the image surface 480, and will not affect the focal length of the imaging optical lens system. The image sensor 490 is disposed on or near the image surface 480 of the imaging optical lens system.

The detailed optical data of the 4th embodiment are shown in Table 7 and the aspheric surface data are shown in Table 8 below.

TABLE 7

4th Embodiment
f = 1.24 mm, Fno = 2.20, HFOV = 100.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 9.413 (ASP) | 0.600 | Plastic | 1.544 | 55.9 | −2.81 |
| 2 | | 1.286 (ASP) | 1.922 | | | | |
| 3 | Lens 2 | −2.240 (ASP) | 1.500 | Plastic | 1.639 | 23.3 | 42.25 |
| 4 | | −2.608 (ASP) | 0.849 | | | | |
| 5 | Lens 3 | 2.859 (ASP) | 0.579 | Plastic | 1.544 | 55.9 | 2.33 |
| 6 | | −2.104 (ASP) | −0.155 | | | | |
| 7 | Ape. Stop | Plano | 0.716 | | | | |
| 8 | Lens 4 | −2.983 (ASP) | 0.556 | Plastic | 1.544 | 55.9 | 2.07 |
| 9 | | −0.870 (ASP) | 0.045 | | | | |
| 10 | Lens 5 | −1.107 (ASP) | 0.289 | Plastic | 1.660 | 20.4 | −1.57 |
| 11 | | 17.868 (ASP) | 0.042 | | | | |
| 12 | Lens 6 | −17.259 (ASP) | 0.805 | Plastic | 1.544 | 55.9 | 5.64 |
| 13 | | −2.645 (ASP) | 1.000 | | | | |

TABLE 7-continued

4th Embodiment
f = 1.24 mm, Fno = 2.20, HFOV = 100.0 deg.

| Surface # | | Curvature Radius | Thickness | Material | Index | Abbe # | Focal Length |
|---|---|---|---|---|---|---|---|
| 14 | IR-cut filter | Plano | 0.300 | Glass | 1.517 | 64.2 | — |
| 15 | | Plano | 0.440 | | | | |
| 16 | Image | Plano | — | — | | | |

Note:
Reference wavelength is 587.6 nm (d-line).

TABLE 8

| Aspheric Coefficients | | | | | | |
|---|---|---|---|---|---|---|
| Surface # | 1 | 2 | 3 | 4 | 5 | 6 |
| k = | −4.5331E−01 | −4.2807E−01 | −2.7480E−01 | −2.2372E+00 | −1.0109E+01 | −1.1342E+01 |
| A4 = | 2.9919E−03 | −4.5597E−03 | −3.6969E−02 | 5.8007E−03 | 1.9953E−02 | −1.8338E−01 |
| A6 = | −6.1321E−04 | −8.2262E−03 | 2.9598E−02 | 2.3265E−02 | 4.3551E−02 | 2.0031E−01 |
| A8 = | 4.2433E−05 | 4.8312E−03 | 3.8037E−03 | 7.8159E−03 | −1.5690E−01 | −1.5988E−01 |
| A10 = | −1.1064E−06 | −2.1728E−03 | −5.1683E−03 | −8.5664E−03 | 2.3395E−01 | 2.2522E−02 |
| A12 = | — | — | 8.9896E−04 | 5.1265E−03 | −1.7660E−01 | −5.3636E−03 |
| Surface # | 8 | 9 | 10 | 11 | 12 | 13 |
| k = | −1.7884E+00 | −2.8543E+00 | −1.2180E+00 | −3.3112E+01 | −9.0000E+01 | −1.0047E+01 |
| A4 = | 9.6899E−03 | 5.0871E−01 | 4.5497E−01 | 7.7111E−02 | 4.6102E−01 | 5.4581E−02 |
| A6 = | 1.8496E−01 | −1.2960E+00 | −1.4942E+00 | −1.6968E−01 | −5.4704E−01 | 3.4272E−02 |
| A8 = | −1.8385E−01 | 1.8135E+00 | 2.4480E+00 | 2.4522E−01 | 4.3032E−01 | 1.0845E−02 |
| A10 = | −1.6563E−01 | −1.2768E+00 | −1.7043E+00 | −1.2730E−01 | −2.1227E−01 | −5.4160E−02 |
| A12 = | 1.0102E−01 | 3.1478E−01 | 4.1829E−01 | 2.0458E−02 | 6.0712E−02 | 3.4556E−02 |
| A14 = | — | — | — | — | −7.6500E−03 | −6.7148E−03 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.24 | (CT2/R3) + (CT2/R4) | −1.24 |
| Fno | 2.20 | (R9 + R10)/(R9 − R10) | −0.88 |
| HFOV [deg.] | 100.0 | (R11 + R12)/(R11 − R12) | 1.36 |
| |1/tan(HFOV)| | 0.18 | f/T12 | 0.65 |
| T56/T45 | 0.93 | f3/f2 | 0.06 |
| CT2/CT3 | 2.59 | SL/TL | 0.44 |
| CT6/CT5 | 2.79 | |Y62/Y11| | 0.41 |

5th Embodiment

Figure 9:
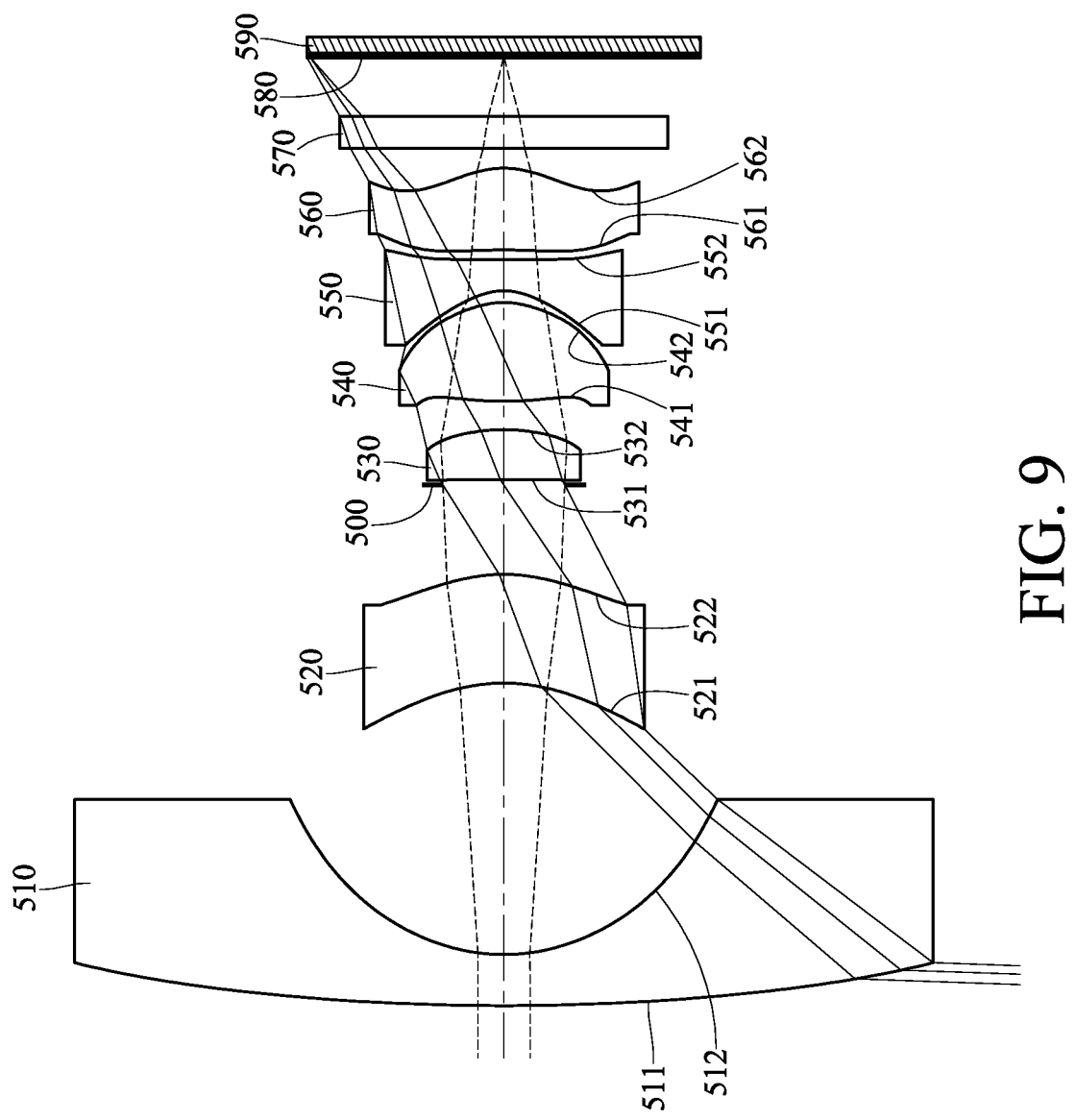
FIG. 9 is a schematic view of an image capturing unit according to the 5th embodiment of the present disclosure.
Figure 10:
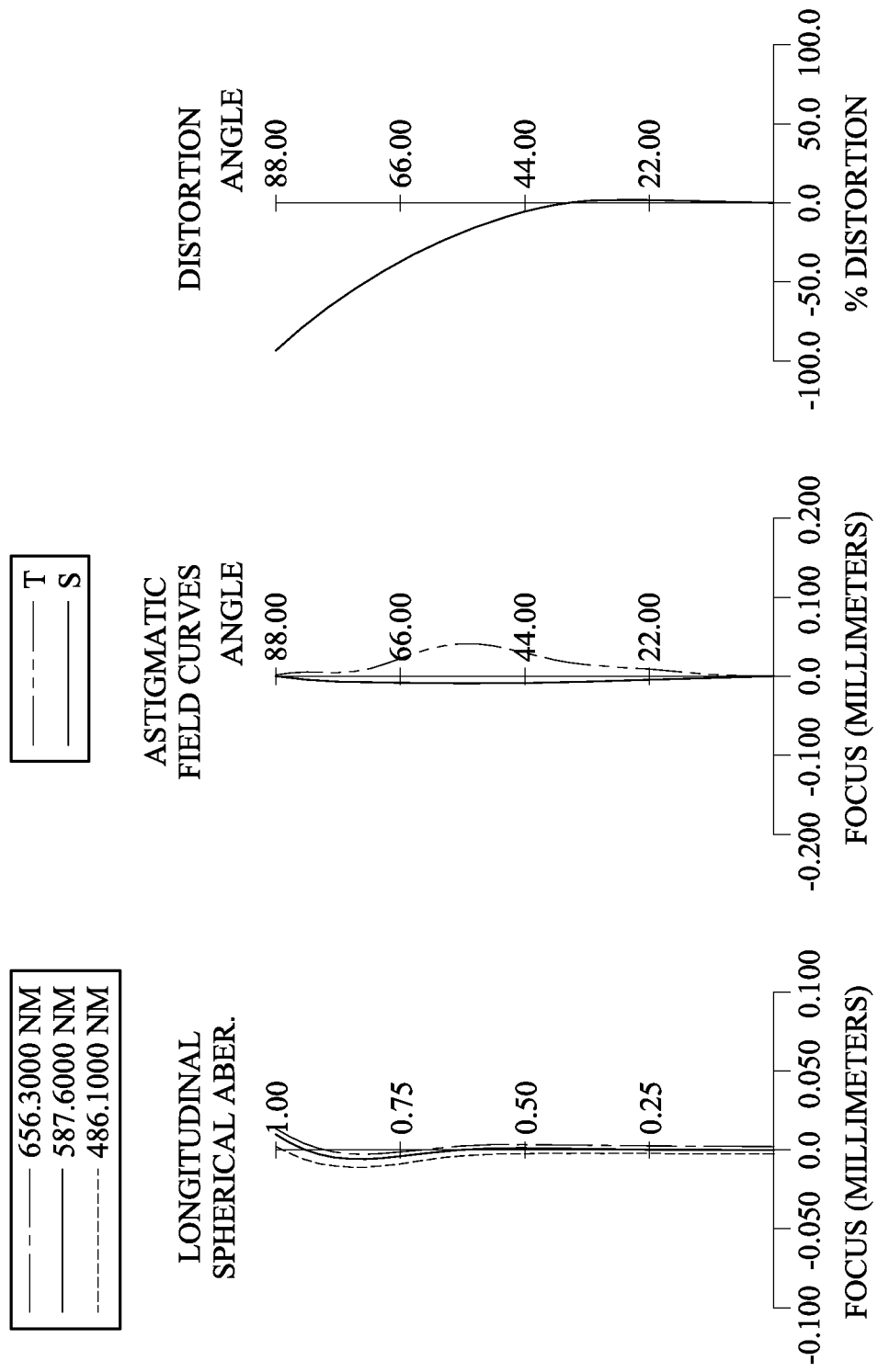
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging optical lens system (its reference numeral is omitted) of the present disclosure and an image sensor 590. The imaging optical lens system includes, in order from an object side to an image side, a first lens element 510, a second lens element 520, an aperture stop 500, a third lens element 530, a fourth lens element 540, a fifth lens element 550, a sixth lens element 560, an IR-cut filter 570 and an image surface 580, wherein the imaging optical lens system has a total of six lens elements (510-560).

The first lens element 510 with negative refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric.

The sixth lens element 560 with positive refractive power has an object-side surface 561 being concave in a paraxial region thereof and an image-side surface 562 being convex in a paraxial region thereof. The sixth lens element 560 is made of plastic material and has the object-side surface 561 and the image-side surface 562 being both aspheric. The image-side surface 562 of the sixth lens element 560 has at least one concave shape in an off-axis region thereof.

The IR-cut filter 570 is made of glass material and located between the sixth lens element 560 and the image surface 580, and will not affect the focal length of the imaging optical lens system. The image sensor 590 is disposed on or near the image surface 580 of the imaging optical lens system.

The detailed optical data of the 5th embodiment are shown in Table 9 and the aspheric surface data are shown in Table 10 below.

TABLE 9

5th Embodiment
f = 1.00 mm, Fno = 2.00, HFOV = 88.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 23.413 (ASP) | 0.490 | Plastic | 1.535 | 55.8 | −3.82 |
| 2 | | 1.864 (ASP) | 2.604 | | | | |
| 3 | Lens 2 | −1.740 (ASP) | 1.042 | Plastic | 1.583 | 30.2 | 10.16 |
| 4 | | −1.642 (ASP) | 0.858 | | | | |
| 5 | Ape. Stop | Plano | 0.050 | | | | |
| 6 | Lens 3 | −35.714 (ASP) | 0.481 | Plastic | 1.535 | 55.8 | 3.42 |
| 7 | | −1.748 (ASP) | 0.273 | | | | |
| 8 | Lens 4 | 3.811 (ASP) | 0.947 | Plastic | 1.535 | 55.8 | 1.31 |
| 9 | | −0.782 (ASP) | 0.112 | | | | |
| 10 | Lens 5 | −0.596 (ASP) | 0.300 | Plastic | 1.639 | 23.5 | −0.90 |
| 11 | | 16.990 (ASP) | 0.092 | | | | |
| 12 | Lens 6 | −5.835 (ASP) | 0.785 | Plastic | 1.544 | 56.0 | 1.82 |
| 13 | | −0.885 (ASP) | 0.193 | | | | |
| 14 | IR-cut filter | Plano | 0.300 | Glass | 1.517 | 64.2 | — |
| 15 | | Plano | 0.565 | | | | |
| 16 | Image | Plano | — | | | | |

Note:
Reference wavelength is 587.6 nm (d-line).

TABLE 10

Aspheric Coefficients

| Surface # | 1 | 2 | 3 | 4 | 6 | 7 |
|---|---|---|---|---|---|---|
| k = | 6.2260E+00 | −5.7715E−01 | −5.9869E−01 | −1.4318E+00 | −9.0000E+01 | −5.9625E+00 |
| A4 = | −8.3511E−05 | −5.9453E−03 | 3.5021E−02 | 8.2056E−02 | 1.7484E−01 | 5.6856E−02 |
| A6 = | 1.0643E−05 | 3.6327E−03 | 1.6574E−03 | −3.7714E−02 | −7.1407E−01 | −8.3596E−01 |
| A8 = | — | — | −8.8199E−04 | 2.4386E−02 | 1.9098E+00 | 1.4529E+00 |
| A10 = | — | — | −1.0630E−04 | −7.8020E−03 | −4.6321E+00 | −2.5139E+00 |
| A12 = | — | — | — | — | 3.1105E+00 | 1.7176E+00 |
| A14 = | — | — | — | — | −1.5688E−17 | −1.5820E−17 |

| Surface # | 8 | 9 | 10 | 11 | 12 | 13 |
|---|---|---|---|---|---|---|
| k = | −2.9203E+00 | −2.5072E+00 | −1.5352E+00 | −9.0000E+01 | 2.0000E+01 | −1.0103E+00 |
| A4 = | 1.2843E−01 | 3.2226E−01 | 4.2821E−01 | −2.0255E−01 | 1.5808E−01 | 3.8677E−01 |
| A6 = | −6.3376E−01 | −8.1088E−01 | −6.2892E−01 | 6.0369E−01 | 8.1276E−02 | 9.0747E−02 |
| A8 = | 4.7883E−01 | −8.3244E−02 | 2.7348E−01 | −5.2127E−01 | −1.0155E−01 | −2.5841E−01 |
| A10 = | −5.3467E−01 | 8.6554E−01 | 4.7370E−03 | 1.7622E−01 | 4.0548E−02 | 1.7929E−01 |
| A12 = | −2.2077E−16 | −4.9276E−01 | — | −1.9459E−02 | −5.3096E−03 | −5.6933E−02 |
| A14 = | — | −1.6207E−17 | — | — | −1.1216E−04 | 6.1534E−03 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.00 | (CT2/R3) + (CT2/R4) | −1.23 |
| Fno | 2.00 | (R9 + R10)/(R9 − R10) | −0.93 |
| HFOV [deg.] | 88.0 | (R11 + R12)/(R11 − R12) | 1.36 |
| \|1/tan(HFOV)\| | 0.03 | f/T12 | 0.39 |
| T56/T45 | 0.82 | f3/f2 | 0.34 |
| CT2/CT3 | 2.17 | SL/TL | 0.45 |
| CT6/CT5 | 2.62 | \|Y62/Y11\| | 0.33 |

6th Embodiment

Figure 11:
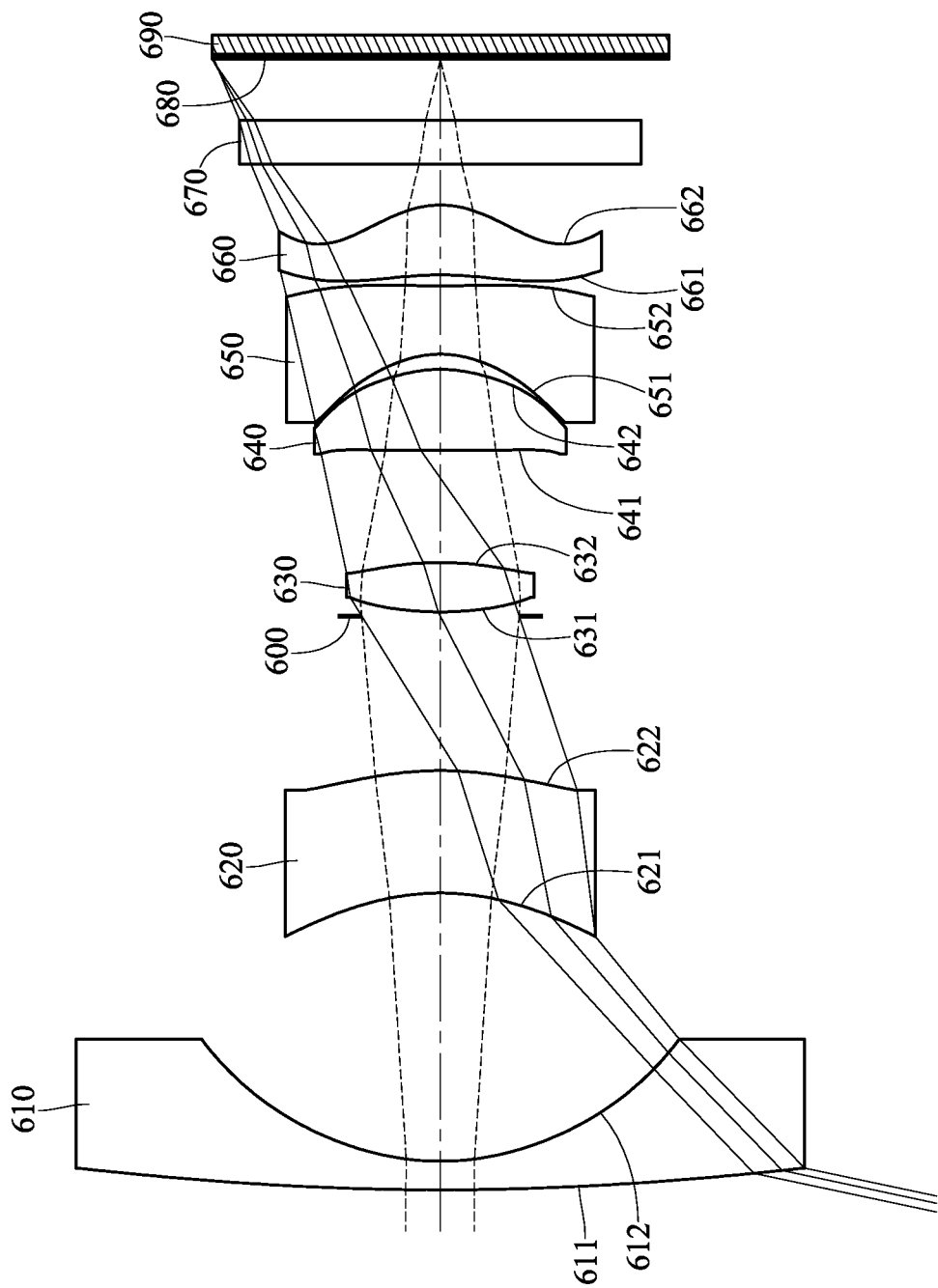
FIG. 11 is a schematic view of an image capturing unit according to the 6th embodiment of the present disclosure.
Figure 12:
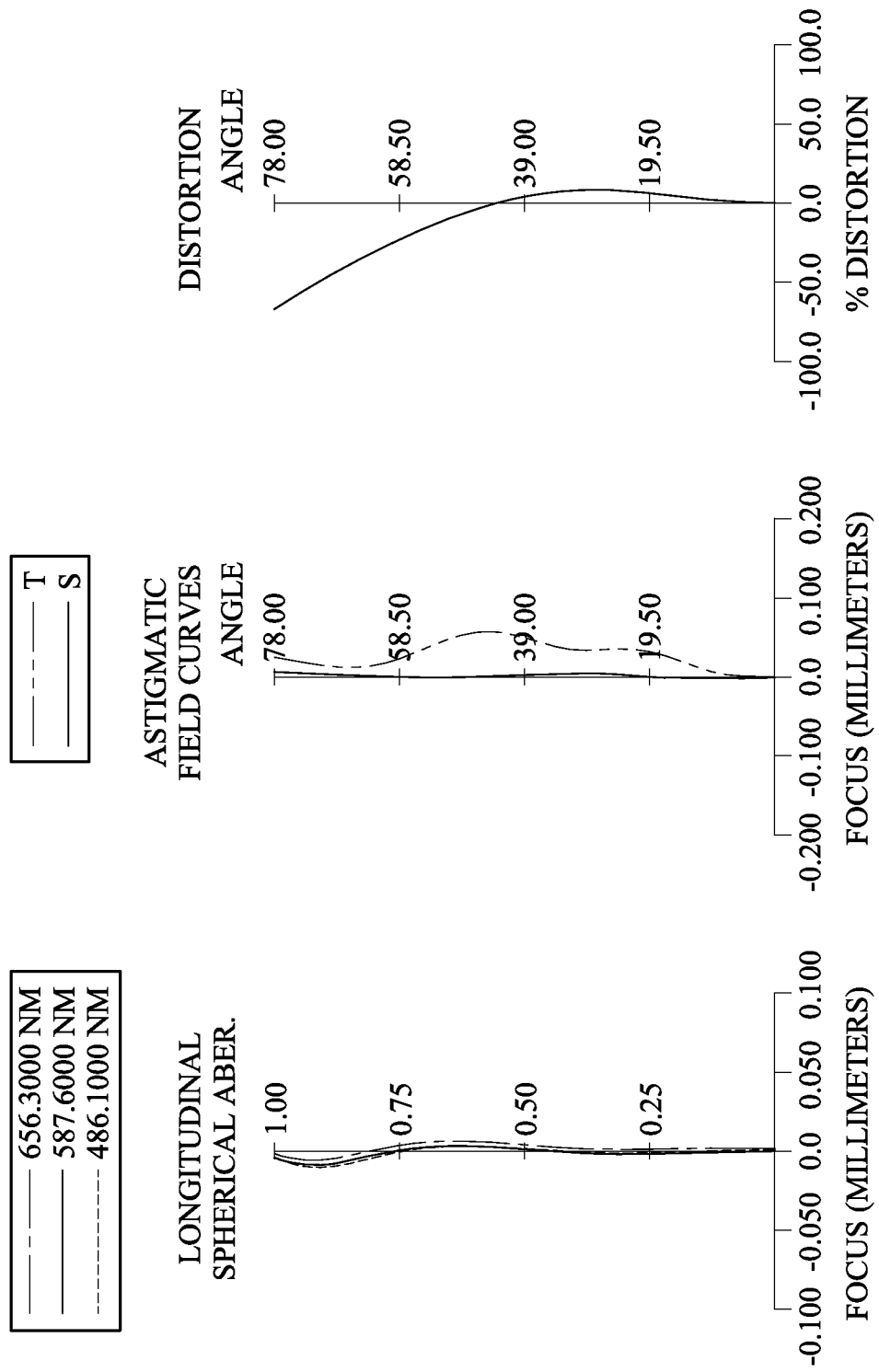
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging optical lens system (its reference numeral is omitted) of the present disclosure and an image sensor 690. The imaging optical lens system includes, in order from an object side to an image side, a first lens element 610, a second lens element 620, an aperture stop 600, a third lens element 630, a fourth lens element 640, a fifth lens element 650, a sixth lens element 660, an IR-cut filter 670 and an image surface 680, wherein the imaging optical lens system has a total of six lens elements (610-660).

The first lens element 610 with negative refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric.

The sixth lens element 660 with positive refractive power has an object-side surface 661 being concave in a paraxial region thereof and an image-side surface 662 being convex in a paraxial region thereof. The sixth lens element 660 is made of plastic material and has the object-side surface 661 and the image-side surface 662 being both aspheric. The image-side surface 662 of the sixth lens element 660 has at least one concave shape in an off-axis region thereof.

The IR-cut filter 670 is made of glass material and located between the sixth lens element 660 and the image surface 680, and will not affect the focal length of the imaging optical lens system. The image sensor 690 is disposed on or near the image surface 680 of the imaging optical lens system.

The detailed optical data of the 6th embodiment are shown in Table 11 and the aspheric surface data are shown in Table 12 below.

TABLE 11

6th Embodiment
f = 1.81 mm, Fno = 2.15, HFOV = 78.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 33.952 (ASP) | 0.350 | Plastic | 1.544 | 56.0 | −6.58 |
| 2 | | 3.229 (ASP) | 3.287 | | | | |
| 3 | Lens 2 | −3.038 (ASP) | 1.500 | Plastic | 1.634 | 23.8 | −38.5 |
| 4 | | −4.134 (ASP) | 1.896 | | | | |
| 5 | Ape. Stop | Plano | 0.050 | | | | |
| 6 | Lens 3 | 4.299 (ASP) | 0.605 | Plastic | 1.544 | 56.0 | 3.71 |
| 7 | | −3.618 (ASP) | 1.373 | | | | |
| 8 | Lens 4 | 392.901 (ASP) | 0.993 | Plastic | 1.544 | 56.0 | 3.01 |
| 9 | | −1.644 (ASP) | 0.186 | | | | |
| 10 | Lens 5 | −1.286 (ASP) | 0.837 | Plastic | 1.660 | 20.4 | −1.73 |
| 11 | | 12.751 (ASP) | 0.133 | | | | |
| 12 | Lens 6 | −4.413 (ASP) | 0.858 | Plastic | 1.544 | 56.0 | 2.56 |
| 13 | | −1.131 (ASP) | 0.500 | | | | |
| 14 | IR-cut filter | Plano | 0.540 | Glass | 1.517 | 64.2 | — |
| 15 | | Plano | 0.746 | | | | |
| 16 | Image | Plano | — | | | | |

Note:
Reference wavelength is 587.6 nm (d-line).

TABLE 12

| | Aspheric Coefficients | | | | | |
|---|---|---|---|---|---|---|
| Surface # | 1 | 2 | 3 | 4 | 6 | 7 |
| k = | −1.0594E+01 | −8.1776E−01 | −6.3813E−01 | −9.3035E−01 | −2.2893E+00 | −1.4234E+00 |
| A4 = | −4.1404E−05 | −2.2098E−03 | 6.4747E−03 | 1.2888E−02 | 2.1193E−02 | 1.8223E−02 |
| A6 = | 2.1123E−07 | 4.5122E−04 | 4.7706E−05 | −1.2155E−03 | −1.3945E−02 | −4.3437E−03 |
| A8 = | — | — | −2.7063E−05 | 5.4045E−04 | 2.6686E−02 | 1.0781E−02 |
| A10 = | — | — | 8.4284E−07 | −6.1461E−05 | −1.6450E−02 | −5.4073E−03 |
| A12 = | — | — | — | — | 4.8398E−03 | 2.6725E−03 |
| A14 = | — | — | — | — | 5.9130E−15 | 5.0034E−15 |

| Surface # | 8 | 9 | 10 | 11 | 12 | 13 |
|---|---|---|---|---|---|---|
| k = | −9.0000E+01 | −5.3763E+00 | −1.1887E+00 | −9.0000E+01 | −8.5141E+00 | −9.3066E−01 |
| A4 = | 2.1335E−02 | 1.4672E−02 | 5.3620E−02 | −5.1033E−02 | 3.3879E−02 | 9.4745E−02 |
| A6 = | −1.8008E−02 | −4.2477E−02 | −4.3161E−02 | 2.4670E−02 | 1.3532E−03 | 1.7641E−02 |
| A8 = | 5.3825E−03 | −2.0684E−03 | 5.2814E−03 | −7.8981E−03 | −1.5754E−03 | −7.0295E−03 |
| A10 = | −1.7687E−03 | 5.5060E−03 | 1.6683E−03 | 1.0986E−03 | 2.2190E−04 | 1.0101E−03 |
| A12 = | 1.4429E−13 | −7.6672E−04 | — | −3.0278E−05 | −8.2616E−06 | −8.8587E−05 |
| A14 = | — | 8.2069E−16 | — | — | −5.3866E−08 | 2.9551E−06 |
| A16 = | — | — | — | — | — | 1.9601E−19 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.81 | (CT2/R3) + (CT2/R4) | −0.86 |
| Fno | 2.15 | (R9 + R10)/(R9 − R10) | −0.82 |
| HFOV [deg.] | 78.0 | (R11 + R12)/(R11 − R12) | 1.69 |
| |1/tan(HFOV)| | 0.21 | f/T12 | 0.55 |
| T56/T45 | 0.72 | f3/f2 | −0.10 |
| CT2/CT3 | 2.48 | SL/TL | 0.49 |
| CT6/CT5 | 1.03 | |Y62/Y11| | 0.44 |

7th Embodiment

Figure 13:
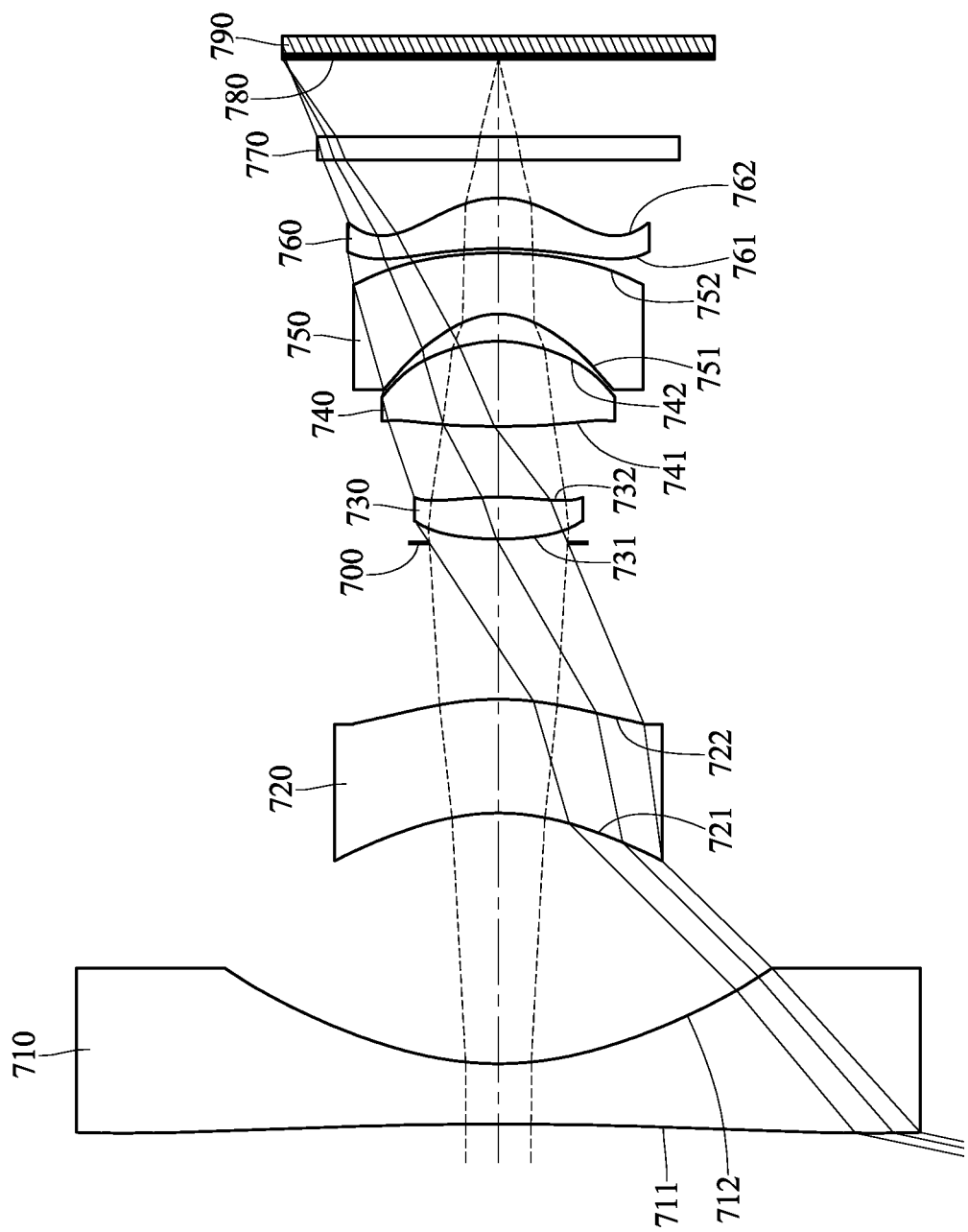
FIG. 13 is a schematic view of an image capturing unit according to the 7th embodiment of the present disclosure.
Figure 14:
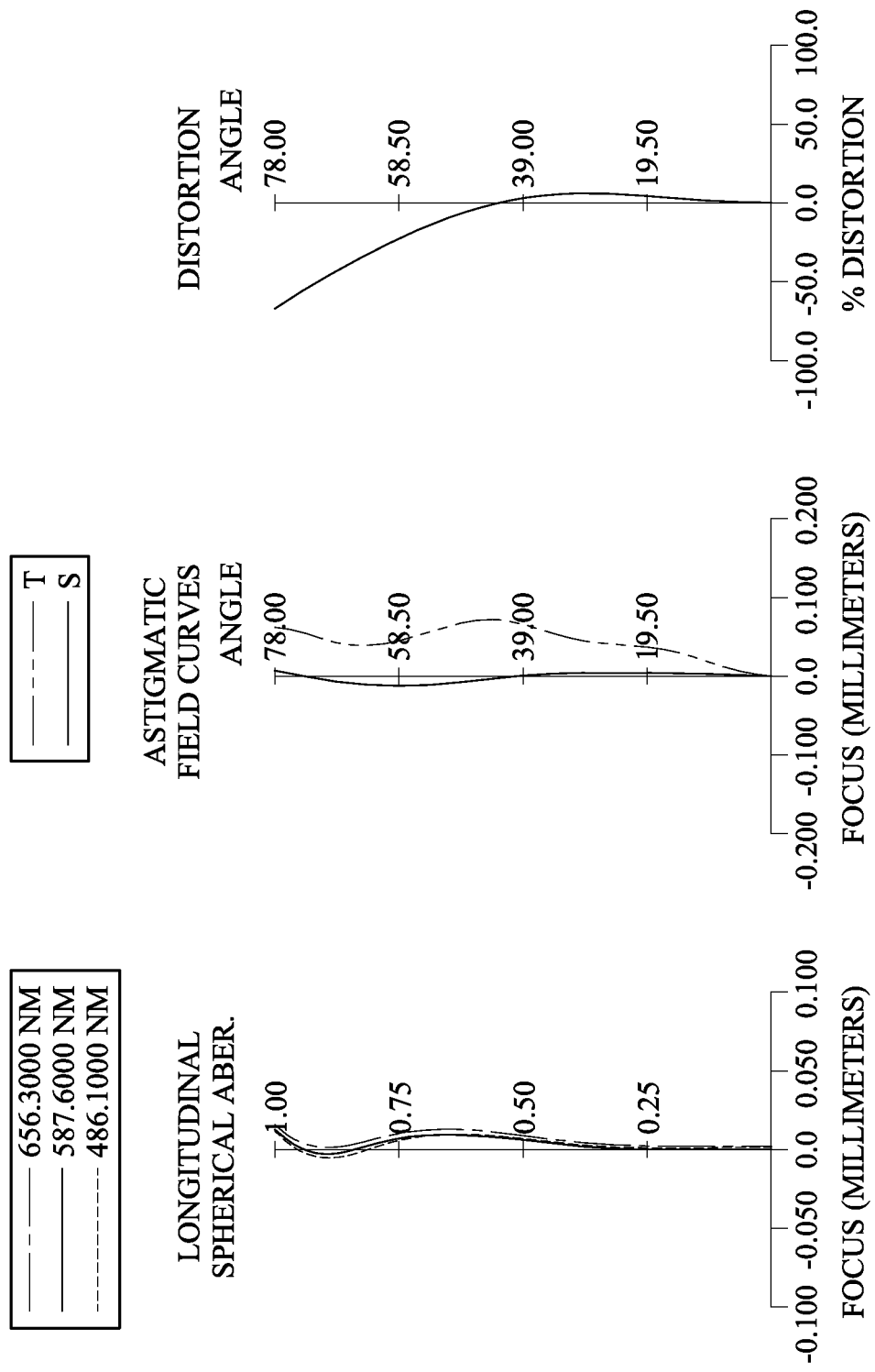
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging optical lens system (its reference numeral is omitted) of the present disclosure and an image sensor 790. The imaging optical lens system includes, in order from an object side to an image side, a first lens element 710, a second lens element 720, an aperture stop 700, a third lens element 730, a fourth lens element 740, a fifth lens element 750, a sixth lens element 760, an IR-cut filter 770 and an image surface 780, wherein the imaging optical lens system has a total of six lens elements (710-760).

The first lens element 710 with negative refractive power has an object-side surface 711 being concave in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being convex in a paraxial region thereof. The second lens element 720 is made of glass material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric.

The sixth lens element 760 with positive refractive power has an object-side surface 761 being concave in a paraxial region thereof and an image-side surface 762 being convex in a paraxial region thereof. The sixth lens element 760 is made of plastic material and has the object-side surface 761 and the image-side surface 762 being both aspheric. The image-side surface 762 of the sixth lens element 760 has at least one concave shape in an off-axis region thereof.

The IR-cut filter 770 is made of glass material and located between the sixth lens element 760 and the image surface 780, and will not affect the focal length of the imaging optical lens system. The image sensor 790 is disposed on or near the image surface 780 of the imaging optical lens system.

The detailed optical data of the 7th embodiment are shown in Table 13 and the aspheric surface data are shown in Table 14 below.

TABLE 13

7th Embodiment
f = 1.83 mm, Fno = 2.15, HFOV = 78.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −56.519 (ASP) | 0.789 | Plastic | 1.515 | 56.5 | −7.62 |
| 2 | | 4.234 (ASP) | 3.273 | | | | |
| 3 | Lens 2 | −3.058 (ASP) | 1.488 | Glass | 1.652 | 58.5 | −264.52 |
| 4 | | −3.711 (ASP) | 2.043 | | | | |
| 5 | Ape. Stop | Plano | 0.050 | | | | |
| 6 | Lens 3 | 4.276 (ASP) | 0.546 | Plastic | 1.544 | 56.0 | 4.17 |
| 7 | | −4.604 (ASP) | 0.927 | | | | |
| 8 | Lens 4 | 20.674 (ASP) | 1.110 | Plastic | 1.515 | 56.5 | 2.98 |
| 9 | | −1.629 (ASP) | 0.357 | | | | |
| 10 | Lens 5 | −0.908 (ASP) | 0.796 | Plastic | 1.660 | 20.4 | −1.78 |
| 11 | | −5.386 (ASP) | 0.057 | | | | |
| 12 | Lens 6 | −6.041 (ASP) | 0.662 | Plastic | 1.544 | 56.0 | 2.66 |
| 13 | | −1.213 (ASP) | 0.500 | | | | |
| 14 | IR-cut filter | Plano | 0.300 | Glass | 1.517 | 64.2 | — |
| 15 | | Plano | 1.012 | | | | |
| 16 | Image | Plano | — | | | | |

Note:
Reference wavelength is 587.6 nm (d-line).

TABLE 14

Aspheric Coefficients

| Surface # | 1 | 2 | 3 | 4 | 6 | 7 |
|---|---|---|---|---|---|---|
| k = | −8.3839E+01 | −1.4087E+00 | −8.2419E−01 | −1.8988E+00 | 2.8929E+00 | −8.5404E+00 |
| A4 = | 6.2873E−05 | −2.4658E−03 | 7.6847E−03 | 1.4284E−02 | 4.3250E−02 | 4.9997E−02 |
| A6 = | 2.2963E−06 | 1.1594E−04 | 1.2044E−04 | −1.7168E−03 | −1.1890E−02 | 2.5404E−03 |
| A8 = | — | — | −4.3115E−05 | 4.6363E−04 | 3.7641E−02 | 1.0369E−02 |
| A10 = | — | — | −6.9055E−06 | −7.7148E−05 | −1.8894E−02 | 4.1310E−03 |
| A12 = | — | — | — | — | 4.8398E−03 | 2.6725E−03 |
| A14 = | — | — | — | — | 5.9713E−15 | 4.9404E−15 |

| Surface # | 8 | 9 | 10 | 11 | 12 | 13 |
|---|---|---|---|---|---|---|
| k = | 2.0000E+01 | −3.3340E+00 | −1.5093E+00 | −9.0000E+01 | 4.5673E+00 | −9.1671E−01 |
| A4 = | 4.5214E−02 | 3.5922E−02 | 6.4838E−02 | −5.3418E−02 | −3.9904E−03 | 6.7383E−02 |
| A6 = | −2.5373E−02 | −4.6531E−02 | −4.9095E−02 | 2.4354E−02 | 9.0520E−03 | 2.2236E−02 |
| A8 = | 5.9285E−03 | −2.6702E−02 | 2.0687E−03 | −7.7140E−03 | −6.3793E−04 | −6.9588E−03 |
| A10 = | −1.5583E−03 | 5.5350E−03 | 2.8273E−03 | 1.0719E−02 | 6.6118E−05 | 1.0348E−03 |
| A12 = | 1.4995E−13 | −7.6672E−04 | — | −3.0278E−05 | −8.2616E−06 | −8.8587E−05 |
| A14 = | — | 6.6843E−16 | — | — | −5.3866E−08 | 2.9551E−06 |
| A16 = | — | — | — | — | — | 1.9465E−19 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.83 | (CT2/R3) + (CT2/R4) | −0.89 |
| Fno | 2.15 | (R9 + R10)/(R9 − R10) | −1.41 |
| HFOV [deg.] | 78.0 | (R11 + R12)/(R11 − R12) | 1.50 |
| \|1/tan(HFOV)\| | 0.21 | f/T12 | 0.56 |
| T56/T45 | 0.16 | f3/f2 | −0.02 |

-continued

| 7th Embodiment | | | |
|---|---|---|---|
| CT2/CT3 | 2.73 | SL/TL | 0.45 |
| CT6/CT5 | 0.83 | \|Y62/Y11\| | 0.36 |

8th Embodiment

Figure 15:
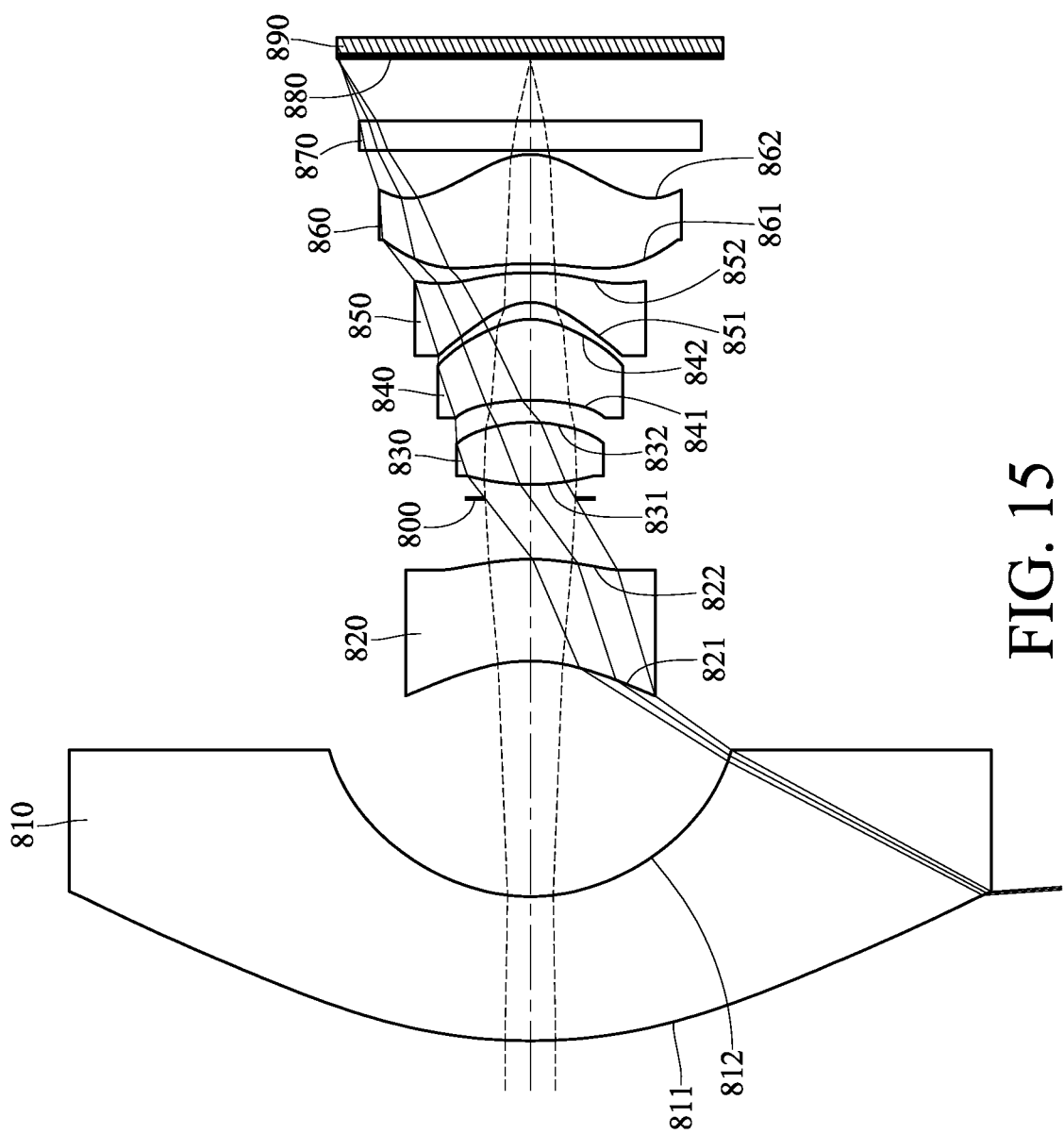
FIG. 15 is a schematic view of an image capturing unit according to the 8th embodiment of the present disclosure.
Figure 16:
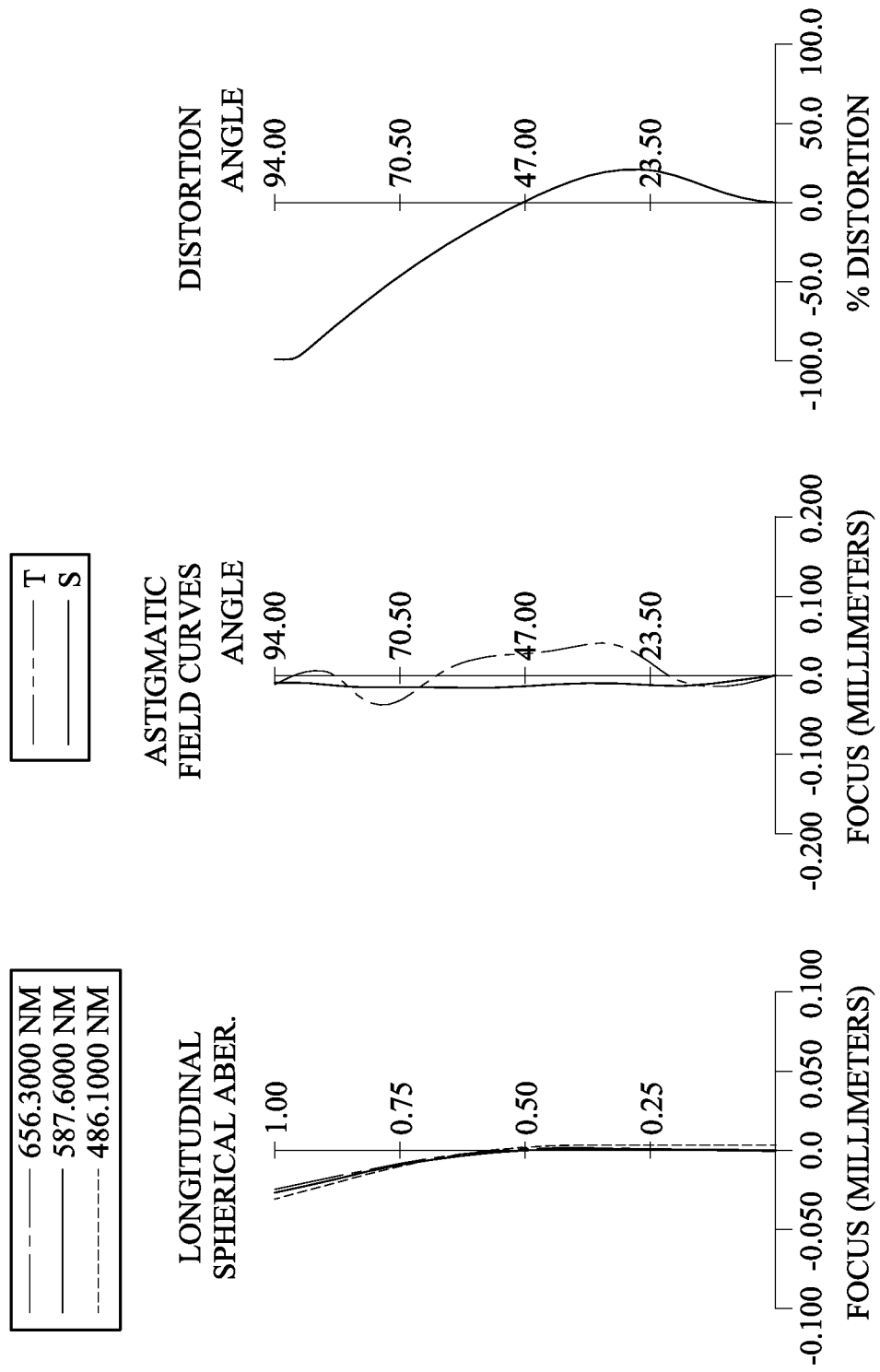
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging optical lens system (its reference numeral is omitted) of the present disclosure and an image sensor 890. The imaging optical lens system includes, in order from an object side to an image side, a first lens element 810, a second lens element 820, an aperture stop 800, a third lens element 830, a fourth lens element 840, a fifth lens element 850, a sixth lens element 860, an IR-cut filter 870 and an image surface 880, wherein the imaging optical lens system has a total of six lens elements (810-860).

The first lens element 810 with negative refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with negative refractive power has an object-side surface 821 being concave in a paraxial region thereof and an image-side surface 822 being convex in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric.

The sixth lens element 860 with positive refractive power has an object-side surface 861 being concave in a paraxial region thereof and an image-side surface 862 being convex in a paraxial region thereof. The sixth lens element 860 is made of plastic material and has the object-side surface 861 and the image-side surface 862 being both aspheric. The image-side surface 862 of the sixth lens element 860 has at least one concave shape in an off-axis region thereof.

The IR-cut filter 870 is made of glass material and located between the sixth lens element 860 and the image surface 880, and will not affect the focal length of the imaging optical lens system. The image sensor 890 is disposed on or near the image surface 880 of the imaging optical lens system.

The detailed optical data of the 8th embodiment are shown in Table 15 and the aspheric surface data are shown in Table 16 below.

TABLE 15

8th Embodiment
f = 1.15 mm, Fno = 2.25, HFOV = 94.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.479 | (ASP) | 1.459 | Plastic | 1.535 | 55.8 | −6.28 |
| 2 | | 1.889 | (ASP) | 2.383 | | | | |
| 3 | Lens 2 | −1.683 | (ASP) | 1.030 | Plastic | 1.544 | 56.0 | −26.94 |
| 4 | | −2.312 | (ASP) | 0.613 | | | | |
| 5 | Ape. Stop | Plano | | 0.143 | | | | |
| 6 | Lens 3 | 2.363 | (ASP) | 0.629 | Plastic | 1.535 | 55.8 | 1.77 |
| 7 | | −1.434 | (ASP) | 0.223 | | | | |
| 8 | Lens 4 | −2.023 | (ASP) | 0.819 | Plastic | 1.535 | 55.8 | 1.61 |
| 9 | | −0.689 | (ASP) | 0.171 | | | | |
| 10 | Lens 5 | −0.531 | (ASP) | 0.300 | Plastic | 1.650 | 21.5 | −1.07 |
| 11 | | −2.701 | (ASP) | 0.092 | | | | |
| 12 | Lens 6 | −2.874 | (ASP) | 1.105 | Plastic | 1.544 | 55.9 | 1.38 |
| 13 | | −0.677 | (ASP) | 0.038 | | | | |
| 14 | IR-cut filter | Plano | | 0.300 | Glass | 1.517 | 64.2 | — |
| 15 | | Plano | | 0.633 | | | | |
| 16 | Image | Plano | | — | | | | |

Note:
Reference wavelength is 587.6 nm (d-line).

TABLE 16

Aspheric Coefficients

| Surface # | 1 | 2 | 3 | 4 | 6 | 7 |
|---|---|---|---|---|---|---|
| k = | −1.9978E+00 | −2.1125E−01 | −9.9027E−01 | −1.9875E+00 | −1.9902E+01 | −4.4815E+00 |
| A4 = | 1.7782E−03 | −3.0299E−02 | 6.2650E−02 | 1.0171E−01 | 2.5130E−01 | 6.5987E−02 |
| A6 = | −3.4955E−04 | 1.3876E−02 | −1.2813E−02 | −4.4401E−02 | −5.5700E−01 | −6.8587E−01 |
| A8 = | 1.8571E−05 | −4.1247E−03 | 1.4674E−03 | 2.8656E−02 | 1.4669E+00 | 1.4733E+00 |
| A10 = | −3.2944E−07 | 4.4219E−04 | 2.3509E−04 | 6.3671E−03 | −3.7204E+00 | −2.8585E+00 |
| A12 = | — | — | — | — | 3.1105E+00 | 1.7176E+00 |

| Surface # | 8 | 9 | 10 | 11 | 12 | 13 |
|---|---|---|---|---|---|---|
| k = | −5.5971E+00 | −1.6813E+00 | −1.1812E+00 | −7.0588E−01 | 1.1425E+00 | −1.8600E+00 |
| A4 = | 1.6919E−01 | 4.3388E−01 | 5.0906E−01 | −1.8408E−01 | 1.4170E−01 | 1.7836E−01 |

TABLE 16-continued

| Aspheric Coefficients | | | | | |
|---|---|---|---|---|---|
| A6 = | −5.8775E−01 | −5.5790E−01 | −5.5101E−01 | 5.3474E−01 | 1.1366E−01 | 4.3950E−02 |
| A8 = | 7.4011E−02 | −2.4696E−01 | 5.3649E−01 | −3.2268E−01 | −1.2043E−01 | −1.6082E−01 |
| A10 = | −1.7289E−01 | 8.5868E−01 | −2.9338E−01 | 4.2221E−02 | 4.4793E−02 | 1.2146E−01 |
| A12 = | — | −4.9276E−01 | — | 1.1245E−02 | −5.6224E−03 | −3.6309E−02 |
| A14 = | — | — | — | — | −1.9545E−04 | 3.6504E−03 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.15 | (CT2/R3) + (CT2/R4) | −1.06 |
| Fno | 2.25 | (R9 + R10)/(R9 − R10) | −1.49 |
| HFOV [deg.] | 94.0 | (R11 + R12)/(R11 − R12) | 1.62 |
| |1/tan(HFOV)| | 0.07 | f/T12 | 0.48 |
| T56/T45 | 0.54 | f3/f2 | −0.07 |
| CT2/CT3 | 1.64 | SL/TL | 0.45 |
| CT6/CT5 | 3.68 | |Y62/Y11| | 0.33 |

9th Embodiment

Figure 17:
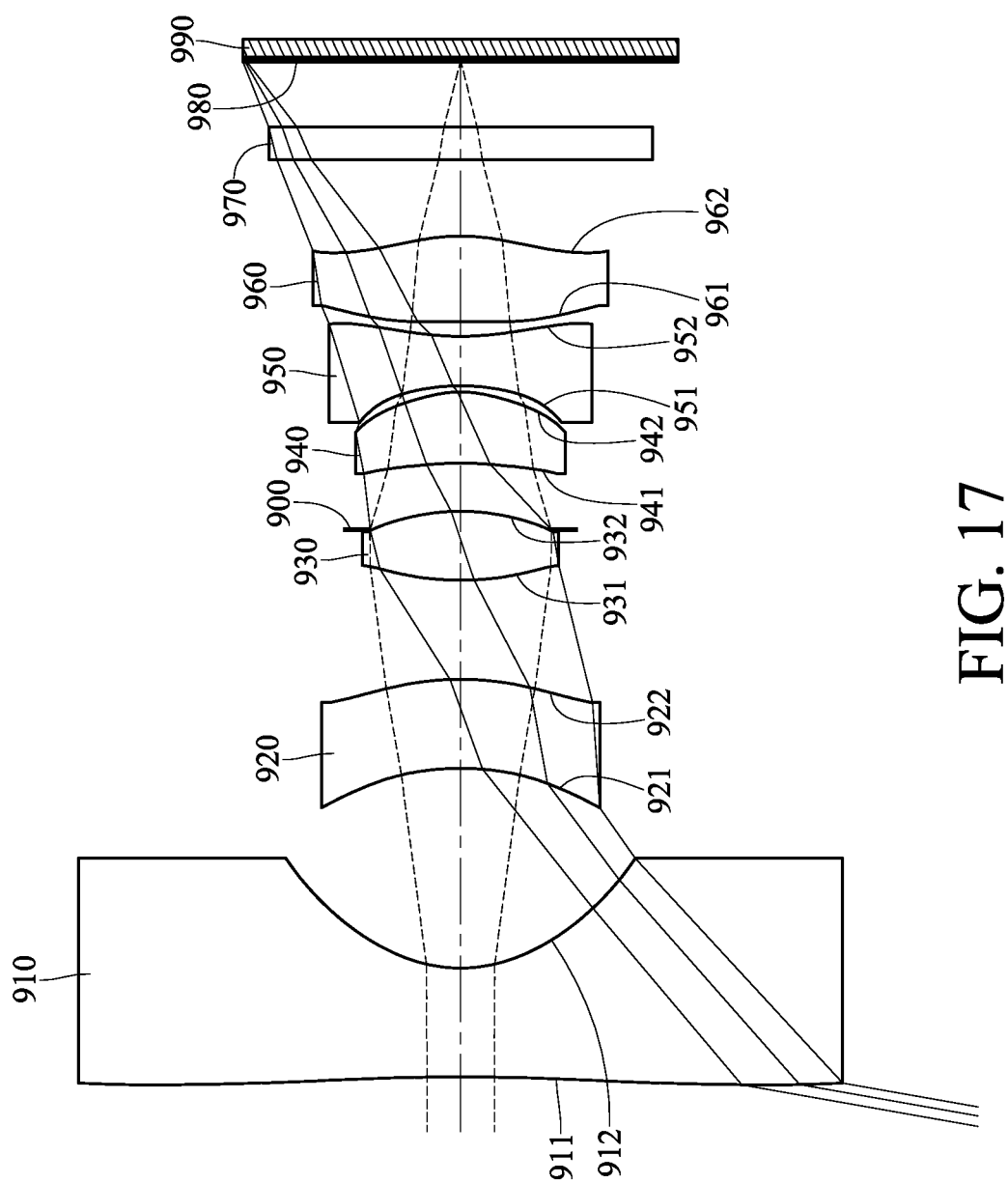
FIG. 17 is a schematic view of an image capturing unit according to the 9th embodiment of the present disclosure.
Figure 18:
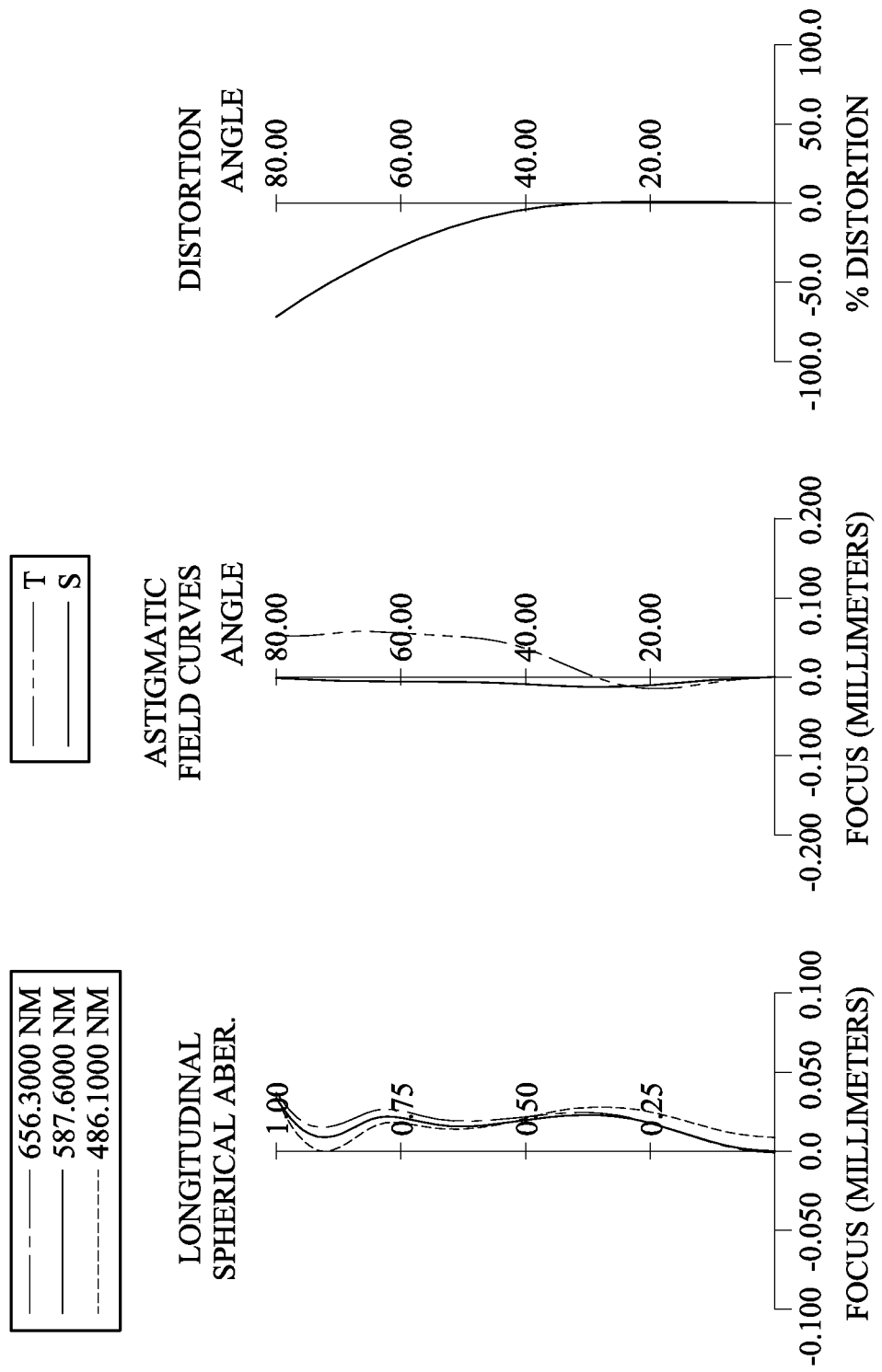
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging optical lens system (its reference numeral is omitted) of the present disclosure and an image sensor 990. The imaging optical lens system includes, in order from an object side to an image side, a first lens element 910, a second lens element 920, a third lens element 930, an aperture stop 900, a fourth lens element 940, a fifth lens element 950, a sixth lens element 960, an IR-cut filter 970 and an image surface 980, wherein the imaging optical lens system has a total of six lens elements (910-960).

The first lens element 910 with negative refractive power has an object-side surface 911 being concave in a paraxial region thereof and an image-side surface 912 being concave in a paraxial region thereof. The first lens element 910 is made of plastic material and has the object-side surface 911 and the image-side surface 912 being both aspheric.

The second lens element 920 with positive refractive power has an object-side surface 921 being concave in a paraxial region thereof and an image-side surface 922 being convex in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being convex in a paraxial region thereof. The third lens element 930 is made of plastic material and has the object-side surface 931 and the image-side surface 932 being both aspheric.

The fourth lens element 940 with positive refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with negative refractive power has an object-side surface 951 being concave in a paraxial region thereof and an image-side surface 952 being concave in a paraxial region thereof. The fifth lens element 950 is made of plastic material and has the object-side surface 951 and the image-side surface 952 being both aspheric.

The sixth lens element 960 with positive refractive power has an object-side surface 961 being concave in a paraxial region thereof and an image-side surface 962 being convex in a paraxial region thereof. The sixth lens element 960 is made of plastic material and has the object-side surface 961 and the image-side surface 962 being both aspheric. The image-side surface 962 of the sixth lens element 960 has at least one concave shape in an off-axis region thereof.

The IR-cut filter 970 is made of glass material and located between the sixth lens element 960 and the image surface 980, and will not affect the focal length of the imaging optical lens system. The image sensor 990 is disposed on or near the image surface 980 of the imaging optical lens system.

The detailed optical data of the 9th embodiment are shown in Table 17 and the aspheric surface data are shown in Table 18 below.

TABLE 17

| 9th Embodiment | | | | | | |
|---|---|---|---|---|---|---|
| f = 1.26 mm, Fno = 2.05, HFOV = 80.0 deg. | | | | | | |
| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −16.949 (ASP) | 0.997 | Plastic | 1.515 | 56.5 | −2.35 |
| 2 | | 1.330 (ASP) | 1.831 | | | | |
| 3 | Lens 2 | −2.599 (ASP) | 0.817 | Plastic | 1.650 | 21.5 | 34.07 |
| 4 | | −2.614 (ASP) | 0.908 | | | | |

TABLE 17-continued

9th Embodiment
f = 1.26 mm, Fno = 2.05, HFOV = 80.0 deg.

| Surface # | | Curvature Radius | Thickness | Material | Index | Abbe # | Focal Length |
|---|---|---|---|---|---|---|---|
| 5 | Lens 3 | 2.541 (ASP) | 0.633 | Plastic | 1.544 | 55.9 | 2.11 |
| 6 | | −1.914 (ASP) | −0.167 | | | | |
| 7 | Ape. Stop | Plano | 0.608 | | | | |
| 8 | Lens 4 | −3.149 (ASP) | 0.654 | Plastic | 1.544 | 55.9 | 2.23 |
| 9 | | −0.940 (ASP) | 0.057 | | | | |
| 10 | Lens 5 | −1.611 (ASP) | 0.452 | Plastic | 1.660 | 20.4 | −1.42 |
| 11 | | 2.493 (ASP) | 0.136 | | | | |
| 12 | Lens 6 | −8.583 (ASP) | 0.784 | Plastic | 1.544 | 55.9 | 3.83 |
| 13 | | −1.730 (ASP) | 0.700 | | | | |
| 14 | IR-cut filter | Plano | 0.300 | Glass | 1.517 | 64.2 | — |
| 15 | | Plano | 0.594 | | | | |
| 16 | Image | Plano | — | | | | |

Note:
Reference wavelength is 587.6 nm (d-line).

TABLE 18

Aspheric Coefficients

| Surface # | 1 | 2 | 3 | 4 | 5 | 6 |
|---|---|---|---|---|---|---|
| k = | −9.0000E+01 | −5.1301E−01 | 7.7116E−01 | 2.4334E+00 | −2.0085E+01 | −1.1771E+01 |
| A4 = | 3.2160E−03 | −4.4469E−02 | −4.5947E−02 | 2.8746E−02 | 1.3128E−01 | −1.3541E−01 |
| A6 = | −3.8705E−04 | 1.7093E−02 | 2.6968E−02 | 1.8152E−02 | −2.7472E−02 | 1.6292E−01 |
| A8 = | 2.5306E−05 | −8.3735E−03 | 8.8333E−03 | 1.3135E−02 | −3.3557E−01 | −2.2729E−01 |
| A10 = | −6.2921E−07 | 1.1275E−03 | −6.8889E−03 | −5.8476E−03 | 5.8671E−01 | 1.3818E−01 |
| A12 = | — | — | 8.9159E−04 | 1.5844E−03 | −3.8331E−01 | −6.5929E−02 |

| Surface # | 8 | 9 | 10 | 11 | 12 | 13 |
|---|---|---|---|---|---|---|
| k = | −3.3055E+01 | −1.3269E+00 | −2.7715E−02 | −4.1446E+01 | 3.3974E+01 | −5.1633E−01 |
| A4 = | −1.0245E−02 | 8.4733E−01 | 4.4928E−01 | 1.3835E−01 | 3.3432E−01 | 2.0671E−01 |
| A6 = | 2.9766E−01 | −1.7688E+00 | −1.2952E+00 | −3.0256E−01 | −2.9650E−01 | −7.3542E−02 |
| A8 = | −1.0634E+00 | 1.6301E+00 | 1.2645E+00 | 2.9131E−01 | 1.1357E−01 | 5.3116E−02 |
| A10 = | 1.3928E+00 | −6.9056E−01 | −5.2058E−01 | −1.4631E−01 | 1.6754E−02 | −5.2807E−02 |
| A12 = | −6.8491E−01 | 5.3425E−02 | −5.8094E−03 | 2.7529E−02 | −2.7245E−02 | 2.7100E−02 |
| A14 = | — | — | — | — | 6.1869E−03 | −4.8275E−03 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 1.26 | (CT2/R3) + (CT2/R4) | −0.63 |
| Fno | 2.05 | (R9 + R10)/(R9 − R10) | −0.21 |
| HFOV [deg.] | 80.0 | (R11 + R12)/(R11 − R12) | 1.50 |
| \|1/tan(HFOV)\| | 0.18 | f/T12 | 0.69 |
| T56/T45 | 2.39 | f3/f2 | 0.06 |
| CT2/CT3 | 1.29 | SL/TL | 0.46 |
| CT6/CT5 | 1.73 | \|Y62/Y11\| | 0.39 |

10th Embodiment

Figure 19:
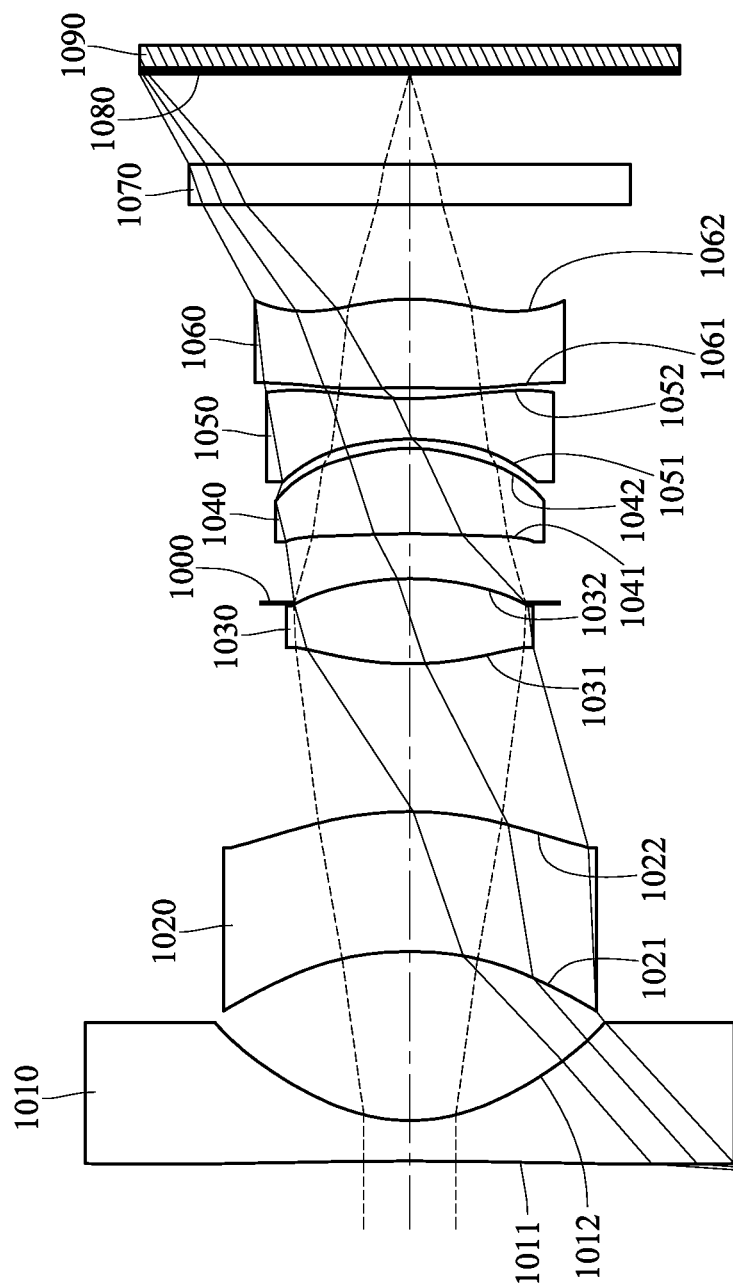
FIG. 19 is a schematic view of an image capturing unit according to the 10th embodiment of the present disclosure.
Figure 20:
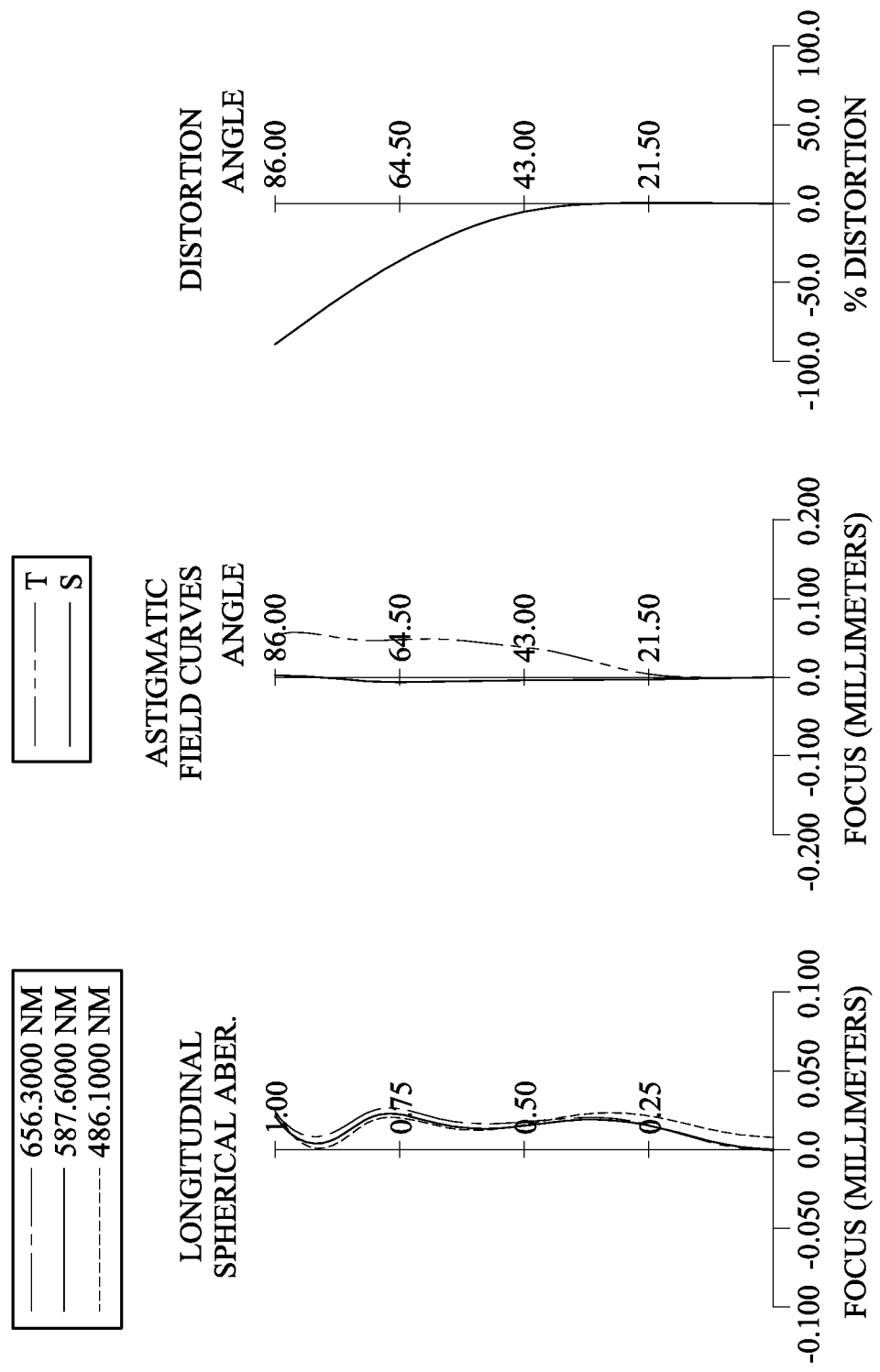
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the imaging optical lens system (its reference numeral is omitted) of the present disclosure and an image sensor 1090. The imaging optical lens system includes, in order from an object side to an image side, a first lens element 1010, a second lens element 1020, a third lens element 1030, an aperture stop 1000, a fourth lens element 1040, a fifth lens element 1050, a sixth lens element 1060, an IR-cut filter 1070 and an image surface 1080, wherein the imaging optical lens system has a total of six lens elements (1010-1060).

The first lens element 1010 with negative refractive power has an object-side surface 1011 being concave in a paraxial region thereof and an image-side surface 1012 being concave in a paraxial region thereof. The first lens element 1010 is made of plastic material and has the object-side surface 1011 and the image-side surface 1012 being both aspheric.

The second lens element 1020 with positive refractive power has an object-side surface 1021 being concave in a paraxial region thereof and an image-side surface 1022 being convex in a paraxial region thereof. The second lens element 1020 is made of plastic material and has the object-side surface 1021 and the image-side surface 1022 being both aspheric.

The third lens element 1030 with positive refractive power has an object-side surface 1031 being convex in a paraxial region thereof and an image-side surface 1032 being convex in a paraxial region thereof. The third lens element 1030 is made of plastic material and has the object-side surface 1031 and the image-side surface 1032 being both aspheric.

The fourth lens element 1040 with positive refractive power has an object-side surface 1041 being concave in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with negative refractive power has an object-side surface 1051 being concave in a paraxial region thereof and an image-side surface 1052 being concave in a paraxial region thereof. The fifth lens element 1050 is made of plastic material and has the object-side surface 1051 and the image-side surface 1052 being both aspheric.

The sixth lens element 1060 with positive refractive power has an object-side surface 1061 being concave in a paraxial region thereof and an image-side surface 1062 being convex in a paraxial region thereof. The sixth lens element 1060 is made of plastic material and has the object-side surface 1061 and the image-side surface 1062 being both aspheric. The image-side surface 1062 of the sixth lens element 1060 has at least one concave shape in an off-axis region thereof.

The IR-cut filter 1070 is made of glass material and located between the sixth lens element 1060 and the image surface 1080, and will not affect the focal length of the imaging optical lens system. The image sensor 1090 is disposed on or near the image surface 1080 of the imaging optical lens system.

The detailed optical data of the 10th embodiment are shown in Table 19 and the aspheric surface data are shown in Table 20 below.

TABLE 19

10th Embodiment
f = 1.25 mm, Fno = 1.84, HFOV = 86.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −33.887 (ASP) | 0.300 | Plastic | 1.515 | 56.5 | −2.44 |
| 2 | | 1.309 (ASP) | 1.251 | | | | |
| 3 | Lens 2 | −2.570 (ASP) | 1.035 | Plastic | 1.650 | 21.5 | 44.92 |
| 4 | | −2.737 (ASP) | 1.094 | | | | |
| 5 | Lens 3 | 2.314 (ASP) | 0.630 | Plastic | 1.544 | 55.9 | 2.14 |
| 6 | | −2.122 (ASP) | −0.180 | | | | |
| 7 | Ape. Stop | Plano | 0.512 | | | | |
| 8 | Lens 4 | −8.211 (ASP) | 0.634 | Plastic | 1.544 | 55.9 | 2.31 |
| 9 | | −1.118 (ASP) | 0.068 | | | | |
| 10 | Lens 5 | −1.591 (ASP) | 0.300 | Plastic | 1.660 | 20.4 | −1.47 |
| 11 | | 2.690 (ASP) | 0.080 | | | | |
| 12 | Lens 6 | −7.121 (ASP) | 0.655 | Plastic | 1.515 | 56.5 | 3.75 |
| 13 | | −1.564 (ASP) | 0.700 | | | | |
| 14 | IR-cut filter | Plano | 0.300 | Glass | 1.517 | 64.2 | — |
| 15 | | Plano | 0.665 | | | | |
| 16 | Image | Plano | — | | | | |

Note:
Reference wavelength is 587.6 nm (d-line).

TABLE 20

Aspheric Coefficients

| Surface # | 1 | 2 | 3 | 4 | 5 | 6 |
|---|---|---|---|---|---|---|
| k = | −6.7562E+01 | −8.0512E−01 | 9.1837E−01 | 2.0001E+00 | −1.6880E+01 | −1.1020E+01 |
| A4 = | 3.2461E−03 | −5.5118E−02 | −7.5963E−02 | 3.7486E−03 | 9.6040E−02 | −1.4120E−01 |
| A6 = | −4.1018E−04 | 2.2188E−02 | 5.9188E−02 | 2.4863E−02 | −2.9999E−02 | 1.6389E−01 |
| A8 = | 3.4957E−05 | −1.2893E−02 | −4.5652E−03 | 8.2182E−03 | −3.3028E−01 | −2.3382E−01 |
| A10 = | −1.0305E−06 | 4.1339E−03 | −4.5519E−03 | −7.5495E−03 | 5.8213E−01 | 1.4269E−01 |
| A12 = | — | — | 8.9159E−04 | 1.6933E−03 | −3.8331E−01 | −6.5929E−02 |

| Surface # | 8 | 9 | 10 | 11 | 12 | 13 |
|---|---|---|---|---|---|---|
| k = | 3.0041E+01 | −9.5947E−01 | −4.8558E−01 | −4.2864E+01 | 3.3765E+01 | −3.6373E+00 |
| A4 = | 2.3778E−02 | 8.1054E−02 | 5.0547E−01 | −1.3969E−03 | 1.8013E−01 | 1.6660E−01 |
| A6 = | 3.2470E−01 | −1.7740E+00 | −1.8106E+00 | −5.8791E−02 | 4.9222E−01 | 1.0181E−01 |
| A8 = | −1.0637E+00 | 1.6378E+00 | 2.5153E+00 | −4.6916E−02 | −1.3926E+00 | 1.7620E−01 |
| A10 = | 1.3391E+00 | −6.7668E−01 | −1.7253E+00 | 9.5415E−02 | 1.2014E+00 | −5.7826E−01 |
| A12 = | −6.8491E−01 | 5.3425E−02 | 4.7107E−01 | −3.8962E−02 | −3.7720E−01 | 4.4334E−01 |
| A14 = | — | — | — | — | 1.9647E−02 | −1.0929E−01 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 1.25 | (CT2/R3) + (CT2/R4) | −0.78 |
| Fno | 1.84 | (R9 + R10)/(R9 − R10) | −0.26 |
| HFOV [deg.] | 86.0 | (R11 + R12)/(R11 − R12) | 1.56 |
| \|1/tan(HFOV)\| | 0.07 | f/T12 | 1.00 |
| T56/T45 | 1.18 | f3/f2 | 0.05 |
| CT2/CT3 | 1.64 | SL/TL | 0.49 |
| CT6/CT5 | 2.18 | \|Y62/Y11\| | 0.48 |

11th Embodiment

Figure 21:
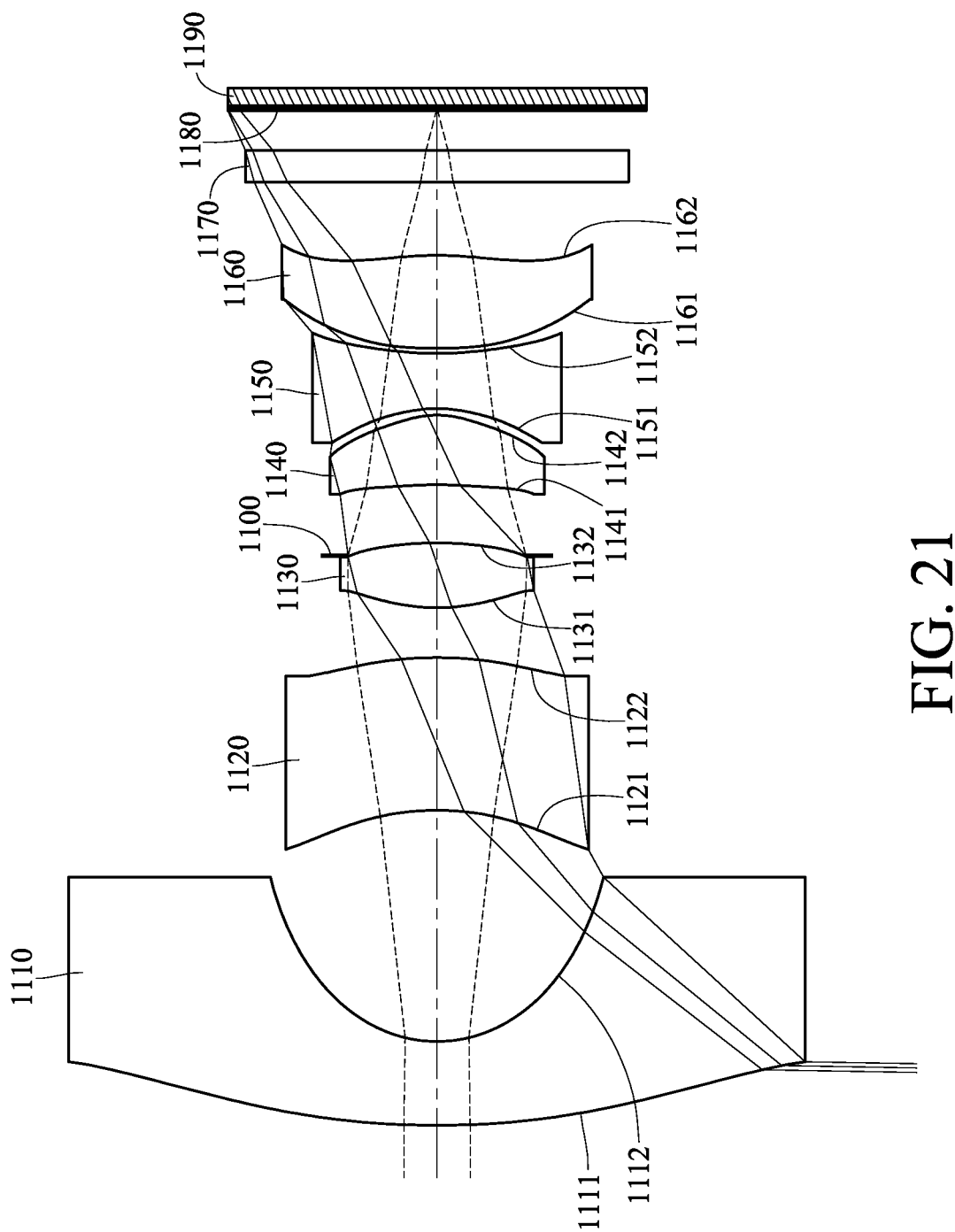
FIG. 21 is a schematic view of an image capturing unit according to the 11th embodiment of the present disclosure.
Figure 22:
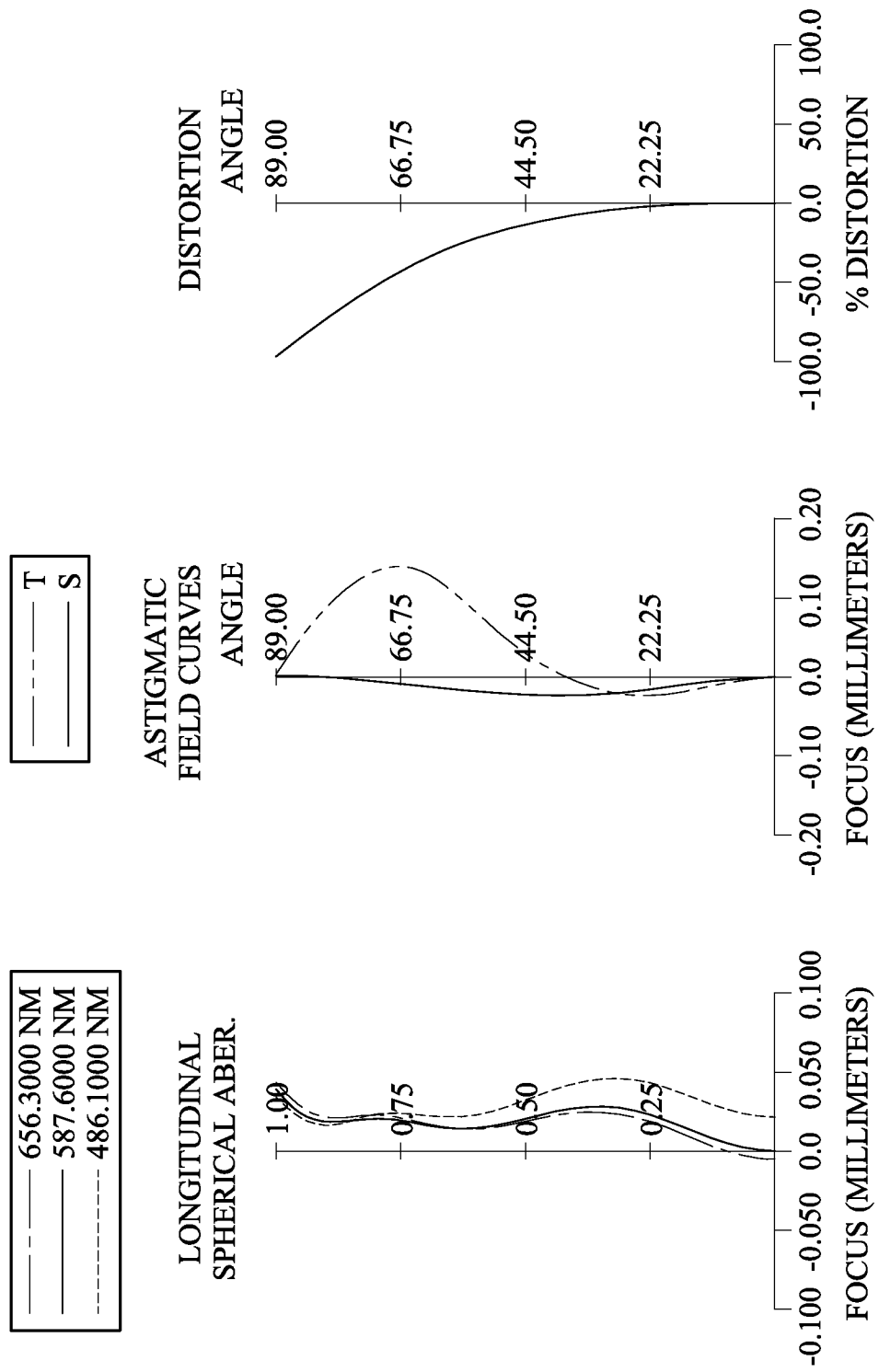
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the imaging optical lens system (its reference numeral is omitted) of the present disclosure and an image sensor 1190. The imaging optical lens system includes, in order from an object side to an image side, a first lens element 1110, a second lens element 1120, a third lens element 1130, an aperture stop 1100, a fourth lens element 1140, a fifth lens element 1150, a sixth lens element 1160, an IR-cut filter 1170 and an image surface 1180, wherein the imaging optical lens system has a total of six lens elements (1110-1160).

The first lens element 1110 with negative refractive power has an object-side surface 1111 being convex in a paraxial region thereof and an image-side surface 1112 being concave in a paraxial region thereof. The first lens element 1110 is made of plastic material and has the object-side surface 1111 and the image-side surface 1112 being both aspheric.

The second lens element 1120 with negative refractive power has an object-side surface 1121 being concave in a paraxial region thereof and an image-side surface 1122 being convex in a paraxial region thereof. The second lens element 1120 is made of plastic material and has the object-side surface 1121 and the image-side surface 1122 being both aspheric.

The third lens element 1130 with positive refractive power has an object-side surface 1131 being convex in a paraxial region thereof and an image-side surface 1132 being convex in a paraxial region thereof. The third lens element 1130 is made of plastic material and has the object-side surface 1131 and the image-side surface 1132 being both aspheric.

The fourth lens element 1140 with positive refractive power has an object-side surface 1141 being concave in a paraxial region thereof and an image-side surface 1142 being convex in a paraxial region thereof. The fourth lens element 1140 is made of plastic material and has the object-side surface 1141 and the image-side surface 1142 being both aspheric.

The fifth lens element 1150 with negative refractive power has an object-side surface 1151 being concave in a paraxial region thereof and an image-side surface 1152 being concave in a paraxial region thereof. The fifth lens element 1150 is made of plastic material and has the object-side surface 1151 and the image-side surface 1152 being both aspheric.

The sixth lens element 1160 with positive refractive power has an object-side surface 1161 being convex in a paraxial region thereof and an image-side surface 1162 being convex in a paraxial region thereof. The sixth lens element 1160 is made of plastic material and has the object-side surface 1161 and the image-side surface 1162 being both aspheric. The image-side surface 1162 of the sixth lens element 1160 has at least one concave shape in an off-axis region thereof.

The IR-cut filter 1170 is made of glass material and located between the sixth lens element 1160 and the image surface 1180, and will not affect the focal length of the imaging optical lens system. The image sensor 1190 is disposed on or near the image surface 1180 of the imaging optical lens system.

The detailed optical data of the 11th embodiment are shown in Table 21 and the aspheric surface data are shown in Table 22 below.

TABLE 21

11th Embodiment
f = 1.25 mm, Fno = 1.98, HFOV = 89.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 8.300 (ASP) | 0.800 | Plastic | 1.535 | 55.8 | −2.94 |
| 2 | | 1.279 (ASP) | 2.205 | | | | |
| 3 | Lens 2 | −2.503 (ASP) | 1.456 | Plastic | 1.639 | 23.3 | −23.92 |
| 4 | | −3.672 (ASP) | 0.475 | | | | |
| 5 | Lens 3 | 1.861 (ASP) | 0.618 | Plastic | 1.544 | 55.9 | 2.31 |
| 6 | | −3.418 (ASP) | −0.123 | | | | |
| 7 | Ape. Stop | Plano | 0.677 | | | | |
| 8 | Lens 4 | −4.129 (ASP) | 0.665 | Plastic | 1.544 | 55.9 | 1.75 |
| 9 | | −0.817 (ASP) | 0.062 | | | | |
| 10 | Lens 5 | −1.265 (ASP) | 0.526 | Plastic | 1.660 | 20.4 | −1.30 |
| 11 | | 3.128 (ASP) | 0.050 | | | | |
| 12 | Lens 6 | 7.476 (ASP) | 0.885 | Plastic | 1.544 | 55.9 | 4.27 |
| 13 | | −3.227 (ASP) | 0.700 | | | | |
| 14 | IR-cut filter | Plano | 0.300 | Glass | 1.517 | 64.2 | — |
| 15 | | Plano | 0.387 | | | | |
| 16 | Image | Plano | — | | | | |

Note:
Reference wavelength is 587.6 nm (d-line).

TABLE 22

Aspheric Coefficients

| Surface # | 1 | 2 | 3 | 4 | 5 | 6 |
|---|---|---|---|---|---|---|
| k = | −2.3954E+00 | −4.1202E−01 | −3.4677E−01 | 6.2312E+00 | −9.1867E+00 | −6.2785E+01 |
| A4 = | 2.8165E−03 | 6.4884E−03 | −4.4579E−03 | 3.7513E−03 | 9.2979E−02 | −1.5916E−01 |
| A6 = | −6.1054E−04 | 1.4619E−03 | −1.0017E−02 | 2.8235E−04 | −2.7234E−02 | 1.6068E−01 |
| A8 = | 4.2208E−05 | 2.5215E−03 | 2.2353E−02 | 5.0608E−02 | −2.8881E−01 | −1.9548E−01 |
| A10 = | −1.2393E−06 | −1.0302E−03 | −8.1112E−03 | −3.4805E−02 | 5.4739E−01 | 1.0185E−01 |
| A12 = | — | — | 8.9159E−04 | 9.2632E−03 | −3.8331E−01 | −6.5929E−02 |

| Surface # | 8 | 9 | 10 | 11 | 12 | 13 |
|---|---|---|---|---|---|---|
| k = | −9.0000E+01 | −1.7714E+00 | −4.5350E−01 | −7.0684E+01 | −3.8485E+01 | −5.1585E−01 |
| A4 = | 3.1280E−03 | 8.5492E−01 | 5.3625E−01 | 9.5546E−02 | 3.3434E−01 | 1.6687E−01 |
| A6 = | 2.9858E−01 | −1.7621E+00 | −1.3097E+00 | −1.0911E−01 | −4.0973E−01 | −1.2832E−01 |
| A8 = | −1.1022E+00 | 1.6576E+00 | 1.5328E+00 | 6.3375E−02 | 3.1421E−01 | 1.3211E−01 |
| A10 = | 1.3963E+00 | −6.8775E−01 | −7.6877E−01 | 4.6055E−03 | −1.4337E−01 | −8.6719E−02 |
| A12 = | −6.8491E−01 | 5.3425E−02 | 1.2058E−01 | −8.8703E−03 | 3.6917E−02 | 3.0722E−02 |
| A14 = | — | — | — | — | −4.1764E−03 | −4.3930E−03 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 1.25 | (CT2/R3) + (CT2/R4) | −0.98 |
| Fno | 1.98 | (R9 + R10)/(R9 − R10) | −0.42 |
| HFOV [deg.] | 89.0 | (R11 + R12)/(R11 − R12) | 0.40 |
| |1/tan(HFOV)| | 0.02 | f/T12 | 0.57 |
| T56/T45 | 0.81 | f3/f2 | −0.10 |
| CT2/CT3 | 2.36 | SL/TL | 0.44 |
| CT6/CT5 | 1.68 | |Y62/Y11| | 0.42 |

12th Embodiment

Figure 23:
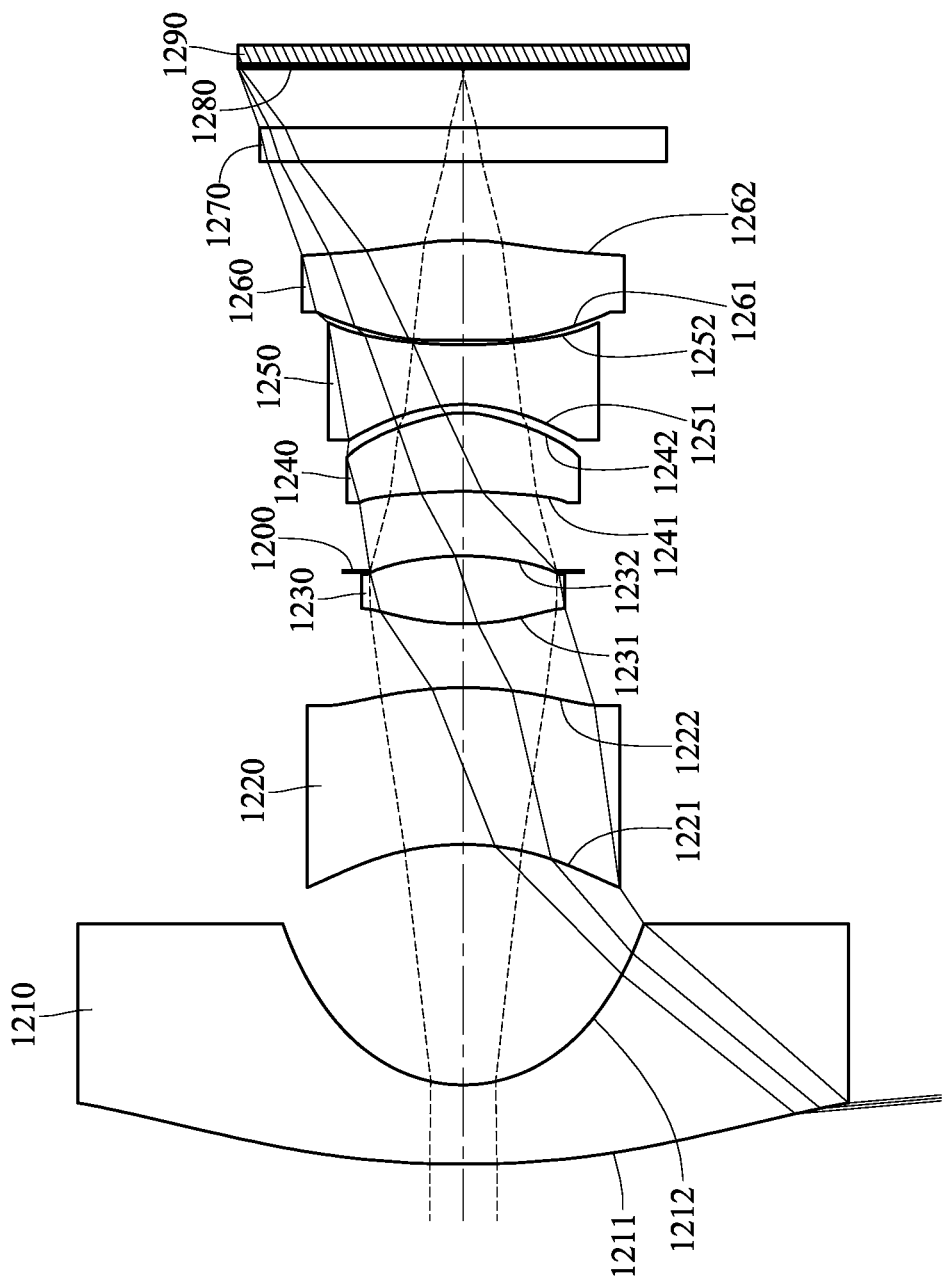
FIG. 23 is a schematic view of an image capturing unit according to the 12th embodiment of the present disclosure.
Figure 24:
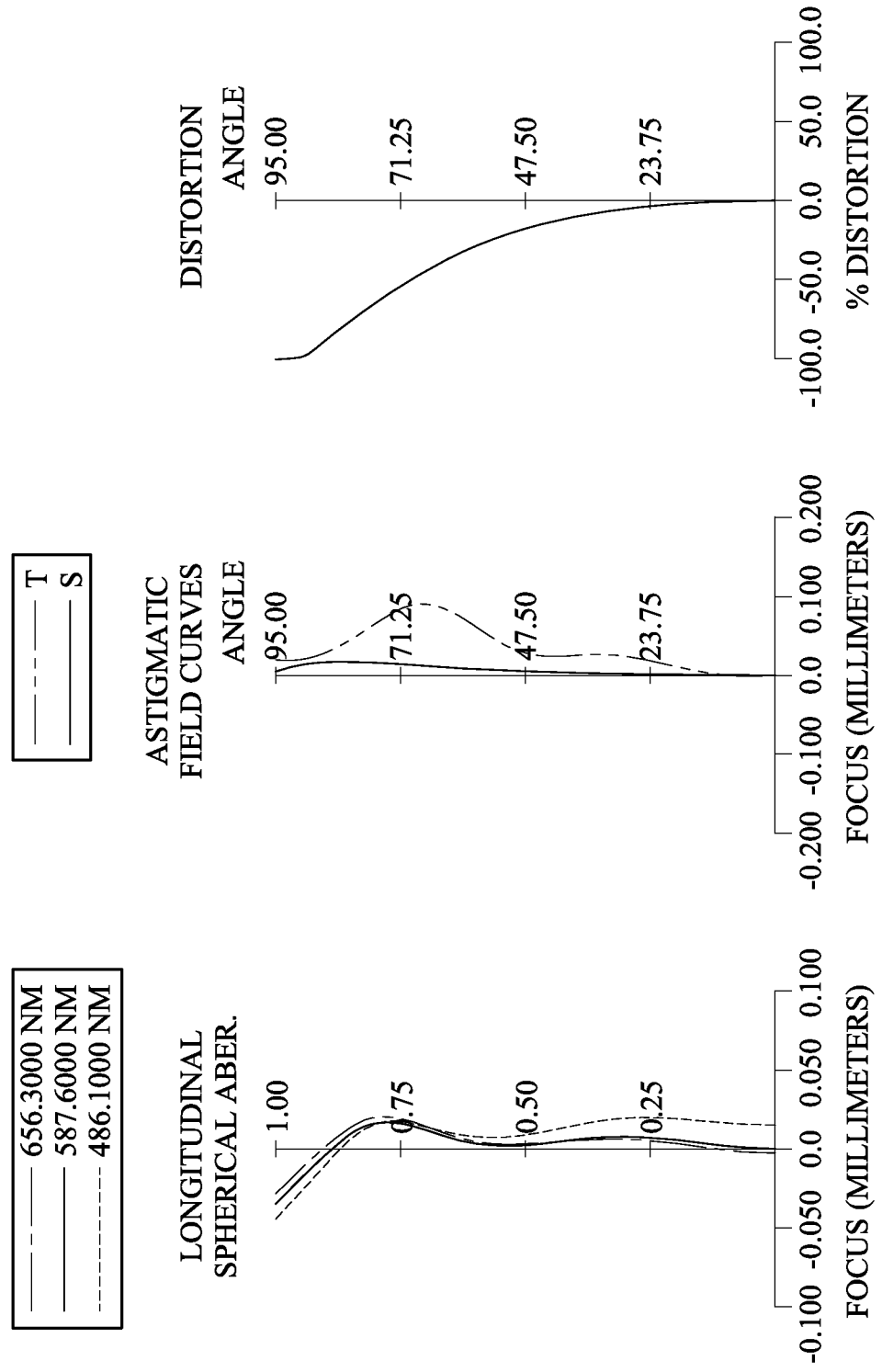
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit includes the imaging optical lens system (its reference numeral is omitted) of the present disclosure and an image sensor 1290. The imaging optical lens system includes, in order from an object side to an image side, a first lens element 1210, a second lens element 1220, a third lens element 1230, an aperture stop 1200, a fourth lens element 1240, a fifth lens element 1250, a sixth lens element 1260, an IR-cut filter 1270 and an image surface 1280, wherein the imaging optical lens system has a total of six lens elements (1210-1260).

The first lens element 1210 with negative refractive power has an object-side surface 1211 being convex in a paraxial region thereof and an image-side surface 1212 being concave in a paraxial region thereof. The first lens element 1210 is made of glass material and has the object-side surface 1211 and the image-side surface 1212 being both aspheric.

The second lens element 1220 with negative refractive power has an object-side surface 1221 being concave in a paraxial region thereof and an image-side surface 1222 being convex in a paraxial region thereof. The second lens element 1220 is made of plastic material and has the object-side surface 1221 and the image-side surface 1222 being both aspheric.

The third lens element 1230 with positive refractive power has an object-side surface 1231 being convex in a paraxial region thereof and an image-side surface 1232 being convex in a paraxial region thereof. The third lens element 1230 is made of plastic material and has the object-side surface 1231 and the image-side surface 1232 being both aspheric.

The fourth lens element 1240 with positive refractive power has an object-side surface 1241 being concave in a paraxial region thereof and an image-side surface 1242 being convex in a paraxial region thereof. The fourth lens element 1240 is made of plastic material and has the object-side surface 1241 and the image-side surface 1242 being both aspheric.

The fifth lens element 1250 with negative refractive power has an object-side surface 1251 being concave in a paraxial region thereof and an image-side surface 1252 being concave in a paraxial region thereof. The fifth lens element 1250 is made of plastic material and has the object-side surface 1251 and the image-side surface 1252 being both aspheric.

The sixth lens element 1260 with positive refractive power has an object-side surface 1261 being concave in a paraxial region thereof and an image-side surface 1262 being convex in a paraxial region thereof. The sixth lens element 1260 is made of plastic material and has the object-side surface 1261 and the image-side surface 1262 being both aspheric. The image-side surface 1262 of the sixth lens element 1260 has at least one concave shape in an off-axis region thereof.

The IR-cut filter 1270 is made of glass material and located between the sixth lens element 1260 and the image surface 1280, and will not affect the focal length of the imaging optical lens system. The image sensor 1290 is disposed on or near the image surface 1280 of the imaging optical lens system.

The detailed optical data of the 12th embodiment are shown in Table 23 and the aspheric surface data are shown in Table 24 below.

TABLE 23

12th Embodiment
f = 1.25 mm, Fno = 2.10, HFOV = 95.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 9.003 (ASP) | 0.704 | Glass | 1.589 | 61.3 | −2.74 |
| 2 | | 1.330 (ASP) | 2.135 | | | | |
| 3 | Lens 2 | −2.457 (ASP) | 1.393 | Plastic | 1.639 | 23.3 | −26.13 |
| 4 | | −3.518 (ASP) | 0.566 | | | | |
| 5 | Lens 3 | 2.168 (ASP) | 0.603 | Plastic | 1.544 | 55.9 | 2.29 |
| 6 | | −2.640 (ASP) | −0.137 | | | | |
| 7 | Ape. Stop | Plano | 0.711 | | | | |
| 8 | Lens 4 | −3.812 (ASP) | 0.698 | Plastic | 1.544 | 55.9 | 1.88 |
| 9 | | −0.857 (ASP) | 0.075 | | | | |
| 10 | Lens 5 | −1.237 (ASP) | 0.530 | Plastic | 1.660 | 20.4 | −1.50 |
| 11 | | 5.804 (ASP) | 0.040 | | | | |
| 12 | Lens 6 | −13.691 (ASP) | 0.888 | Plastic | 1.544 | 55.9 | 5.31 |
| 13 | | −2.440 (ASP) | 0.700 | | | | |
| 14 | IR-cut filter | Plano | 0.300 | Glass | 1.517 | 64.2 | — |
| 15 | | Plano | 0.519 | | | | |
| 16 | Image | Plano | — | | | | |

Note:
Reference wavelength is 587.6 nm (d-line).

TABLE 24

Aspheric Coefficients

| Surface # | 1 | 2 | 3 | 4 | 5 | 6 |
|---|---|---|---|---|---|---|
| k = | −2.8815E+00 | −4.9166E−01 | −1.9099E−01 | 3.8483E+00 | −1.0693E+01 | −2.5057E+01 |
| A4 = | 2.6529E−03 | 5.5068E−03 | −5.6141E−03 | 1.1543E−02 | 7.1542E−02 | −1.5916E−01 |
| A6 = | −6.0554E−04 | 1.6154E−02 | −1.2486E−02 | −1.0230E−02 | −2.1364E−02 | 1.6068E−01 |
| A8 = | 4.2779E−05 | −6.4444E−03 | 2.2924E−02 | 5.3462E−02 | −2.7669E−01 | −1.9548E−01 |
| A10 = | −1.1875E−06 | 1.1284E−03 | −8.0611E−03 | −3.5601E−02 | 5.3450E−01 | 1.0185E−01 |
| A12 = | — | — | 8.9159E−04 | 9.2632E−03 | −3.8331E−01 | −6.5929E−02 |

| Surface # | 8 | 9 | 10 | 11 | 12 | 13 |
|---|---|---|---|---|---|---|
| k = | −8.4770E+01 | −1.8245E+00 | −5.7655E−01 | −2.9735E+01 | 8.8307E+01 | −1.2425E−01 |
| A4 = | −1.4750E−02 | 8.4058E−01 | 5.5976E−01 | 9.2464E−02 | 5.0794E−01 | 1.4149E−01 |
| A6 = | 2.7705E−01 | −1.7578E+00 | −1.3078E+00 | −1.0670E−01 | −6.8669E−01 | −2.2107E−02 |
| A8 = | −1.0346E+00 | 1.6598E+00 | 1.5269E+00 | 6.4486E−02 | 5.6913E−01 | −3.2910E−02 |
| A10 = | 1.3639E+00 | −6.8327E−01 | −7.7172E−01 | 4.5870E−03 | −2.9063E−01 | 3.0493E−02 |
| A12 = | −6.8491E−01 | 5.3425E−02 | 1.2058E−01 | −8.8703E−03 | 8.5420E−02 | −1.2138E−02 |
| A14 = | — | — | — | — | −1.0882E−02 | 1.9390E−03 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 1.25 | (CT2/R3) + (CT2/R4) | −0.96 |
| Fno | 2.10 | (R9 + R10)/(R9 − R10) | −0.65 |
| HFOV [deg.] | 95.0 | (R11 + R12)/(R11 − R12) | 1.43 |
| \|1/tan(HFOV)\| | 0.09 | f/T12 | 0.59 |
| T56/T45 | 0.53 | f3/f2 | −0.09 |
| CT2/CT3 | 2.31 | SL/TL | 0.46 |
| CT6/CT5 | 1.68 | \|Y62/Y11\| | 0.42 |

13th Embodiment

Figure 25:
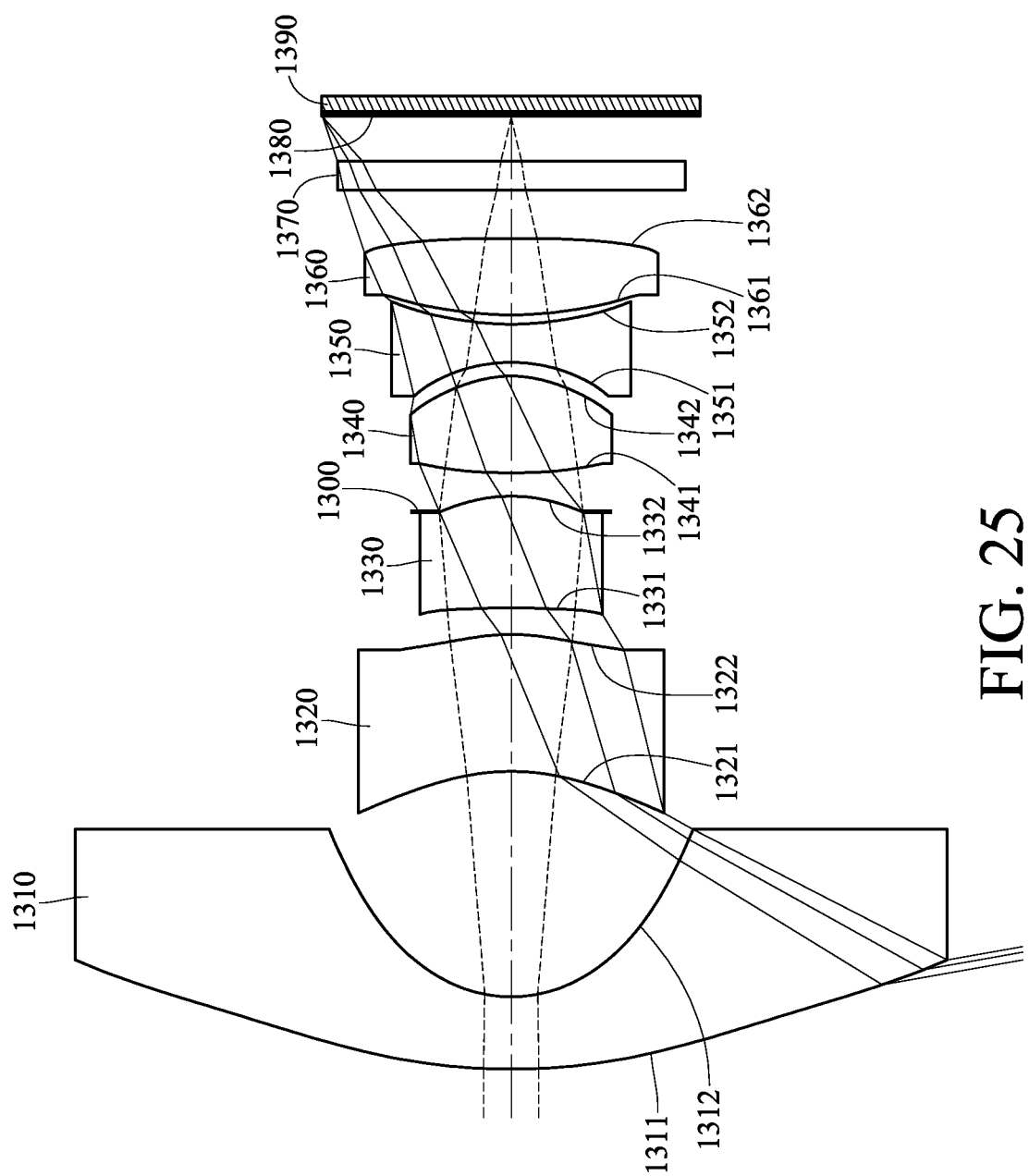
FIG. 25 is a schematic view of an image capturing unit according to the 13th embodiment of the present disclosure.
Figure 26:
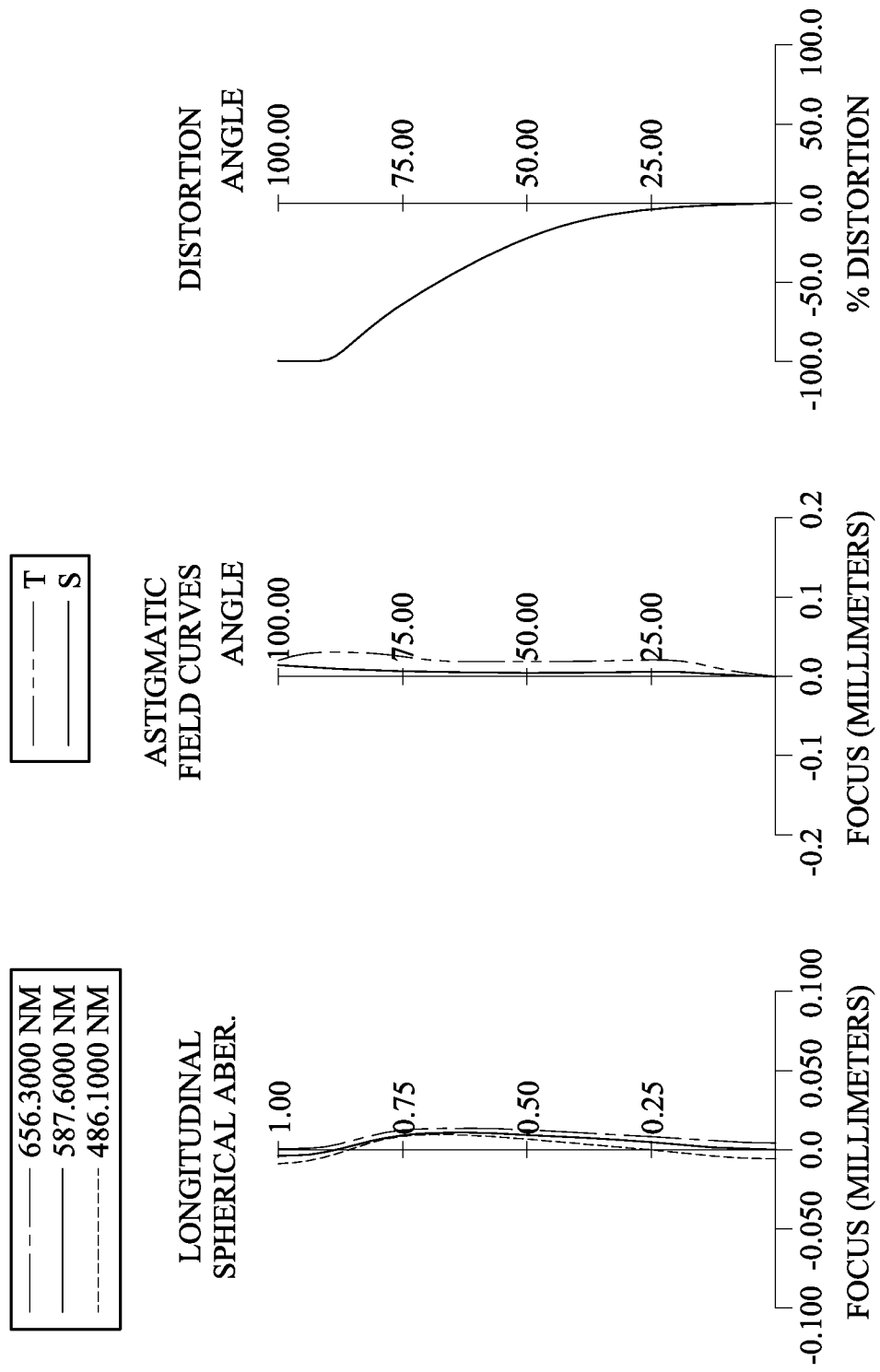
FIG. 26 shows spherical aberration curves, astigmatic field curves and a distortion curve of the image capturing unit according to the 13th embodiment.

FIG. 25 is a schematic view of an image capturing unit according to the 13th embodiment of the present disclosure. FIG. 26 shows, in order from left to right, spherical aberration curves, astigmatic field curves and a distortion curve of the image capturing unit according to the 13th embodiment. In FIG. 25, the image capturing unit includes the imaging optical lens system (its reference numeral is omitted) of the present disclosure and an image sensor 1390. The imaging optical lens system includes, in order from an object side to an image side, a first lens element 1310, a second lens element 1320, a third lens element 1330, an aperture stop 1300, a fourth lens element 1340, a fifth lens element 1350, a sixth lens element 1360, an IR-cut filter 1370 and an image surface 1380, wherein the imaging optical lens system has a total of six lens elements (1310-1360).

The first lens element 1310 with negative refractive power has an object-side surface 1311 being convex in a paraxial region thereof and an image-side surface 1312 being concave in a paraxial region thereof. The first lens element 1310 is made of plastic material and has the object-side surface 1311 and the image-side surface 1312 being both aspheric.

The second lens element 1320 with positive refractive power has an object-side surface 1321 being concave in a paraxial region thereof and an image-side surface 1322 being convex in a paraxial region thereof. The second lens element 1320 is made of plastic material and has the object-side surface 1321 and the image-side surface 1322 being both aspheric.

The third lens element 1330 with positive refractive power has an object-side surface 1331 being concave in a paraxial region thereof and an image-side surface 1332 being convex in a paraxial region thereof. The third lens element 1330 is made of plastic material and has the object-side surface 1331 and the image-side surface 1332 being both aspheric.

The fourth lens element 1340 with positive refractive power has an object-side surface 1341 being convex in a paraxial region thereof and an image-side surface 1342 being convex in a paraxial region thereof. The fourth lens element 1340 is made of plastic material and has the object-side surface 1341 and the image-side surface 1342 being both aspheric.

The fifth lens element 1350 with negative refractive power has an object-side surface 1351 being concave in a paraxial region thereof and an image-side surface 1352 being concave in a paraxial region thereof. The fifth lens element 1350 is made of plastic material and has the object-side surface 1351 and the image-side surface 1352 being both aspheric.

The sixth lens element 1360 with positive refractive power has an object-side surface 1361 being convex in a paraxial region thereof and an image-side surface 1362 being convex in a paraxial region thereof. The sixth lens element 1360 is made of plastic material and has the object-side surface 1361 and the image-side surface 1362 being both aspheric.

The IR-cut filter 1370 is made of glass material and located between the sixth lens element 1360 and the image surface 1380, and will not affect the focal length of the imaging optical lens system. The image sensor 1390 is disposed on or near the image surface 1380 of the imaging optical lens system.

The detailed optical data of the 13th embodiment are shown in Table 25 and the aspheric surface data are shown in Table 26 below.

TABLE 25

13th Embodiment
f = 1.26 mm, Fno = 2.20, HFOV = 100.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 6.397 (ASP) | 0.750 | Plastic | 1.544 | 56.0 | −3.57 |
| 2 | | 1.429 (ASP) | 2.333 | | | | |
| 3 | Lens 2 | −2.356 (ASP) | 1.418 | Plastic | 1.639 | 23.5 | 9.78 |
| 4 | | −2.112 (ASP) | 0.277 | | | | |
| 5 | Lens 3 | −5.999 (ASP) | 1.155 | Plastic | 1.544 | 56.0 | 3.49 |
| 6 | | −1.541 (ASP) | −0.161 | | | | |
| 7 | Ape. Stop | Plano | 0.404 | | | | |
| 8 | Lens 4 | 9.840 (ASP) | 1.000 | Plastic | 1.535 | 55.8 | 2.04 |
| 9 | | −1.182 (ASP) | 0.142 | | | | |
| 10 | Lens 5 | −1.572 (ASP) | 0.394 | Plastic | 1.660 | 20.4 | −1.47 |
| 11 | | 2.784 (ASP) | 0.097 | | | | |
| 12 | Lens 6 | 3.429 (ASP) | 0.794 | Plastic | 1.535 | 55.8 | 5.46 |
| 13 | | −18.009 (ASP) | 0.500 | | | | |
| 14 | IR-cut filter | Plano | 0.300 | Glass | 1.517 | 64.2 | — |
| 15 | | Plano | 0.464 | | | | |
| 16 | Image | Plano | — | | | | |

Note:
Reference wavelength is 587.6 nm (d-line).

TABLE 26

Aspheric Coefficients

| Surface # | 1 | 2 | 3 | 4 | 5 | 6 |
|---|---|---|---|---|---|---|
| k = | −1.5067E+00 | −9.9897E−01 | −1.0090E+00 | −1.1852E+01 | −4.5073E+01 | −9.1882E+00 |
| A4 = | 1.8523E−03 | 2.7968E−02 | 9.4033E−03 | 2.0131E−02 | 1.1488E−01 | −1.4912E−01 |
| A6 = | −6.0980E−04 | 4.3326E−03 | 1.6610E−02 | 3.9954E−02 | −1.7695E−01 | 1.5852E−01 |
| A8 = | 4.5588E−05 | −8.4285E−04 | −1.2685E−02 | −3.2638E−02 | 7.8085E−02 | −3.0815E−01 |
| A10 = | −1.4536E−06 | 3.8559E−04 | 3.8411E−03 | −5.3449E−03 | −5.4660E−02 | 3.2488E−01 |
| A12 = | 1.7727E−08 | −6.5786E−05 | −3.6039E−04 | 1.2335E−02 | 1.0610E−02 | −1.3145E−01 |
| A14 = | — | — | −1.8237E−05 | −3.6680E−03 | — | — |

| Surface # | 8 | 9 | 10 | 11 | 12 | 13 |
|---|---|---|---|---|---|---|
| k = | 6.3776E+01 | −1.4405E+00 | −2.8689E−01 | −3.3563E+01 | −8.5535E+01 | −1.2828E+01 |
| A4 = | 1.8047E−01 | 2.7146E−01 | 2.3973E−01 | 1.3813E−01 | 1.4187E−01 | −2.2624E−02 |
| A6 = | −3.3585E−01 | −7.9709E−01 | −1.0513E+00 | −4.0044E−01 | −2.3100E−01 | 3.2624E−02 |
| A8 = | 3.9173E−01 | 1.2827E+00 | 2.1046E+00 | 6.7138E−01 | 1.7636E−01 | −2.5116E−02 |

TABLE 26-continued

| Aspheric Coefficients | | | | | | |
|---|---|---|---|---|---|---|
| A10 = | −2.6983E−01 | −1.0800E+00 | −2.0275E+00 | −5.5588E−01 | 4.0887E−05 | −8.4841E−03 |
| A12 = | 7.2250E−02 | 3.8637E−01 | 8.2107E−01 | 2.2408E−01 | −7.4672E−02 | 1.9054E−02 |
| A14 = | — | −3.4058E−02 | −8.6728E−02 | −3.5365E−02 | 3.9478E−02 | −8.1071E−03 |
|  | — | — | — | — | −6.7203E−03 | 1.0435E−03 |

In the 13th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 13th embodiment, so an explanation in this regard will not be provided again.

Moreover, these parameters can be calculated from Table 25 and Table 26 as the following values and satisfy the following conditions:

| 13th Embodiment | | | |
|---|---|---|---|
| f [mm] | 1.26 | (CT2/R3) + (CT2/R4) | −1.27 |
| Fno | 2.20 | (R9 + R10)/(R9 − R10) | −0.28 |
| HFOV [deg.] | 100.0 | (R11 + R12)/(R11 − R12) | −0.68 |
| \|1/tan(HFOV)\| | 0.18 | f/T12 | 0.54 |
| T56/T45 | 0.68 | f3/f2 | 0.36 |
| CT2/CT3 | 1.23 | SL/TL | 0.42 |
| CT6/CT5 | 2.02 | \|Y62/Y11\| | 0.34 |

The foregoing description, for the purpose of explanation, has been described with reference to specific embodiments. It is to be noted that TABLES 1-26 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens system comprising six lens elements, the six lens elements being, in order from an object side to an image side: a first lens element, a second lens element, a third lens element, a fourth lens element, a fifth lens element and a sixth lens element; each of the six lens elements having an object-side surface facing toward the object side and an image-side surface facing toward the image side;

wherein the first lens element has negative refractive power, the object-side surface of the first lens element is concave in a paraxial region thereof, the image-side surface of the second lens element is convex in a paraxial region thereof, the object-side surface of the fifth lens element is concave in a paraxial region thereof, at least one of the object-side surface and the image-side surface of the sixth lens element has at least one inflection point, and an axial distance between the first lens element and the second lens element is maximum among axial distances between each of all adjacent lens elements of the imaging optical lens system;

wherein a curvature radius of the object-side surface of the sixth lens element is R11, a curvature radius of the image-side surface of the sixth lens element is R12, and the following condition is satisfied:

$$1.50 \leq (R11+R12)/(R11-R12) < 5.5.$$

2. The imaging optical lens system of claim 1, wherein the fifth lens element has negative refractive power.

3. The imaging optical lens system of claim 1, wherein the object-side surface of the fourth lens element is convex in a paraxial region thereof, and the image-side surface of the fifth lens element is convex in a paraxial region thereof.

4. The imaging optical lens system of claim 1, wherein there is an air gap in a paraxial region between each of all adjacent lens elements of the imaging optical lens system, at least one of the object-side surfaces and the image-side surfaces of the six lens elements of the imaging optical lens system is aspheric, and the object-side surface of the third lens element is convex in a paraxial region thereof.

5. The imaging optical lens system of claim 1, wherein the third lens element has positive refractive power, the image-side surface of the third lens element is convex in a paraxial region thereof, a focal length of the second lens element is f2, a focal length of the third lens element is f3, and the following condition is satisfied:

$$-0.50 < f3/f2 < 0.60.$$

6. The imaging optical lens system of claim 1, wherein a focal length of the imaging optical lens system is f, the axial distance between the first lens element and the second lens element is T12, and the following condition is satisfied:

$$0 < f/T12 < 1.50.$$

7. The imaging optical lens system of claim 1, wherein a central thickness of the second lens element is CT2, a curvature radius of the object-side surface of the second lens element is R3, a curvature radius of the image-side surface of the second lens element is R4, and the following condition is satisfied:

$$-2.5 < (CT2/R3)+(CT2/R4) < -0.75.$$

8. An imaging optical lens system comprising six lens elements, the six lens elements being, in order from an object side to an image side: a first lens element, a second lens element, a third lens element, a fourth lens element, a fifth lens element and a sixth lens element; each of the six lens elements having an object-side surface facing toward the object side and an image-side surface facing toward the image side;

wherein the first lens element has negative refractive power, the object-side surface of the first lens element is concave in a paraxial region thereof, the object-side surface of fifth lens element is concave in a paraxial region thereof, the image-side surface of the fifth lens element is convex in a paraxial region thereof, at least one of the object-side surface and the image-side surface of the sixth lens element has at least one inflection point, an axial distance between the first lens element and the second lens element is maximum among axial distances between each of all adjacent lens elements of the imaging optical lens system, and the axial distance between the first lens element and the second lens element is larger than a central thickness of the second lens element;

wherein a curvature radius of the object-side surface of the sixth lens element is R11, a curvature radius of the image-side surface of the sixth lens element is R12, and the following condition is satisfied:

$$1.50 \leq (R11+R12)/(R11-R12) < 5.5.$$

9. The imaging optical lens system of claim 8, wherein the third lens element has positive refractive power, the image-side surface of the third lens element is convex in a paraxial region thereof, and there is an air gap in a paraxial region between each of all adjacent lens elements of the imaging optical lens system.

10. The imaging optical lens system of claim 8, wherein the image-side surface of the first lens element is concave in a paraxial region thereof, and the object-side surface of the third lens element is convex in a paraxial region thereof.

11. The imaging optical lens system of claim 8, further comprising an aperture stop disposed between the second lens element and the third lens element.

12. The imaging optical lens system of claim 8, wherein a focal length of the second lens element is f2, a focal length of the third lens element is f3, and the following condition is satisfied:

$$-0.50 < f3/f2 < 0.60.$$

13. The imaging optical lens system of claim 8, wherein a maximum effective radius of the object-side surface of the first lens element is Y11, a maximum effective radius of the image-side surface of the sixth lens element is Y62, and the following condition is satisfied:

$$|Y62/Y11| < 1.5.$$

14. The imaging optical lens system of claim 8, wherein half of a maximum field of view of the imaging optical lens system is HFOV, and the following condition is satisfied:

$$|1/\tan(\text{HFOV})| < 0.50.$$

15. The imaging optical lens system of claim 8, wherein a curvature radius of the object-side surface of the second lens element and a curvature radius of the image-side surface of the second lens element are both positive or both negative.

16. The imaging optical lens system of claim 8, wherein an absolute value of a focal length of the second lens element is maximum among absolute values of focal lengths of each of the six lens elements of the imaging optical lens system.

17. An image capturing unit, comprising:
the imaging optical lens system of claim 8; and
an image sensor, wherein the image sensor is disposed on an image surface of the imaging optical lens system.

18. An electronic device, comprising:
the image capturing unit of claim 17.

19. An imaging optical lens system comprising six lens elements, the six lens elements being, in order from an object side to an image side: a first lens element, a second lens element, a third lens element, a fourth lens element, a fifth lens element and a sixth lens element; each of the six lens elements having an object-side surface facing toward the object side and an image-side surface facing toward the image side;

wherein the first lens element has negative refractive power, the object-side surface of the fifth lens element is concave in a paraxial region thereof, the image-side surface of the fifth lens element is convex in a paraxial region thereof, at least one of the object-side surface and the image-side surface of the sixth lens element has at least one inflection point, an axial distance between the first lens element and the second lens element is maximum among axial distances between each of all adjacent lens elements of the imaging optical lens system, an absolute value of a focal length of the second lens element is maximum among absolute values of focal lengths of each of the six lens elements of the imaging optical lens system, the absolute value of the focal length of the fifth lens element is minimum among the absolute values of the focal lengths of each of the six lens elements of the imaging optical lens system, an absolute value of a curvature radius of the object-side surface of the third lens element is larger than an absolute value of a curvature radius of the image-side surface of the third lens element;

wherein a curvature radius of the object-side surface of the sixth lens element is R11, a curvature radius of the image-side surface of the sixth lens element is R12, and the following condition is satisfied:

$$0 < (R11+R12)/(R11-R12) < 5.5.$$

20. The imaging optical lens system of claim 19, wherein the third lens element has positive refractive power, the object-side surface of the third lens element is convex in a paraxial region thereof, and the image-side surface of the third lens element is convex in a paraxial region thereof.

21. The imaging optical lens system of claim 19, wherein the image-side surface of the second lens element is convex in a paraxial region thereof, and there is an air gap in a paraxial region between each of all adjacent lens elements of the imaging optical lens system.

22. The imaging optical lens system of claim 19, further comprising an aperture stop disposed between the second lens element and the third lens element.

23. The imaging optical lens system of claim 19, wherein the curvature radius of the object-side surface of the sixth lens element is R11, the curvature radius of the image-side surface of the sixth lens element is R12, and the following condition is satisfied:

$$1.32 \leq (R11+R12)/(R11-R12) < 5.5.$$

24. The imaging optical lens system of claim 19, wherein the focal length of the second lens element is f2, the focal length of the third lens element is f3, and the following condition is satisfied:

$$-0.50 < f3/f2 < 0.60.$$

25. The imaging optical lens system of claim 19, wherein a maximum effective radius of the object-side surface of the first lens element is Y11, a maximum effective radius of the image-side surface of the sixth lens element is Y62, and the following condition is satisfied:

$$|Y62/Y11| < 1.5.$$

26. The imaging optical lens system of claim 19, wherein a curvature radius of the object-side surface of the second lens element and a curvature radius of the image-side surface of the second lens element are both positive or both negative.

27. The imaging optical lens system of claim 19, wherein a curvature radius of the object-side surface of the fourth lens element and a curvature radius of the image-side surface of the fourth lens element are both positive or both negative.

28. The imaging optical lens system of claim 19, wherein the axial distance between the second lens element and the third lens element is larger than the axial distance between the fourth lens element and the fifth lens element.

* * * * *